United States Patent
Maehara et al.

(10) Patent No.: US 9,563,937 B2
(45) Date of Patent: Feb. 7, 2017

(54) HIGH-RESOLUTION IMAGE GENERATION APPARATUS, HIGH-RESOLUTION IMAGE GENERATION METHOD, AND HIGH-RESOLUTION IMAGE GENERATION PROGRAM

(71) Applicant: MITSUBISHI ELECTRIC CORPORATION, Tokyo (JP)

(72) Inventors: Hideaki Maehara, Tokyo (JP); Yosuke Ishiwatari, Tokyo (JP); Hironobu Abe, Tokyo (JP); Koichi Takeuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/891,059

(22) PCT Filed: Jun. 30, 2014

(86) PCT No.: PCT/JP2014/067386
§ 371 (c)(1),
(2) Date: Nov. 13, 2015

(87) PCT Pub. No.: WO2015/005163
PCT Pub. Date: Jan. 15, 2015

(65) Prior Publication Data
US 2016/0086311 A1    Mar. 24, 2016

(30) Foreign Application Priority Data
Jul. 12, 2013    (JP) .................................. 2013-146945

(51) Int. Cl.
*G06K 9/32* (2006.01)
*G06T 3/40* (2006.01)
*G06T 5/50* (2006.01)

(52) U.S. Cl.
CPC ............... *G06T 3/4053* (2013.01); *G06T 5/50* (2013.01); *G06T 2207/10028* (2013.01); *G06T 2207/10032* (2013.01); *G06T 2207/30244* (2013.01)

(58) Field of Classification Search
CPC ..................... H04N 2201/3274; G06T 3/4053; G06T 5/50; G06T 7/003; G06T 7/0051
See application file for complete search history.

(56) References Cited

U.S. PATENT DOCUMENTS 6,266,085 B1 *   7/2001   Kato ....................... H04N 7/181
                                                           348/143
6,269,175 B1 *   7/2001   Hanna ....................... G06T 5/50
                                                           348/E13.014

(Continued)

FOREIGN PATENT DOCUMENTS

JP    2002-157576 A    5/2002
JP    2004-118639 A    4/2004

(Continued)

*Primary Examiner* — Eueng-Nan Yeh
(74) *Attorney, Agent, or Firm* — Birch, Stewart, Kolasch & Birch, LLP

(57) ABSTRACT

It is an object to obtain a high-resolution image generation apparatus that can generate a high-quality image by sorting out good portions from faulty portions in optical flow. The present invention includes: a hard disk that stores multi-viewpoint image information and parameter information of a base image and a plurality of reference images; an optical flow computation unit that extracts a plurality of pairs of the base image and a reference image, the plurality of pairs each including a different reference image, and computes optical flow for each pair; a depth information computation unit that computes depth information which indicates depth of each pixel of the base image for each pair, based on optical flow and the parameter information; and an optical flow sorting unit that determines whether or not each piece of pixel-based (Continued)

correspondence information included in the optical flow of each pair is to be used for improving a resolution of the base image, based on two pieces of the depth information.

7 Claims, 33 Drawing Sheets

(56) References Cited

U.S. PATENT DOCUMENTS

| | | |
|---|---|---|
| 6,970,593 B2 | 11/2005 | Furukawa |
| 7,957,610 B2 | 6/2011 | Toma et al. |
| 8,374,464 B2 | 2/2013 | Toda |
| 8,587,471 B2 | 11/2013 | Ferretti et al. |
| 8,941,749 B2 | 1/2015 | Yahata |
| 2002/0061132 A1 | 5/2002 | Furukawa |
| 2007/0247529 A1 | 10/2007 | Toma et al. |
| 2009/0129704 A1 | 5/2009 | Toda |
| 2010/0259653 A1* | 10/2010 | Kimura ............ G09G 3/3406 348/252 |
| 2012/0013501 A1 | 1/2012 | Ferretti et al. |
| 2012/0287329 A1 | 11/2012 | Yahata |

FOREIGN PATENT DOCUMENTS

| | | |
|---|---|---|
| JP | 2005-164347 A | 6/2005 |
| JP | 2007-305113 A | 11/2007 |
| JP | 2009-146231 A | 7/2009 |
| JP | 4305148 B2 | 7/2009 |
| JP | 2009-181508 A | 8/2009 |
| JP | 2009-251839 A | 10/2009 |
| JP | 2011-113527 A | 6/2011 |
| JP | 2012-523030 A | 9/2012 |
| JP | 2012-253748 A | 12/2012 |
| JP | 2013-65247 A | 4/2013 |
| JP | 2013-84072 A | 5/2013 |
| WO | WO 2007/142109 A1 | 12/2007 |
| WO | WO 2010/061861 A1 | 6/2010 |
| WO | WO 2014/077024 A1 | 5/2014 |

* cited by examiner

Fig. 4

1222: MULTI-VIEWPOINT IMAGE DATA (0005) (REFERENCE IMAGE)

|    | 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|----|----|----|----|----|----|----|----|----|----|----|----|----|----|----|----|----|
| 0  | 13 | 12 | 24 | 30 | 15 | 12 | 12 | 12 | 12 | 11 | 11 | 10 | 12 | 39 | 66 | 78 | 78 | 78 | 44 | 15 | 15 | 15 | 15 | 15 | 14 | 15 | 46 | 46 | 26 | 23 | 42 | 21 |
| 1  | 20 | 31 | 33 | 32 | 27 | 14 | 11 | 11 | 12 | 12 | 11 | 10 | 10 | 20 | 66 | 76 | 77 | 77 | 70 | 30 | 16 | 15 | 14 | 15 | 27 | 35 | 29 | 28 | 28 | 24 | 28 | 39 |
| 2  | 33 | 33 | 33 | 32 | 32 | 35 | 14 | 11 | 11 | 12 | 11 | 11 | 10 | 11 | 43 | 75 | 75 | 66 | 44 | 22 | 18 | 14 | 17 | 21 | 33 | 34 | 40 | 29 | 28 | 27 | 37 | 45 |
| 3  | 34 | 33 | 31 | 37 | 50 | 63 | 34 | 12 | 11 | 12 | 11 | 11 | 10 | 10 | 17 | 55 | 51 | 26 | 17 | 16 | 15 | 24 | 23 | 15 | 21 | 50 | 52 | 31 | 30 | 36 | 32 | 40 |
| 4  | 33 | 33 | 44 | 54 | 54 | 65 | 61 | 19 | 10 | 11 | 12 | 12 | 12 | 12 | 10 | 21 | 21 | 16 | 15 | 15 | 12 | 18 | 24 | 19 | 18 | 33 | 28 | 38 | 38 | 30 | 40 | 44 |
| 5  | 26 | 49 | 53 | 57 | 61 | 61 | 54 | 25 | 11 | 11 | 16 | 24 | 19 | 14 | 11 | 11 | 15 | 15 | 15 | 17 | 13 | 12 | 25 | 25 | 24 | 27 | 39 | 32 | 34 | 42 | 43 | 44 |
| 6  | 23 | 44 | 51 | 61 | 57 | 42 | 31 | 23 | 13 | 11 | 20 | 21 | 17 | 12 | 10 | 10 | 13 | 15 | 15 | 16 | 15 | 12 | 15 | 29 | 32 | 37 | 36 | 39 | 42 | 43 | 44 | 44 |
| 7  | 25 | 30 | 53 | 52 | 32 | 26 | 26 | 18 | 14 | 13 | 14 | 17 | 14 | 12 | 11 | 10 | 11 | 14 | 15 | 15 | 17 | 14 | 13 | 19 | 30 | 35 | 50 | 45 | 43 | 35 | 44 | 47 |
| 8  | 29 | 24 | 34 | 32 | 27 | 23 | 16 | 12 | 14 | 17 | 20 | 20 | 15 | 12 | 11 | 11 | 15 | 14 | 14 | 16 | 18 | 17 | 17 | 17 | 32 | 37 | 43 | 46 | 45 | 46 | 47 | 46 |
| 9  | 31 | 27 | 25 | 27 | 21 | 12 | 11 | 11 | 13 | 15 | 23 | 20 | 16 | 14 | 13 | 14 | 17 | 16 | 13 | 16 | 18 | 18 | 18 | 16 | 27 | 37 | 38 | 41 | 46 | 47 | 46 | 44 |
| 10 | 30 | 31 | 27 | 16 | 12 | 11 | 11 | 12 | 13 | 14 | 14 | 13 | 14 | 14 | 14 | 15 | 18 | 16 | 14 | 13 | 17 | 19 | 19 | 11 | 15 | 32 | 37 | 37 | 45 | 45 | 42 | 42 |
| 11 | 28 | 31 | 28 | 14 | 12 | 11 | 11 | 12 | 14 | 12 | 12 | 13 | 14 | 14 | 15 | 15 | 18 | 16 | 16 | 12 | 16 | 28 | 31 | 14 | 13 | 26 | 34 | 36 | 40 | 48 | 43 | 34 |
| 12 | 30 | 32 | 19 | 13 | 12 | 10 | 10 | 12 | 13 | 11 | 14 | 15 | 15 | 14 | 15 | 16 | 18 | 17 | 17 | 15 | 13 | 26 | 24 | 12 | 11 | 21 | 27 | 35 | 36 | 41 | 32 | 21 |
| 13 | 25 | 16 | 12 | 15 | 13 | 11 | 18 | 19 | 17 | 12 | 15 | 16 | 15 | 16 | 16 | 17 | 17 | 19 | 20 | 16 | 14 | 13 | 11 | 10 | 11 | 13 | 25 | 29 | 30 | 22 | 21 | 23 |
| 14 | 14 | 15 | 15 | 15 | 14 | 19 | 24 | 17 | 15 | 13 | 12 | 13 | 13 | 14 | 14 | 15 | 17 | 16 | 21 | 17 | 15 | 12 | 10 | 10 | 10 | 10 | 15 | 22 | 21 | 21 | 21 | 23 |
| 15 | 12 | 14 | 12 | 11 | 13 | 13 | 16 | 17 | 15 | 14 | 12 | 12 | 13 | 13 | 13 | 13 | 14 | 16 | 16 | 16 | 15 | 15 | 12 | 11 | 11 | 11 | 16 | 20 | 21 | 20 | 22 | 27 |
| 16 | 15 | 15 | 11 | 11 | 13 | 17 | 24 | 31 | 18 | 16 | 15 | 11 | 13 | 13 | 13 | 13 | 13 | 17 | 17 | 16 | 16 | 15 | 13 | 12 | 13 | 18 | 21 | 22 | 20 | 19 | 29 | 37 |
| 17 | 19 | 16 | 11 | 14 | 17 | 18 | 22 | 48 | 34 | 27 | 24 | 16 | 12 | 13 | 13 | 13 | 17 | 19 | 18 | 18 | 17 | 14 | 13 | 15 | 21 | 22 | 23 | 22 | 19 | 30 | 42 |
| 18 | 15 | 13 | 17 | 17 | 17 | 18 | 18 | 33 | 54 | 48 | 31 | 26 | 13 | 12 | 13 | 14 | 14 | 17 | 16 | 16 | 16 | 17 | 17 | 15 | 12 | 18 | 21 | 22 | 22 | 26 | 29 | 35 |
| 19 | 12 | 32 | 32 | 17 | 17 | 18 | 18 | 21 | 43 | 61 | 33 | 28 | 18 | 11 | 13 | 14 | 14 | 17 | 16 | 16 | 15 | 15 | 16 | 11 | 10 | 15 | 20 | 21 | 22 | 32 | 35 | 35 |
| 20 | 35 | 44 | 20 | 16 | 17 | 19 | 20 | 20 | 27 | 63 | 52 | 23 | 16 | 12 | 12 | 13 | 14 | 17 | 15 | 15 | 16 | 16 | 12 | 11 | 12 | 12 | 16 | 20 | 22 | 36 | 39 | 34 |
| 21 | 51 | 25 | 16 | 17 | 20 | 22 | 21 | 21 | 21 | 36 | 27 | 16 | 16 | 16 | 13 | 12 | 14 | 16 | 15 | 17 | 14 | 12 | 14 | 26 | 24 | 12 | 13 | 19 | 22 | 36 | 39 | 35 |
| 22 | 46 | 17 | 18 | 20 | 21 | 22 | 21 | 21 | 20 | 18 | 16 | 17 | 17 | 16 | 17 | 12 | 14 | 15 | 14 | 13 | 11 | 17 | 28 | 31 | 28 | 18 | 13 | 15 | 23 | 34 | 38 | 34 |
| 23 | 14 | 28 | 21 | 21 | 21 | 20 | 20 | 18 | 17 | 16 | 16 | 16 | 17 | 19 | 19 | 16 | 13 | 15 | 11 | 12 | 21 | 31 | 35 | 39 | 31 | 27 | 14 | 15 | 20 | 37 | 37 | 18 |
| 24 | 11 | 28 | 25 | 22 | 20 | 18 | 17 | 17 | 16 | 16 | 16 | 17 | 19 | 18 | 18 | 16 | 11 | 11 | 15 | 23 | 29 | 34 | 38 | 40 | 37 | 29 | 23 | 15 | 19 | 24 | 17 | 12 |
| 25 | 10 | 13 | 31 | 30 | 18 | 18 | 17 | 16 | 16 | 17 | 18 | 19 | 18 | 17 | 16 | 14 | 14 | 14 | 26 | 34 | 35 | 31 | 37 | 38 | 37 | 35 | 29 | 26 | 36 | 24 | 17 | 14 |
| 26 | 10 | 10 | 17 | 20 | 21 | 17 | 16 | 16 | 17 | 18 | 18 | 17 | 16 | 15 | 19 | 23 | 24 | 14 | 19 | 24 | 20 | 28 | 40 | 42 | 38 | 39 | 32 | 35 | 40 | 32 | 24 | 16 |
| 27 | 10 | 11 | 11 | 16 | 18 | 16 | 16 | 17 | 18 | 17 | 16 | 14 | 14 | 25 | 39 | 35 | 24 | 18 | 12 | 25 | 28 | 38 | 40 | 39 | 39 | 40 | 37 | 30 | 28 | 29 | 29 | 21 |
| 28 | 10 | 10 | 11 | 15 | 17 | 17 | 18 | 18 | 18 | 15 | 13 | 13 | 20 | 29 | 37 | 29 | 25 | 19 | 19 | 16 | 28 | 42 | 35 | 37 | 39 | 38 | 38 | 35 | 34 | 32 | 28 | 28 |
| 29 | 11 | 11 | 11 | 12 | 16 | 18 | 18 | 17 | 16 | 13 | 16 | 20 | 23 | 28 | 31 | 31 | 29 | 22 | 22 | 13 | 21 | 30 | 40 | 36 | 35 | 35 | 35 | 36 | 36 | 36 | 33 | 29 |
| 30 | 11 | 11 | 11 | 11 | 11 | 13 | 17 | 16 | 15 | 22 | 29 | 23 | 25 | 31 | 32 | 30 | 27 | 21 | 16 | 15 | 12 | 22 | 31 | 32 | 31 | 35 | 34 | 36 | 37 | 37 | 35 | 27 |
| 31 | 11 | 11 | 11 | 11 | 11 | 11 | 14 | 15 | 25 | 31 | 27 | 26 | 31 | 31 | 29 | 25 | 17 | 15 | 16 | 16 | 15 | 14 | 25 | 16 | 31 | 33 | 37 | 36 | 36 | 33 | 37 | 33 |

Fig. 5

(a) 1221: MULTI-VIEWPOINT IMAGE (0005) (REFERENCE IMAGE)

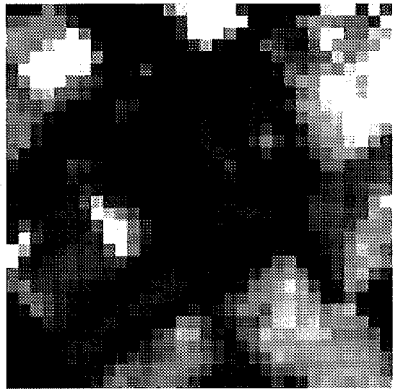

(b) 1231: SENSOR POSITION INFORMATION (0005)
(IMAGING DEVICE CONDITION INFORMATION)

| | X = 0 | 1 | 2 | ... | 30 | 31 |
|---|---|---|---|---|---|---|
| Y = 0 | -4494725.5<br>3816907.84<br>4147212.54 | -4494726.2<br>3816907.35<br>4147212.22 | -4494727.0<br>3816906.85<br>4147211.9 | ... | -4494730.6<br>3816904.36<br>4147210.31 | -4494747.8<br>3816892.43<br>4147202.67 |
| ... | ... | ... | ... | | ... | ... |
| 31 | -4494725.5<br>3816907.84<br>4147212.54 | -4494726.2<br>3816907.35<br>4147212.22 | -4494727.0<br>3816906.85<br>4147211.9 | ... | -4494730.6<br>3816904.36<br>4147210.31 | -4494747.8<br>3816892.43<br>4147202.67 |

(c) 1232: SENSOR VECTOR INFORMATION (0005)
(IMAGING DEVICE CONDITION INFORMATION)

| | X = 0 | 1 | 2 | ... | 30 | 31 |
|---|---|---|---|---|---|---|
| Y = 0 | 0.62227723<br>-0.5284852<br>-0.5774725 | 0.62227723<br>-0.5284852<br>-0.5774725 | 0.62227723<br>-0.5284852<br>-0.5774725 | ... | 0.62227723<br>-0.5284852<br>-0.5774725 | 0.62227723<br>-0.5284852<br>-0.5774725 |
| 1 | 0.62227705<br>-0.5284844<br>-0.5774734 | 0.62227705<br>-0.5284844<br>-0.5774734 | 0.62227705<br>-0.5284844<br>-0.5774734 | ... | 0.62227705<br>-0.5284844<br>-0.5774734 | 0.62227705<br>-0.5284844<br>-0.5774734 |
| ... | ... | ... | ... | | ... | ... |
| 31 | 0.62227158<br>-0.5284612<br>-0.5775005 | 0.62227158<br>-0.5284612<br>-0.5775005 | 0.62227158<br>-0.5284612<br>-0.5775005 | ... | 0.62227158<br>-0.5284612<br>-0.5775005 | 0.62227158<br>-0.5284612<br>-0.5775005 |

Fig. 6

1222: MULTI-VIEWPOINT IMAGE DATA (0004)
(BASE IMAGE (SUBJECT IMAGE))

|    | 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|----|----|----|----|----|----|----|----|----|----|----|----|----|----|----|----|----|
| 0  | 13 | 15 | 18 | 31 | 22 | 12 | 12 | 11 | 12 | 12 | 11 | 10 | 10 | 32 | 42 | 69 | 78 | 78 | 74 | 21 | 15 | 15 | 15 | 15 | 14 | 15 | 43 | 47 | 42 | 20 | 43 | 25 |
| 1  | 14 | 14 | 30 | 33 | 29 | 14 | 12 | 11 | 12 | 12 | 12 | 11 | 10 | 17 | 41 | 67 | 77 | 77 | 76 | 44 | 15 | 15 | 15 | 14 | 16 | 24 | 32 | 29 | 29 | 26 | 27 | 36 |
| 2  | 30 | 33 | 33 | 33 | 32 | 25 | 14 | 11 | 12 | 12 | 11 | 11 | 10 | 11 | 50 | 75 | 76 | 76 | 67 | 28 | 17 | 14 | 14 | 17 | 26 | 36 | 33 | 32 | 29 | 28 | 28 | 43 |
| 3  | 34 | 34 | 32 | 31 | 37 | 50 | 43 | 12 | 11 | 12 | 12 | 11 | 10 | 10 | 33 | 55 | 67 | 44 | 23 | 16 | 17 | 21 | 23 | 18 | 19 | 31 | 52 | 45 | 27 | 33 | 37 | 39 |
| 4  | 33 | 32 | 32 | 51 | 56 | 59 | 64 | 19 | 10 | 11 | 12 | 12 | 11 | 11 | 12 | 32 | 31 | 16 | 15 | 15 | 13 | 27 | 24 | 19 | 15 | 38 | 42 | 32 | 38 | 29 | 36 | 44 |
| 5  | 30 | 38 | 53 | 54 | 58 | 64 | 63 | 20 | 10 | 11 | 13 | 18 | 15 | 11 | 10 | 14 | 15 | 15 | 16 | 16 | 12 | 13 | 26 | 23 | 24 | 23 | 35 | 35 | 31 | 40 | 42 | 44 |
| 6  | 23 | 44 | 49 | 60 | 61 | 55 | 35 | 21 | 11 | 15 | 25 | 21 | 14 | 10 | 10 | 11 | 14 | 15 | 15 | 17 | 14 | 12 | 18 | 28 | 24 | 36 | 34 | 34 | 42 | 44 | 44 | 44 |
| 7  | 24 | 29 | 45 | 60 | 42 | 27 | 26 | 19 | 13 | 14 | 17 | 15 | 11 | 11 | 10 | 12 | 12 | 15 | 15 | 16 | 16 | 13 | 13 | 27 | 35 | 36 | 48 | 43 | 42 | 34 | 44 | 46 |
| 8  | 27 | 23 | 39 | 36 | 26 | 25 | 20 | 13 | 15 | 17 | 18 | 13 | 12 | 11 | 10 | 11 | 13 | 14 | 15 | 16 | 17 | 16 | 15 | 18 | 31 | 38 | 48 | 44 | 44 | 43 | 47 | 47 |
| 9  | 30 | 26 | 25 | 30 | 15 | 12 | 10 | 13 | 16 | 23 | 20 | 15 | 13 | 12 | 12 | 13 | 17 | 14 | 14 | 17 | 18 | 18 | 17 | 21 | 35 | 38 | 40 | 44 | 46 | 47 | 46 | 44 |
| 10 | 32 | 31 | 26 | 14 | 11 | 11 | 11 | 12 | 16 | 18 | 16 | 15 | 15 | 14 | 14 | 15 | 18 | 16 | 12 | 16 | 18 | 18 | 15 | 13 | 28 | 37 | 37 | 39 | 47 | 45 | 43 | 37 |
| 11 | 28 | 29 | 20 | 11 | 11 | 11 | 11 | 13 | 13 | 12 | 12 | 12 | 14 | 14 | 14 | 15 | 18 | 16 | 15 | 12 | 19 | 27 | 17 | 12 | 21 | 32 | 37 | 37 | 46 | 44 | 40 | 34 |
| 12 | 28 | 33 | 16 | 12 | 11 | 10 | 11 | 12 | 12 | 12 | 13 | 14 | 14 | 14 | 15 | 15 | 18 | 16 | 16 | 13 | 23 | 32 | 17 | 10 | 19 | 26 | 34 | 36 | 40 | 47 | 29 | 19 |
| 13 | 29 | 18 | 13 | 12 | 10 | 12 | 15 | 16 | 12 | 13 | 16 | 16 | 15 | 15 | 15 | 16 | 17 | 20 | 18 | 15 | 13 | 12 | 10 | 11 | 12 | 24 | 29 | 34 | 32 | 24 | 21 | 21 |
| 14 | 18 | 15 | 17 | 15 | 14 | 25 | 21 | 17 | 15 | 12 | 13 | 14 | 14 | 15 | 15 | 17 | 17 | 16 | 24 | 16 | 14 | 10 | 10 | 10 | 15 | 25 | 24 | 20 | 21 | 22 | 22 |    |
| 15 | 14 | 14 | 12 | 13 | 13 | 17 | 16 | 15 | 14 | 13 | 12 | 13 | 13 | 13 | 14 | 15 | 16 | 17 | 16 | 15 | 13 | 10 | 10 | 10 | 11 | 18 | 21 | 21 | 21 | 21 | 25 |    |
| 16 | 15 | 12 | 11 | 11 | 13 | 16 | 22 | 22 | 15 | 14 | 12 | 12 | 13 | 13 | 13 | 13 | 14 | 16 | 16 | 16 | 15 | 14 | 12 | 12 | 14 | 18 | 21 | 21 | 20 | 23 | 28 | 33 |
| 17 | 16 | 11 | 11 | 14 | 17 | 18 | 25 | 44 | 21 | 21 | 17 | 11 | 13 | 13 | 13 | 13 | 18 | 19 | 18 | 16 | 14 | 12 | 13 | 18 | 22 | 23 | 22 | 19 | 21 | 40 | 37 |    |
| 18 | 14 | 12 | 15 | 17 | 18 | 18 | 19 | 42 | 47 | 31 | 25 | 14 | 12 | 13 | 13 | 14 | 14 | 18 | 16 | 17 | 18 | 16 | 13 | 17 | 21 | 22 | 22 | 22 | 24 | 31 | 32 |    |
| 19 | 12 | 26 | 24 | 17 | 17 | 18 | 18 | 24 | 54 | 46 | 31 | 21 | 12 | 12 | 13 | 14 | 15 | 17 | 16 | 16 | 15 | 16 | 14 | 11 | 16 | 20 | 21 | 22 | 25 | 34 | 34 | 34 |
| 20 | 22 | 44 | 23 | 16 | 18 | 18 | 19 | 20 | 48 | 61 | 33 | 22 | 14 | 11 | 13 | 13 | 16 | 16 | 16 | 15 | 16 | 14 | 10 | 10 | 14 | 17 | 21 | 21 | 29 | 38 | 35 | 24 |
| 21 | 48 | 32 | 17 | 16 | 19 | 21 | 21 | 20 | 28 | 59 | 26 | 16 | 16 | 14 | 12 | 13 | 16 | 15 | 15 | 16 | 13 | 12 | 15 | 23 | 11 | 14 | 19 | 21 | 32 | 37 | 40 | 28 |
| 22 | 58 | 18 | 17 | 19 | 21 | 22 | 21 | 21 | 21 | 20 | 17 | 16 | 16 | 16 | 13 | 13 | 15 | 15 | 16 | 13 | 11 | 16 | 20 | 29 | 25 | 13 | 16 | 22 | 34 | 36 | 37 | 29 |
| 23 | 27 | 22 | 21 | 20 | 22 | 21 | 20 | 18 | 17 | 16 | 16 | 16 | 17 | 18 | 17 | 12 | 18 | 12 | 11 | 11 | 19 | 26 | 32 | 37 | 30 | 16 | 15 | 21 | 35 | 40 | 22 | 5  |
| 24 | 29 | 30 | 22 | 21 | 20 | 19 | 17 | 17 | 16 | 16 | 16 | 17 | 19 | 19 | 18 | 13 | 11 | 11 | 13 | 18 | 26 | 33 | 38 | 41 | 35 | 28 | 14 | 15 | 22 | 19 | 11 | 2  |
| 25 | 14 | 28 | 29 | 23 | 18 | 17 | 17 | 16 | 16 | 17 | 18 | 19 | 18 | 17 | 16 | 13 | 11 | 19 | 24 | 27 | 36 | 33 | 37 | 38 | 38 | 32 | 27 | 20 | 29 | 14 | 13 | 2  |
| 26 | 11 | 17 | 31 | 22 | 20 | 17 | 16 | 16 | 17 | 18 | 18 | 17 | 16 | 15 | 15 | 18 | 18 | 21 | 23 | 28 | 25 | 26 | 39 | 41 | 38 | 38 | 30 | 36 | 40 | 23 | 15 | 5  |
| 27 | 11 | 12 | 15 | 21 | 18 | 16 | 16 | 17 | 18 | 17 | 16 | 15 | 15 | 17 | 28 | 34 | 23 | 12 | 22 | 22 | 24 | 35 | 41 | 40 | 39 | 40 | 34 | 32 | 31 | 32 | 20 | 4  |
| 28 | 11 | 11 | 12 | 15 | 17 | 16 | 18 | 18 | 17 | 15 | 13 | 13 | 18 | 26 | 39 | 33 | 22 | 20 | 14 | 27 | 28 | 41 | 37 | 37 | 40 | 40 | 38 | 32 | 32 | 29 | 28 | 8  |
| 29 | 10 | 11 | 13 | 14 | 17 | 18 | 18 | 17 | 15 | 13 | 14 | 19 | 23 | 26 | 33 | 29 | 24 | 20 | 18 | 23 | 31 | 34 | 39 | 37 | 36 | 36 | 36 | 35 | 34 | 31 | 29 |    |
| 30 | 11 | 11 | 11 | 13 | 14 | 18 | 16 | 16 | 14 | 17 | 25 | 21 | 24 | 30 | 32 | 31 | 28 | 22 | 18 | 14 | 16 | 27 | 37 | 33 | 33 | 35 | 35 | 36 | 37 | 36 | 32 | 26 |
| 31 | 11 | 11 | 11 | 11 | 11 | 15 | 16 | 16 | 20 | 30 | 26 | 26 | 30 | 31 | 30 | 27 | 21 | 16 | 16 | 16 | 13 | 21 | 26 | 23 | 29 | 35 | 36 | 37 | 36 | 36 | 34 | 25 |

Fig. 8

1222: MULTI-VIEWPOINT IMAGE DATA (0003)  (REFERENCE IMAGE)

|    | 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|----|----|----|----|----|----|----|----|----|----|----|----|----|----|----|----|----|
| 0  | 13 | 13 | 18 | 31 | 17 | 12 | 12 | 11 | 12 | 11 | 11 | 10 | 29 | 51 | 77 | 78 | 78 | 77 | 37 | 15 | 15 | 15 | 15 | 15 | 14 | 25 | 52 | 40 | 22 | 30 | 41 | 26 |
| 1  | 24 | 32 | 33 | 33 | 30 | 17 | 12 | 11 | 12 | 12 | 11 | 10 | 11 | 43 | 76 | 77 | 77 | 77 | 69 | 32 | 16 | 14 | 14 | 21 | 36 | 32 | 29 | 28 | 28 | 23 | 26 | 43 |
| 2  | 34 | 33 | 33 | 32 | 34 | 42 | 14 | 11 | 12 | 12 | 11 | 11 | 10 | 18 | 62 | 66 | 75 | 56 | 38 | 19 | 18 | 15 | 21 | 29 | 35 | 45 | 39 | 28 | 27 | 31 | 41 | 44 |
| 3  | 33 | 31 | 32 | 42 | 54 | 65 | 24 | 11 | 11 | 12 | 12 | 11 | 11 | 10 | 15 | 49 | 48 | 23 | 16 | 16 | 14 | 27 | 19 | 14 | 49 | 50 | 42 | 29 | 35 | 34 | 32 | 42 |
| 4  | 32 | 38 | 53 | 54 | 55 | 66 | 60 | 16 | 10 | 11 | 12 | 13 | 14 | 13 | 11 | 13 | 19 | 15 | 15 | 15 | 12 | 18 | 22 | 21 | 23 | 29 | 28 | 41 | 40 | 31 | 42 | 43 |
| 5  | 44 | 51 | 52 | 59 | 61 | 61 | 44 | 21 | 11 | 12 | 20 | 26 | 24 | 16 | 12 | 10 | 14 | 15 | 15 | 17 | 13 | 12 | 25 | 25 | 24 | 32 | 39 | 35 | 34 | 42 | 44 | 43 |
| 6  | 24 | 41 | 58 | 60 | 52 | 31 | 29 | 25 | 17 | 11 | 15 | 20 | 18 | 15 | 11 | 10 | 11 | 15 | 15 | 16 | 16 | 12 | 13 | 80 | 36 | 36 | 39 | 41 | 42 | 41 | 44 | 45 |
| 7  | 25 | 39 | 52 | 40 | 26 | 28 | 26 | 20 | 14 | 14 | 14 | 16 | 17 | 14 | 12 | 11 | 10 | 13 | 15 | 15 | 17 | 15 | 14 | 16 | 27 | 36 | 49 | 47 | 43 | 41 | 41 | 46 |
| 8  | 26 | 25 | 29 | 32 | 31 | 24 | 20 | 12 | 13 | 15 | 19 | 21 | 20 | 18 | 13 | 12 | 13 | 15 | 13 | 16 | 18 | 18 | 17 | 17 | 30 | 37 | 39 | 46 | 45 | 45 | 46 | 47 |
| 9  | 30 | 25 | 25 | 27 | 21 | 17 | 12 | 11 | 12 | 13 | 16 | 22 | 20 | 15 | 13 | 14 | 17 | 17 | 13 | 15 | 18 | 18 | 18 | 16 | 17 | 35 | 38 | 38 | 44 | 47 | 47 | 45 |
| 10 | 30 | 30 | 26 | 20 | 15 | 11 | 11 | 11 | 13 | 13 | 13 | 13 | 13 | 15 | 14 | 15 | 18 | 16 | 15 | 12 | 16 | 18 | 23 | 16 | 10 | 21 | 36 | 37 | 41 | 46 | 43 | 42 |
| 11 | 28 | 34 | 35 | 24 | 13 | 12 | 11 | 11 | 12 | 14 | 12 | 12 | 14 | 14 | 15 | 15 | 18 | 16 | 16 | 14 | 12 | 24 | 32 | 26 | 11 | 19 | 27 | 36 | 37 | 46 | 48 | 39 |
| 12 | 31 | 29 | 19 | 13 | 13 | 12 | 10 | 11 | 13 | 13 | 13 | 15 | 15 | 14 | 15 | 16 | 17 | 18 | 19 | 16 | 13 | 14 | 26 | 16 | 11 | 13 | 28 | 30 | 36 | 36 | 35 | 22 |
| 13 | 22 | 16 | 13 | 15 | 16 | 14 | 12 | 22 | 19 | 16 | 14 | 15 | 15 | 16 | 16 | 18 | 17 | 17 | 20 | 17 | 15 | 13 | 12 | 11 | 10 | 11 | 15 | 27 | 30 | 24 | 20 | 22 |
| 14 | 13 | 15 | 15 | 14 | 14 | 13 | 21 | 19 | 16 | 14 | 11 | 13 | 13 | 13 | 14 | 14 | 17 | 16 | 19 | 17 | 15 | 15 | 13 | 10 | 10 | 10 | 11 | 16 | 20 | 21 | 21 | 22 |
| 15 | 12 | 12 | 14 | 11 | 12 | 12 | 16 | 19 | 15 | 14 | 13 | 11 | 13 | 13 | 13 | 13 | 14 | 16 | 16 | 16 | 15 | 15 | 14 | 11 | 12 | 12 | 14 | 19 | 21 | 21 | 20 | 26 |
| 16 | 16 | 16 | 14 | 11 | 13 | 17 | 23 | 35 | 23 | 17 | 17 | 13 | 12 | 13 | 13 | 13 | 13 | 17 | 17 | 17 | 17 | 16 | 15 | 14 | 12 | 13 | 16 | 21 | 22 | 22 | 19 | 23 | 36 |

(Note: row 16 trailing values as read: 16 16 14 11 13 17 23 35 23 17 17 13 12 13 13 13 13 17 17 17 17 16 15 14 12 13 16 21 22 22 19 23 36)

| 17 | 19 | 19 | 14 | 13 | 18 | 18 | 21 | 45 | 46 | 33 | 27 | 22 | 12 | 13 | 13 | 13 | 14 | 16 | 18 | 18 | 19 | 19 | 17 | 14 | 13 | 17 | 21 | 22 | 22 | 22 | 21 | 41 |
| 18 | 13 | 13 | 19 | 18 | 17 | 18 | 18 | 29 | 50 | 54 | 41 | 31 | 24 | 11 | 13 | 14 | 14 | 16 | 17 | 16 | 16 | 16 | 16 | 13 | 12 | 19 | 21 | 22 | 22 | 30 | 34 |
| 19 | 14 | 33 | 32 | 17 | 17 | 18 | 19 | 21 | 35 | 61 | 52 | 28 | 27 | 16 | 12 | 13 | 14 | 17 | 16 | 16 | 15 | 15 | 15 | 16 | 12 | 10 | 14 | 20 | 21 | 23 | 37 | 35 |
| 20 | 42 | 42 | 18 | 16 | 17 | 20 | 20 | 20 | 23 | 56 | 64 | 31 | 17 | 15 | 12 | 12 | 13 | 16 | 15 | 15 | 15 | 17 | 15 | 13 | 12 | 14 | 11 | 16 | 21 | 24 | 40 | 40 |
| 21 | 54 | 21 | 16 | 18 | 21 | 22 | 22 | 21 | 21 | 24 | 28 | 17 | 16 | 16 | 16 | 16 | 15 | 16 | 18 | 13 | 12 | 22 | 29 | 26 | 15 | 12 | 19 | 24 | 37 | 36 |
| 22 | 36 | 18 | 19 | 20 | 21 | 22 | 22 | 21 | 20 | 18 | 17 | 17 | 17 | 17 | 18 | 17 | 12 | 16 | 16 | 15 | 13 | 12 | 15 | 31 | 32 | 28 | 26 | 22 | 13 | 15 | 25 | 37 | 29 |
| 23 | 13 | 30 | 21 | 21 | 21 | 20 | 20 | 18 | 17 | 16 | 16 | 16 | 17 | 19 | 19 | 18 | 15 | 13 | 13 | 11 | 18 | 33 | 38 | 40 | 32 | 28 | 25 | 14 | 14 | 22 | 38 | 35 |
| 24 | 11 | 25 | 26 | 23 | 21 | 18 | 17 | 17 | 16 | 16 | 16 | 17 | 19 | 18 | 18 | 18 | 16 | 11 | 11 | 23 | 31 | 35 | 38 | 40 | 37 | 29 | 28 | 18 | 21 | 22 | 21 | 15 |
| 25 | 10 | 10 | 18 | 36 | 22 | 18 | 17 | 16 | 16 | 16 | 18 | 19 | 18 | 17 | 17 | 16 | 14 | 16 | 25 | 40 | 26 | 33 | 38 | 39 | 37 | 37 | 30 | 29 | 36 | 34 | 25 | 19 |
| 26 | 10 | 10 | 10 | 17 | 21 | 18 | 16 | 16 | 17 | 18 | 18 | 17 | 16 | 15 | 16 | 26 | 26 | 20 | 19 | 21 | 21 | 32 | 40 | 42 | 38 | 40 | 34 | 31 | 39 | 35 | 34 | 30 |
| 27 | 10 | 10 | 11 | 11 | 17 | 16 | 16 | 17 | 18 | 18 | 17 | 15 | 13 | 33 | 40 | 35 | 26 | 19 | 13 | 26 | 29 | 39 | 39 | 39 | 38 | 40 | 38 | 32 | 28 | 29 | 28 | 29 |
| 28 | 10 | 10 | 10 | 10 | 12 | 17 | 18 | 18 | 18 | 18 | 15 | 12 | 21 | 33 | 33 | 28 | 27 | 19 | 24 | 15 | 28 | 40 | 36 | 37 | 38 | 38 | 37 | 36 | 35 | 34 | 31 | 30 |
| 29 | 11 | 11 | 11 | 11 | 11 | 15 | 18 | 17 | 16 | 13 | 15 | 21 | 23 | 29 | 31 | 31 | 31 | 25 | 23 | 14 | 15 | 27 | 38 | 36 | 34 | 35 | 35 | 36 | 36 | 36 | 35 | 30 |
| 30 | 11 | 11 | 11 | 11 | 11 | 11 | 11 | 16 | 16 | 23 | 29 | 25 | 25 | 30 | 32 | 30 | 27 | 21 | 16 | 16 | 14 | 19 | 28 | 30 | 30 | 35 | 34 | 36 | 36 | 37 | 37 | 31 |
| 31 | 12 | 12 | 11 | 11 | 11 | 11 | 11 | 12 | 18 | 31 | 28 | 25 | 31 | 32 | 30 | 27 | 16 | 15 | 16 | 16 | 15 | 12 | 20 | 16 | 31 | 32 | 37 | 36 | 36 | 32 | 38 | 36 |

Fig. 10

OPTICAL FLOW (OF0004to0005X)

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | 2 | 4 | 3 | 5 | 5 | 1 | 2 | 3 | 3 | 3 | 4 | 4 | 3 | 3 | 8 | 9 | 7 | 10 | 7 | 5 | 2 | 1 | 0 | 1 | 1 | 1 | 1 | 0 | 7 | 4 | 3 | 3 |
| 1 | 3 | 6 | 6 | 5 | 4 | 3 | 4 | 3 | 3 | 3 | 3 | 3 | 3 | 6 | 9 | 7 | 9 | 5 | 5 | 1 | 1 | 1 | 1 | 3 | 7 | 8 | 8 | 8 | 6 | 3 | 3 | 2 |
| 2 | 6 | 5 | 5 | 4 | 4 | 4 | 4 | 3 | 3 | 3 | 2 | 2 | 2 | 2 | 1 | 3 | 1 | 3 | 3 | 0 | 1 | 0 | 1 | 4 | 6 | 6 | 8 | 9 | 11 | 6 | 0 | 3 |
| 3 | 5 | 5 | 4 | 3 | 3 | 5 | 5 | 4 | 2 | 2 | 2 | 2 | 2 | 1 | 2 | 4 | 2 | 1 | 0 | 0 | 1 | 2 | 3 | 4 | 5 | 6 | 6 | 6 | 3 | 1 | 2 | 3 |
| 4 | 5 | 4 | 4 | 2 | 3 | 5 | 4 | 2 | 0 | 1 | 1 | 1 | 0 | 1 | 1 | 0 | 0 | 0 | 0 | 0 | 0 | 2 | 3 | 4 | 3 | 3 | 4 | 2 | 3 | 3 | 1 | 1 |
| 5 | 4 | 3 | 2 | 2 | 0 | 4 | 1 | 2 | 4 | 0 | 1 | 2 | 4 | 7 | 5 | 3 | 0 | 0 | 1 | 0 | 0 | 0 | 1 | 2 | 2 | 3 | 1 | 3 | 2 | 2 | 0 | 0 |
| 6 | 4 | 3 | 4 | 1 | 2 | 1 | 3 | 0 | 10 | 5 | 3 | 7 | 7 | 10 | 11 | 5 | 1 | 0 | 0 | 0 | 0 | 1 | 0 | 0 | 3 | 0 | 2 | 2 | 2 | 1 | 1 | 1 |
| 7 | 2 | 3 | 5 | 1 | 0 | 3 | 2 | 4 | 6 | 8 | 7 | 11 | 12 | 12 | 13 | 12 | 3 | 1 | 1 | 0 | 0 | 1 | 1 | 1 | 1 | 1 | 2 | 2 | 2 | 2 | 2 | 2 |
| 8 | 1 | 2 | 3 | 1 | 3 | 4 | 3 | 3 | 3 | 12 | 13 | 13 | 13 | 13 | 8 | 5 | 1 | 2 | 2 | 1 | 1 | 2 | 2 | 3 | 3 | 3 | 2 | 3 | 3 | 3 | 3 | 2 |
| 9 | 0 | 0 | 1 | 5 | 10 | 6 | 4 | 6 | 9 | 13 | 13 | 13 | 9 | 6 | 1 | 1 | 1 | 1 | 2 | 2 | 2 | 3 | 3 | 4 | 3 | 3 | 3 | 3 | 3 | 4 | 5 | 4 |
| 10 | 3 | 4 | 3 | 10 | 9 | 5 | 5 | 9 | 12 | 13 | 10 | 7 | 5 | 1 | 1 | 1 | 0 | 1 | 3 | 3 | 4 | 4 | 5 | 5 | 5 | 4 | 4 | 3 | 4 | 4 | 5 | 6 |
| 11 | 5 | 3 | 4 | 10 | 11 | 7 | 5 | 8 | 12 | 13 | 10 | 1 | 1 | 1 | 1 | 0 | 0 | 0 | 2 | 3 | 4 | 5 | 6 | 8 | 6 | 5 | 4 | 4 | 3 | 4 | 5 | 6 |
| 12 | 3 | 6 | 6 | 10 | 10 | 8 | 6 | 6 | 7 | 7 | 1 | 1 | 1 | 0 | 0 | 0 | 0 | 0 | 2 | 3 | 6 | 6 | 8 | 6 | 5 | 6 | 5 | 5 | 4 | 5 | 6 | 6 |
| 13 | 2 | 3 | 8 | 12 | 11 | 8 | 8 | 7 | 8 | 3 | 1 | 1 | 1 | 0 | 0 | 1 | 1 | 0 | 2 | 3 | 5 | 13 | 8 | 6 | 6 | 6 | 6 | 5 | 6 | 6 | 6 | 5 |
| 14 | 2 | 3 | 7 | 7 | 7 | 8 | 8 | 6 | 2 | 3 | 2 | 2 | 1 | 1 | 0 | 0 | 1 | 0 | 1 | 3 | 4 | 8 | 8 | 5 | 6 | 6 | 7 | 6 | 6 | 6 | 5 | 4 |
| 15 | 6 | 5 | 4 | 4 | 6 | 6 | 6 | 4 | 2 | 2 | 4 | 3 | 2 | 1 | 1 | 0 | 0 | 0 | 1 | 2 | 3 | 3 | 4 | 4 | 4 | 6 | 6 | 6 | 6 | 6 | 3 | 3 |
| 16 | 10 | 9 | 6 | 4 | 4 | 1 | 1 | 1 | 3 | 4 | 4 | 3 | 3 | 2 | 2 | 1 | 1 | 0 | 1 | 2 | 3 | 4 | 4 | 3 | 5 | 6 | 6 | 5 | 5 | 4 | 2 | 3 |
| 17 | 10 | 10 | 6 | 4 | 2 | 1 | 1 | 0 | 3 | 3 | 5 | 4 | 4 | 3 | 3 | 2 | 2 | 1 | 1 | 2 | 3 | 5 | 5 | 4 | 6 | 7 | 6 | 6 | 5 | 5 | 5 | 7 |
| 18 | 9 | 6 | 5 | 1 | 1 | 1 | 0 | 0 | 3 | 5 | 6 | 6 | 5 | 4 | 3 | 3 | 2 | 2 | 2 | 3 | 4 | 5 | 6 | 7 | 7 | 7 | 7 | 6 | 6 | 5 | 2 | 7 |
| 19 | 5 | 3 | 2 | 1 | 1 | 0 | 0 | 0 | 3 | 4 | 6 | 7 | 7 | 5 | 4 | 4 | 3 | 3 | 3 | 4 | 5 | 6 | 8 | 13 | 10 | 7 | 8 | 7 | 7 | 9 | 3 | 3 |
| 20 | 0 | 0 | 1 | 1 | 0 | 0 | 0 | 0 | 4 | 6 | 4 | 5 | 4 | 5 | 5 | 5 | 4 | 4 | 4 | 6 | 6 | 8 | 12 | 10 | 13 | 9 | 8 | 8 | 7 | 8 | 8 | 8 |
| 21 | 0 | 1 | 0 | 0 | 0 | 1 | 2 | 3 | 5 | 4 | 4 | 4 | 4 | 4 | 5 | 5 | 5 | 5 | 6 | 7 | 13 | 7 | 6 | 6 | 8 | 10 | 8 | 8 | 7 | 0 | 1 | 7 |
| 22 | 0 | 0 | 0 | 0 | 0 | 2 | 4 | 4 | 4 | 4 | 4 | 4 | 3 | 3 | 5 | 6 | 6 | 6 | 7 | 7 | 7 | 5 | 2 | 1 | 3 | 13 | 10 | 9 | 10 | 7 | 11 | 7 |
| 23 | 6 | 0 | 1 | 0 | 1 | 3 | 4 | 4 | 4 | 4 | 4 | 3 | 3 | 3 | 5 | 6 | 7 | 11 | 5 | 2 | 3 | 1 | 1 | 1 | 1 | 1 | 6 | 13 | 9 | 9 | 10 | 12 | 12 |
| 24 | 7 | 3 | 2 | 2 | 3 | 4 | 4 | 4 | 4 | 3 | 3 | 3 | 3 | 7 | 7 | 7 | 5 | 3 | 1 | 2 | 1 | 1 | 1 | 1 | 0 | 0 | 9 | 1 | 4 | 13 | 13 | 13 |
| 25 | 7 | 6 | 2 | 4 | 4 | 4 | 4 | 4 | 4 | 3 | 3 | 3 | 4 | 6 | 7 | 6 | 4 | 0 | 1 | 3 | 1 | 0 | 0 | 0 | 0 | 0 | 3 | 3 | 13 | 13 | 13 | 13 |
| 26 | 10 | 7 | 6 | 4 | 4 | 4 | 4 | 3 | 4 | 5 | 6 | 6 | 4 | 2 | 4 | 1 | 4 | 7 | 1 | 3 | 1 | 0 | 0 | 0 | 0 | 1 | 1 | 1 | 2 | 7 | 12 | 11 |
| 27 | 12 | 9 | 8 | 5 | 4 | 4 | 3 | 3 | 6 | 6 | 6 | 6 | 7 | 1 | 3 | 3 | 2 | 4 | 6 | 3 | 0 | 0 | 0 | 1 | 1 | 1 | 1 | 1 | 2 | 2 | 8 | 12 |
| 28 | 12 | 12 | 4 | 1 | 3 | 2 | 4 | 5 | 6 | 6 | 6 | 5 | 2 | 2 | 3 | 0 | 3 | 2 | 6 | 5 | 0 | 1 | 1 | 1 | 1 | 1 | 2 | 2 | 2 | 3 | 3 | 11 |
| 29 | 12 | 13 | 11 | 4 | 1 | 2 | 6 | 6 | 6 | 7 | 4 | 3 | 0 | 2 | 3 | 1 | 4 | 3 | 3 | 8 | 5 | 0 | 0 | 1 | 1 | 2 | 2 | 2 | 3 | 3 | 3 | 5 |
| 30 | 12 | 12 | 10 | 8 | 7 | 6 | 6 | 3 | 3 | 1 | 3 | 2 | 1 | 1 | 2 | 2 | 2 | 3 | 0 | 0 | 2 | 2 | 1 | 1 | 0 | 2 | 2 | 3 | 3 | 3 | 4 | 4 |
| 31 | 13 | 12 | 11 | 11 | 9 | 9 | 4 | 3 | 0 | 1 | 2 | 2 | 2 | 2 | 2 | 2 | 2 | 0 | 0 | 0 | 1 | 3 | 0 | 3 | 3 | 2 | 3 | 3 | 3 | 4 | 4 | 4 |

Fig. 11

OPTICAL FLOW (OF00004to0005Y)

A 32×32 grid where every cell contains the value 4. The cell at row 7, column 13 is circled.

Fig. 12

OPTICAL FLOW (OF0005to0004X)

|    | 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|----|----|----|----|----|----|----|----|----|----|----|----|----|----|----|----|----|
| 0  | 14 | 1  | 11 | 10 | 4  | 1  | 11 | 8  | 8  | 8  | 8  | 8  | 7  | 15 | 16 | 17 | 15 | 8  | 10 | 6  | 2  | 1  | 1  | 1  | 2  | 2  | 5  | 4  | 7  | 8  | 6  | 0  |
| 1  | 1  | 11 | 11 | 9  | 8  | 2  | 2  | 6  | 7  | 7  | 7  | 6  | 6  | 7  | 15 | 21 | 17 | 14 | 11 | 8  | 2  | 1  | 1  | 2  | 9  | 16 | 14 | 16 | 19 | 10 | 7  | 3  |
| 2  | 12 | 10 | 9  | 8  | 8  | 7  | 1  | 4  | 5  | 5  | 5  | 5  | 5  | 4  | 9  | 10 | 5  | 6  | 4  | 0  | 2  | 0  | 2  | 6  | 15 | 15 | 15 | 20 | 18 | 9  | 5  | 2  |
| 3  | 10 | 9  | 7  | 7  | 5  | 7  | 8  | 2  | 2  | 3  | 3  | 3  | 3  | 2  | 1  | 8  | 2  | 1  | 0  | 0  | 2  | 2  | 6  | 11 | 10 | 13 | 11 | 15 | 7  | 1  | 3  | 5  |
| 4  | 10 | 8  | 7  | 0  | 2  | 9  | 7  | 1  | 3  | 1  | 2  | 2  | 0  | 4  | 6  | 2  | 0  | 0  | 0  | 0  | 1  | 3  | 6  | 8  | 6  | 7  | 9  | 4  | 1  | 5  | 3  | 4  |
| 5  | 8  | 7  | 0  | 1  | 1  | 4  | 0  | 4  | 4  | 5  | 1  | 3  | 8  | 11 | 13 | 8  | 1  | 0  | 1  | 1  | 0  | 1  | 4  | 6  | 3  | 3  | 1  | 7  | 4  | 0  | 1  | 4  |
| 6  | 7  | 7  | 5  | 3  | 0  | 1  | 3  | 3  | 8  | 17 | 8  | 10 | 14 | 16 | 19 | 19 | 8  | 1  | 0  | 1  | 0  | 1  | 0  | 2  | 1  | 0  | 5  | 5  | 4  | 5  | 7  | 4  |
| 7  | 1  | 8  | 7  | 3  | 0  | 7  | 6  | 5  | 7  | 16 | 18 | 16 | 20 | 23 | 25 | 25 | 15 | 3  | 2  | 1  | 1  | 2  | 2  | 2  | 4  | 3  | 4  | 3  | 2  | 3  | 6  | 5  |
| 8  | 1  | 2  | 6  | 4  | 7  | 10 | 11 | 7  | 6  | 14 | 23 | 25 | 25 | 25 | 23 | 17 | 6  | 3  | 3  | 3  | 3  | 3  | 5  | 6  | 6  | 5  | 4  | 3  | 5  | 4  | 7  | 8  |
| 9  | 1  | 2  | 1  | 6  | 16 | 18 | 13 | 9  | 9  | 16 | 24 | 25 | 25 | 19 | 9  | 3  | 2  | 3  | 5  | 5  | 5  | 5  | 7  | 8  | 7  | 6  | 6  | 6  | 7  | 8  | 9  | 8  |
| 10 | 11 | 3  | 3  | 15 | 19 | 15 | 10 | 9  | 14 | 22 | 25 | 22 | 10 | 4  | 2  | 1  | 1  | 2  | 4  | 6  | 7  | 8  | 9  | 11 | 13 | 8  | 7  | 7  | 6  | 9  | 10 | 12 |
| 11 | 12 | 0  | 10 | 15 | 20 | 17 | 12 | 11 | 15 | 22 | 23 | 12 | 2  | 2  | 1  | 1  | 0  | 1  | 3  | 6  | 9  | 10 | 12 | 15 | 15 | 10 | 9  | 8  | 7  | 8  | 9  | 11 |
| 12 | 4  | 4  | 12 | 12 | 17 | 19 | 15 | 11 | 13 | 13 | 6  | 2  | 1  | 1  | 0  | 1  | 1  | 1  | 3  | 6  | 10 | 12 | 14 | 17 | 14 | 11 | 11 | 10 | 9  | 8  | 11 | 12 |
| 13 | 8  | 9  | 16 | 19 | 22 | 22 | 17 | 15 | 15 | 11 | 3  | 2  | 1  | 0  | 1  | 2  | 1  | 0  | 3  | 5  | 8  | 13 | 19 | 19 | 13 | 12 | 12 | 11 | 11 | 11 | 12 | 11 |
| 14 | 5  | 7  | 14 | 19 | 18 | 16 | 16 | 15 | 9  | 5  | 6  | 4  | 2  | 1  | 0  | 1  | 1  | 0  | 2  | 5  | 6  | 10 | 14 | 13 | 13 | 13 | 12 | 12 | 12 | 12 | 11 | 9  |
| 15 | 18 | 12 | 14 | 9  | 10 | 10 | 8  | 6  | 4  | 5  | 7  | 6  | 4  | 3  | 2  | 1  | 0  | 0  | 2  | 3  | 5  | 8  | 11 | 8  | 8  | 10 | 12 | 12 | 11 | 11 | 8  | 6  |
| 16 | 13 | 14 | 17 | 9  | 7  | 4  | 3  | 5  | 7  | 9  | 10 | 11 | 6  | 5  | 4  | 3  | 1  | 1  | 1  | 3  | 5  | 7  | 9  | 6  | 7  | 12 | 12 | 11 | 11 | 9  | 5  | 6  |
| 17 | 15 | 18 | 19 | 8  | 2  | 2  | 1  | 4  | 7  | 7  | 10 | 14 | 10 | 7  | 6  | 4  | 3  | 2  | 2  | 4  | 6  | 8  | 10 | 9  | 10 | 13 | 13 | 12 | 10 | 9  | 7  | 8  |
| 18 | 16 | 17 | 8  | 2  | 2  | 1  | 1  | 0  | 4  | 7  | 10 | 14 | 14 | 8  | 7  | 6  | 5  | 4  | 4  | 5  | 7  | 9  | 11 | 13 | 16 | 15 | 15 | 14 | 12 | 11 | 9  | 5  |
| 19 | 13 | 5  | 2  | 2  | 1  | 0  | 0  | 1  | 3  | 8  | 10 | 12 | 14 | 11 | 9  | 8  | 6  | 6  | 6  | 7  | 9  | 11 | 15 | 20 | 23 | 19 | 15 | 15 | 14 | 14 | 13 | 9  |
| 20 | 5  | 2  | 1  | 1  | 0  | 1  | 1  | 3  | 4  | 7  | 10 | 9  | 9  | 10 | 12 | 10 | 8  | 8  | 8  | 10 | 12 | 16 | 21 | 22 | 23 | 23 | 17 | 16 | 15 | 13 | 13 | 2  |
| 21 | 5  | 1  | 1  | 0  | 1  | 5  | 5  | 4  | 5  | 8  | 9  | 8  | 8  | 8  | 14 | 13 | 10 | 10 | 10 | 14 | 20 | 24 | 15 | 8  | 13 | 19 | 21 | 18 | 16 | 5  | 7  | 0  |
| 22 | 4  | 1  | 0  | 1  | 3  | 7  | 9  | 7  | 8  | 9  | 8  | 7  | 6  | 8  | 14 | 12 | 13 | 17 | 21 | 21 | 13 | 1  | 1  | 2  | 12 | 22 | 22 | 17 | 11 | 11 | 14 | 21 |
| 23 | 9  | 3  | 2  | 7  | 4  | 6  | 9  | 9  | 8  | 8  | 7  | 7  | 6  | 5  | 9  | 15 | 17 | 18 | 21 | 13 | 6  | 1  | 2  | 2  | 1  | 5  | 16 | 24 | 20 | 18 | 21 | 24 |
| 24 | 15 | 8  | 3  | 5  | 9  | 11 | 10 | 8  | 8  | 7  | 7  | 6  | 6  | 6  | 12 | 15 | 15 | 14 | 8  | 1  | 3  | 2  | 2  | 1  | 1  | 0  | 2  | 10 | 14 | 16 | 25 | 26 |
| 25 | 19 | 14 | 7  | 6  | 7  | 6  | 9  | 8  | 7  | 6  | 7  | 9  | 14 | 17 | 9  | 7  | 9  | 8  | 2  | 6  | 5  | 1  | 1  | 0  | 0  | 1  | 1  | 5  | 6  | 12 | 25 | 26 |
| 26 | 16 | 19 | 15 | 11 | 7  | 7  | 7  | 7  | 9  | 12 | 15 | 15 | 14 | 4  | 1  | 4  | 4  | 6  | 0  | 0  | 1  | 0  | 0  | 1  | 2  | 2  | 2  | 3  | 6  | 18 | 24 |    |
| 27 | 19 | 20 | 17 | 12 | 7  | 7  | 7  | 6  | 9  | 14 | 12 | 12 | 12 | 3  | 6  | 3  | 4  | 4  | 8  | 7  | 1  | 0  | 1  | 1  | 1  | 2  | 3  | 3  | 3  | 4  | 8  | 21 |
| 28 | 23 | 24 | 19 | 2  | 0  | 6  | 6  | 8  | 11 | 12 | 12 | 11 | 1  | 5  | 5  | 0  | 5  | 4  | 6  | 12 | 3  | 0  | 1  | 2  | 2  | 3  | 3  | 4  | 5  | 6  | 5  | 12 |
| 29 | 24 | 24 | 24 | 6  | 9  | 14 | 10 | 11 | 13 | 13 | 11 | 4  | 0  | 3  | 0  | 5  | 7  | 7  | 6  | 10 | 11 | 3  | 1  | 2  | 3  | 3  | 4  | 5  | 5  | 6  | 6  | 7  |
| 30 | 26 | 24 | 24 | 20 | 20 | 18 | 9  | 11 | 13 | 7  | 4  | 4  | 1  | 2  | 5  | 4  | 5  | 7  | 3  | 1  | 5  | 8  | 2  | 1  | 2  | 4  | 4  | 5  | 5  | 6  | 8  | 7  |
| 31 | 23 | 25 | 25 | 23 | 22 | 21 | 9  | 14 | 9  | 1  | 4  | 4  | 4  | 5  | 3  | 2  | 5  | 1  | 0  | 0  | 1  | 2  | 1  | 6  | 3  | 4  | 5  | 6  | 6  | 7  | 8  | 9  |

Fig. 13

OPTICAL FLOW (OF0005to0004Y)

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|----|----|----|----|----|----|----|----|----|----|----|----|----|----|----|----|----|----|----|----|----|----|
| 0 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 1 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 2 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 3 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 6 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 7 | 4 | 4 | 4 | 4 | 4 | 4 | (4) | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 8 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 9 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 10 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 11 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 12 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 13 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 14 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 15 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 16 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 17 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 18 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 19 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 20 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 21 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 22 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 23 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 24 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 25 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 26 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 27 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 28 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 29 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 30 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 31 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |

Fig. 14

ALTITUDE VALUES (COMPUTED USING 0F0004to0005X/Y)

|    | 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|----|----|----|----|----|----|----|----|----|----|----|----|----|----|----|----|----|
| 0  | 11 | 12 | 13 | 13 | 12 | 12 | 12 | 12 | 12 | 12 | 12 | 13 | 12 | 13 | 13 | 15 | 14 | 13 | 13 | 12 | 12 | 11 | 11 | 11 | 11 | 11 | 12 | 12 | 13 | 12 | 12 | 11 |
| 1  | 11 | 13 | 13 | 13 | 13 | 11 | 12 | 12 | 12 | 12 | 12 | 12 | 12 | 12 | 13 | 13 | 15 | 14 | 13 | 13 | 11 | 11 | 11 | 11 | 12 | 14 | 14 | 14 | 15 | 13 | 12 | 11 |
| 2  | 13 | 13 | 13 | 13 | 12 | 13 | 11 | 12 | 12 | 12 | 12 | 12 | 12 | 12 | 13 | 12 | 12 | 12 | 11 | 11 | 11 | 11 | 12 | 14 | 14 | 14 | 14 | 15 | 13 | 12 | 10 |    |
| 3  | 13 | 13 | 12 | 12 | 12 | 12 | 13 | 11 | 11 | 12 | 12 | 12 | 12 | 12 | 11 | 13 | 12 | 11 | 11 | 11 | 11 | 11 | 12 | 13 | 13 | 14 | 13 | 13 | 12 | 11 | 10 | 11 |
| 4  | 13 | 13 | 13 | 10 | 10 | 13 | 12 | 11 | 11 | 11 | 12 | 12 | 11 | 10 | 10 | 11 | 11 | 11 | 11 | 11 | 11 | 11 | 12 | 12 | 12 | 12 | 13 | 12 | 10 | 10 | 10 | 10 |
| 5  | 13 | 13 | 11 | 11 | 11 | 9  | 11 | 12 | 10 | 9  | 11 | 11 | 8  | 8  | 8  | 9  | 11 | 11 | 11 | 11 | 11 | 11 | 12 | 12 | 12 | 12 | 11 | 10 | 10 | 11 | 10 | 10 |
| 6  | 13 | 13 | 12 | 11 | 11 | 11 | 11 | 10 | 10 | 7  | 9  | 10 | 8  | 8  | 7  | 7  | 9  | 11 | 11 | 11 | 11 | 11 | 11 | 12 | 11 | 11 | 11 | 10 | 10 | 10 | 10 | 10 |
| 7  | 13 | 13 | 13 | 12 | 12 | 9  | 10 | 10 | 9  | 8  | 7  | 8  | 7  | 7  | 6  | 6  | 9  | 10 | 11 | 11 | 11 | 11 | 11 | 10 | 10 | 10 | 10 | 10 | 10 | 10 | 10 | 10 |
| 8  | 11 | 11 | 12 | 12 | 9  | 9  | 9  | 10 | 10 | 8  | 6  | 6  | 6  | 6  | 6  | 8  | 11 | 10 | 10 | 10 | 10 | 10 | 10 | 10 | 10 | 10 | 10 | 10 | 10 | 10 | 10 | 10 |
| 9  | 11 | 11 | 11 | 11 | 7  | 7  | 9  | 9  | 9  | 8  | 6  | 6  | 6  | 8  | 9  | 11 | 11 | 11 | 10 | 10 | 10 | 10 | 10 | 10 | 10 | 10 | 10 | 10 | 10 | 10 | 9  | 9  |
| 10 | 13 | 11 | 11 | 8  | 7  | 8  | 9  | 9  | 8  | 6  | 6  | 6  | 8  | 11 | 11 | 11 | 11 | 11 | 10 | 10 | 10 | 9  | 9  | 9  | 9  | 10 | 10 | 10 | 10 | 9  | 9  | 9  |
| 11 | 13 | 11 | 9  | 8  | 7  | 8  | 9  | 9  | 8  | 7  | 6  | 9  | 11 | 11 | 11 | 11 | 11 | 11 | 10 | 10 | 9  | 9  | 8  | 9  | 8  | 9  | 9  | 9  | 10 | 10 | 9  | 9  |
| 12 | 12 | 9  | 9  | 9  | 8  | 7  | 8  | 9  | 9  | 9  | 11 | 11 | 11 | 11 | 11 | 11 | 11 | 11 | 10 | 10 | 10 | 9  | 9  | 8  | 9  | 9  | 9  | 9  | 9  | 9  | 9  | 9  |
| 13 | 11 | 10 | 9  | 8  | 6  | 7  | 8  | 8  | 8  | 10 | 10 | 11 | 11 | 11 | 11 | 11 | 11 | 11 | 10 | 10 | 10 | 9  | 9  | 9  | 9  | 9  | 9  | 9  | 9  | 9  | 9  | 9  |
| 14 | 11 | 9  | 9  | 8  | 8  | 8  | 8  | 8  | 9  | 10 | 10 | 10 | 11 | 11 | 11 | 11 | 11 | 11 | 11 | 10 | 10 | 9  | 9  | 9  | 9  | 8  | 9  | 9  | 9  | 9  | 9  | 9  |
| 15 | 11 | 9  | 9  | 9  | 9  | 9  | 9  | 9  | 10 | 10 | 10 | 10 | 10 | 10 | 11 | 11 | 11 | 11 | 11 | 10 | 10 | 10 | 9  | 9  | 10 | 9  | 9  | 9  | 9  | 9  | 9  | 10 |
| 16 | 11 | 9  | 7  | 9  | 9  | 11 | 11 | 10 | 10 | 10 | 9  | 9  | 10 | 10 | 10 | 10 | 11 | 11 | 11 | 10 | 10 | 10 | 9  | 10 | 10 | 9  | 9  | 9  | 9  | 9  | 10 | 10 |
| 17 | 11 | 7  | 7  | 9  | 10 | 10 | 11 | 10 | 10 | 10 | 9  | 8  | 9  | 10 | 10 | 10 | 10 | 11 | 11 | 10 | 10 | 9  | 9  | 9  | 9  | 8  | 9  | 9  | 9  | 9  | 10 | 8  |
| 18 | 11 | 7  | 9  | 11 | 11 | 11 | 11 | 11 | 11 | 10 | 9  | 9  | 8  | 9  | 10 | 10 | 10 | 10 | 10 | 10 | 10 | 10 | 9  | 9  | 9  | 9  | 8  | 8  | 8  | 9  | 9  | 10 | 11 |
| 19 | 11 | 10 | 10 | 11 | 11 | 11 | 11 | 11 | 11 | 10 | 9  | 9  | 9  | 8  | 9  | 9  | 10 | 10 | 10 | 10 | 10 | 9  | 9  | 9  | 8  | 7  | 8  | 8  | 8  | 8  | 8  | 9  | 11 |
| 20 | 11 | 11 | 11 | 11 | 11 | 11 | 11 | 11 | 11 | 10 | 10 | 9  | 9  | 9  | 9  | 9  | 9  | 10 | 9  | 9  | 9  | 8  | 8  | 7  | 7  | 6  | 8  | 8  | 8  | 9  | 8  | 9  |
| 21 | 11 | 11 | 11 | 11 | 11 | 11 | 11 | 11 | 11 | 10 | 10 | 9  | 9  | 9  | 9  | 10 | 8  | 9  | 9  | 9  | 9  | 8  | 6  | 9  | 9  | 8  | 7  | 8  | 8  | 8  | 9  | 13 | 11 |
| 22 | 11 | 11 | 11 | 11 | 11 | 11 | 10 | 9  | 9  | 9  | 9  | 9  | 10 | 10 | 10 | 9  | 9  | 9  | 9  | 8  | 8  | 9  | 10 | 11 | 11 | 11 | 9  | 8  | 7  | 8  | 8  | 8  | 7  |
| 23 | 11 | 11 | 11 | 11 | 11 | 11 | 10 | 9  | 9  | 9  | 10 | 10 | 10 | 10 | 10 | 9  | 8  | 8  | 7  | 7  | 7  | 11 | 12 | 11 | 11 | 11 | 11 | 8  | 6  | 8  | 8  | 7  | 7  |
| 24 | 11 | 9  | 11 | 10 | 10 | 10 | 9  | 9  | 9  | 10 | 10 | 10 | 10 | 10 | 8  | 8  | 8  | 8  | 8  | 9  | 11 | 11 | 11 | 11 | 11 | 11 | 11 | 10 | 8  | 8  | 6  | 6  |
| 25 | 11 | 9  | 10 | 10 | 10 | 10 | 9  | 10 | 10 | 10 | 10 | 10 | 10 | 10 | 9  | 9  | 10 | 11 | 11 | 11 | 11 | 11 | 11 | 11 | 11 | 11 | 11 | 10 | 9  | 6  | 6  |
| 26 | 11 | 7  | 9  | 9  | 9  | 10 | 10 | 10 | 10 | 10 | 9  | 9  | 9  | 10 | 12 | 11 | 10 | 10 | 9  | 10 | 11 | 11 | 11 | 11 | 11 | 11 | 11 | 11 | 10 | 10 | 7  | 6  |
| 27 | 11 | 7  | 8  | 8  | 10 | 10 | 10 | 10 | 10 | 9  | 9  | 9  | 9  | 11 | 12 | 12 | 10 | 10 | 8  | 9  | 11 | 11 | 11 | 11 | 11 | 11 | 11 | 10 | 10 | 10 | 10 | 7  |
| 28 | 11 | 7  | 6  | 12 | 11 | 10 | 10 | 10 | 9  | 9  | 9  | 9  | 10 | 12 | 12 | 11 | 10 | 10 | 10 | 8  | 10 | 11 | 11 | 11 | 11 | 11 | 11 | 10 | 10 | 10 | 10 | 9  |
| 29 | 11 | 7  | 6  | 8  | 9  | 9  | 9  | 9  | 9  | 9  | 10 | 11 | 12 | 11 | 10 | 10 | 10 | 9  | 10 | 11 | 11 | 11 | 11 | 10 | 10 | 10 | 10 | 10 | 10 | 10 | 10 | 10 |
| 30 | 11 | 7  | 6  | 7  | 6  | 8  | 9  | 9  | 8  | 9  | 10 | 11 | 11 | 11 | 10 | 10 | 10 | 10 | 11 | 10 | 10 | 11 | 11 | 10 | 10 | 10 | 10 | 10 | 10 | 10 | 9  | 10 |
| 31 | 11 | 7  | 6  | 7  | 7  | 8  | 10 | 8  | 8  | 10 | 10 | 10 | 10 | 11 | 11 | 11 | 10 | 11 | 11 | 11 | 11 | 10 | 11 | 12 | 12 | 10 | 10 | 10 | 10 | 10 | 9  | 9  |

Fig. 15

ALTITUDE VALUES (COMPUTED USING OF0004to0003X/Y)

Fig. 16

DIFFERENCES BETWEEN RESULTS OF COMPUTING ALTITUDE VALUES ILLUSTRATED IN FIG. 14 AND RESULTS OF COMPUTING ALTITUDE VALUES ILLUSTRATED IN FIG. 15

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | (3) | 1 | 0 | 1 | 2 | 2 | 1 | 2 | 1 | 0 | 1 | 1 | 1 | 1 | 0 | (3) | 2 | 1 | 1 | 1 | 1 | 0 | 0 | 0 | 0 | 1 | 1 | 0 | 1 | 0 | 1 | 0 |
| 1 | 0 | 2 | 0 | 1 | 2 | 1 | 1 | 1 | 0 | 0 | 1 | 1 | 1 | 1 | 1 | 0 | (4) | (3) | 1 | 2 | 0 | 0 | 0 | 0 | 2 | 1 | 1 | 1 | 2 | 1 | 0 | 0 |
| 2 | 2 | 1 | 2 | 1 | 1 | 1 | 1 | 0 | 0 | 0 | 0 | 1 | 1 | 1 | 0 | (5) | 1 | 0 | 1 | 0 | 0 | 0 | 1 | 1 | 0 | 1 | 0 | 1 | 2 | 1 | 0 | 2 |
| 3 | 2 | 2 | 3 | 0 | 0 | 0 | 0 | 1 | 1 | 1 | 0 | 1 | 0 | 1 | 2 | 1 | 0 | 0 | 0 | 0 | 0 | 0 | 1 | 0 | 0 | 1 | 1 | 0 | 0 | 1 | 1 | 1 |
| 4 | 2 | 1 | 1 | 0 | 4 | 1 | 0 | 1 | 1 | 2 | 0 | 2 | 2 | 0 | 0 | 0 | 0 | 0 | 0 | 0 | 0 | 0 | 0 | 0 | 1 | 0 | 1 | 2 | 0 | 2 | 2 |
| 5 | 2 | 2 | 1 | 1 | 0 | 0 | 1 | 0 | 2 | 3 | 1 | 2 | 1 | 0 | 0 | 0 | 0 | 0 | 0 | 0 | 0 | 0 | 0 | 0 | 0 | 1 | 2 | 0 | 0 | 1 | 2 |
| 6 | 2 | 1 | 1 | 2 | 1 | 1 | 1 | 0 | 0 | 2 | 0 | 1 | 0 | 0 | 1 | 1 | 0 | 0 | 0 | 0 | 0 | 0 | 0 | 1 | 1 | 1 | 0 | 0 | 0 | 0 | 1 |
| 7 | 2 | 1 | 1 | 0 | 2 | 1 | 0 | 0 | 0 | 0 | 1 | 1 | 0 | 0 | 1 | 0 | 1 | 0 | 0 | 0 | 0 | 0 | 0 | 0 | 0 | 0 | 0 | 0 | 0 | 0 | 1 |
| 8 | 0 | 1 | 1 | 1 | 0 | 1 | 1 | 0 | 0 | 1 | 0 | 0 | 0 | 0 | 0 | 0 | 0 | 0 | 0 | 0 | 0 | 1 | 0 | 0 | 0 | 0 | 1 | 1 | 2 | 1 |
| 9 | 0 | 1 | 1 | 2 | 1 | 0 | 1 | 0 | 1 | 0 | 1 | 0 | 0 | 0 | 0 | 0 | 0 | 0 | 0 | 0 | 0 | 1 | 0 | 0 | 1 | 0 | 1 | 2 | 2 |
| 10 | 2 | 2 | 3 | 1 | 0 | 0 | 0 | 1 | 1 | 0 | 2 | 1 | 1 | 0 | 0 | 0 | 0 | 0 | 0 | 0 | 0 | 1 | 1 | 0 | 0 | 2 | 2 | 1 | 2 |
| 11 | 2 | 2 | 0 | 1 | 0 | 0 | 1 | 0 | 0 | 1 | 2 | 2 | 0 | 0 | 0 | 0 | 0 | 0 | 0 | 1 | 0 | 0 | 0 | 1 | 1 | 2 | 2 | 1 | 2 |
| 12 | 1 | 3 | 0 | 0 | 0 | 0 | 1 | 0 | 0 | 1 | 1 | 0 | 0 | 0 | 0 | 0 | 0 | 0 | 1 | 0 | 0 | 0 | 0 | 0 | 0 | 0 | 1 | 0 | 2 |
| 13 | 0 | 0 | 0 | 0 | 0 | 0 | 0 | 0 | 1 | 0 | 0 | 0 | 0 | 0 | 0 | 0 | 0 | 0 | 0 | 1 | 3 | 2 | 1 | 0 | 0 | 0 | 1 | 0 | 0 | 0 | 2 |
| 14 | 1 | 1 | 0 | 2 | 0 | 0 | 1 | 0 | 0 | 0 | 0 | 0 | 0 | 0 | 0 | 0 | 0 | 0 | 0 | 1 | 3 | 2 | 2 | 0 | 0 | 1 | 0 | 0 | 0 | 2 |
| 15 | 2 | 0 | 1 | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |
| 16 | 3 | 1 | 1 | 0 | 1 | 0 | 0 | 0 | 0 | 0 | 0 | 0 | 0 | 1 | 0 | 0 | 0 | 0 | 0 | 0 | 1 | 0 | 0 | 0 | 0 | 0 | 0 | 1 | 1 |
| 17 | 3 | 0 | 0 | 2 | 1 | 0 | 0 | 0 | 0 | 0 | 0 | 0 | 2 | 2 | 1 | 1 | 0 | 0 | 0 | 0 | 0 | 0 | 0 | 0 | 0 | 0 | 0 | 1 | 1 | 3 |
| 18 | 4 | 1 | 2 | 0 | 0 | 0 | 0 | 0 | 0 | 0 | 0 | 0 | 0 | 1 | 0 | 0 | 0 | 0 | 0 | 0 | 1 | 1 | 1 | 0 | 0 | 0 | 0 | 0 | 1 | 2 |
| 19 | 1 | 0 | 1 | 0 | 0 | 0 | 0 | 0 | 0 | 0 | 1 | 0 | 0 | 0 | 1 | 0 | 0 | 0 | 0 | 0 | 0 | 1 | 0 | 2 | 1 | 0 | 0 | 0 | 0 | 1 | 2 | 0 |
| 20 | 0 | 0 | 0 | 0 | 0 | 0 | 0 | 1 | 0 | 0 | 0 | 0 | 1 | 0 | 0 | 0 | 0 | 0 | 0 | 0 | 0 | 2 | 0 | 1 | 0 | 0 | 0 | 0 | 1 | 0 | 2 |
| 21 | 0 | 0 | 0 | 0 | 0 | 0 | 0 | 0 | 0 | 0 | 0 | 0 | 0 | 0 | 0 | 0 | 0 | 2 | 1 | 3 | 0 | 1 | 1 | 2 | 0 | 0 | 1 | 3 | 1 |
| 22 | 0 | 0 | 0 | 0 | 0 | 0 | 1 | 0 | 0 | 0 | 0 | 0 | 0 | 0 | 0 | 0 | 0 | 2 | 0 | 1 | 1 | 0 | 0 | 1 | 2 | 0 | 0 | 2 | 4 | 4 |
| 23 | 1 | 0 | 0 | 0 | 1 | 0 | 0 | 0 | 0 | 0 | 0 | 0 | 1 | 0 | 0 | 0 | 0 | 2 | 0 | 0 | 0 | 0 | 1 | 0 | 0 | 0 | 1 | 1 | 4 |
| 24 | 0 | 1 | 0 | 0 | 0 | 0 | 0 | 0 | 0 | 0 | 0 | 1 | 2 | 1 | 1 | 1 | 0 | 2 | 3 | 0 | 0 | 1 | 0 | 0 | 2 | 1 | 1 | 0 | 1 | 5 |
| 25 | 1 | 1 | 0 | 0 | 0 | 0 | 0 | 0 | 0 | 0 | 0 | 2 | 4 | 4 | 1 | 1 | 1 | 0 | 1 | 1 | 0 | 1 | 0 | 0 | 0 | 0 | 1 | 0 | 2 | 1 | 5 |
| 26 | 5 | 1 | 1 | 1 | 0 | 0 | 0 | 0 | 0 | 0 | 0 | 0 | 3 | 3 | 3 | 1 | 1 | 2 | 2 | 0 | 0 | 0 | 0 | 0 | 1 | 1 | 1 | 3 | 0 | 5 |
| 27 | 5 | 1 | 1 | 0 | 0 | 0 | 0 | 1 | 3 | 0 | 1 | 1 | 1 | 2 | 2 | 0 | 0 | 3 | 2 | 0 | 0 | 0 | 0 | 0 | 0 | 0 | 2 | 3 | 3 | 4 |
| 28 | 5 | 1 | 0 | 6 | 2 | 0 | 0 | 0 | 1 | 1 | 1 | 0 | 1 | 0 | 0 | 0 | 0 | 1 | 1 | 0 | 0 | 0 | 0 | 1 | 1 | 1 | 2 | 2 | 2 | 2 |
| 29 | 5 | 1 | 0 | 2 | 2 | 0 | 1 | 0 | 0 | 0 | 1 | 0 | 0 | 0 | 1 | 0 | 0 | 1 | 1 | 1 | 0 | 0 | 0 | 0 | 1 | 1 | 2 | 2 | 1 | 1 | 1 |
| 30 | 5 | 1 | 0 | 1 | 0 | 1 | 1 | 0 | 1 | 1 | 1 | 0 | 1 | 3 | 1 | 1 | 0 | 0 | 1 | 1 | 2 | 0 | 0 | 0 | 3 | 2 | 0 | 0 | 1 | 1 |
| 31 | 5 | 1 | 0 | 0 | 1 | 2 | 2 | 1 | 1 | 0 | 0 | 0 | 1 | 3 | 3 | 1 | 0 | 0 | 0 | 0 | 1 | 0 | 1 | 0 | 1 | 1 | 1 | 3 | 0 | 0 | 1 | 2 |

Fig. 17

IMAGE 0004' (LEFT HALF) (SIMPLY ENLARGED TWOFOLD)

Fig. 18

IMAGE 0004' (RIGHT HALF) (SIMPLY ENLARGED TWOFOLD)

|    | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|----|----|----|----|----|----|----|----|----|----|----|----|----|----|----|----|----|----|----|----|----|----|----|----|----|----|----|----|----|----|----|----|----|
| 0  | 59 | 58 | 58 | 52 | 39 | 27 | 17 | 11 | 11 | 11 | 11 | 11 | 11 | 11 | 11 | 11 | 11 | 11 | 17 | 29 | 34 | 35 | 31 | 24 | 19 | 18 | 21 | 28 | 27 | 20 | 12 |    |
| 1  | 78 | 78 | 78 | 71 | 57 | 42 | 27 | 18 | 16 | 15 | 15 | 15 | 15 | 15 | 15 | 16 | 17 | 18 | 19 | 25 | 36 | 42 | 42 | 38 | 31 | 26 | 24 | 27 | 34 | 35 | 28 | 19 |
| 2  | 77 | 77 | 77 | 74 | 67 | 54 | 35 | 23 | 18 | 15 | 15 | 15 | 14 | 14 | 15 | 17 | 22 | 25 | 28 | 31 | 32 | 33 | 33 | 32 | 29 | 27 | 25 | 25 | 29 | 32 | 33 | 26 |
| 3  | 76 | 76 | 75 | 72 | 66 | 54 | 37 | 25 | 19 | 16 | 15 | 15 | 15 | 15 | 16 | 20 | 26 | 30 | 33 | 34 | 32 | 31 | 29 | 28 | 28 | 27 | 25 | 26 | 29 | 33 | 38 | 30 |
| 4  | 76 | 74 | 70 | 64 | 55 | 44 | 30 | 22 | 19 | 17 | 15 | 15 | 16 | 17 | 19 | 22 | 28 | 32 | 34 | 35 | 36 | 35 | 31 | 29 | 28 | 27 | 27 | 28 | 33 | 37 | 41 | 33 |
| 5  | 69 | 66 | 59 | 51 | 42 | 33 | 24 | 19 | 18 | 17 | 17 | 18 | 19 | 19 | 22 | 27 | 32 | 36 | 39 | 42 | 40 | 33 | 29 | 29 | 29 | 31 | 34 | 38 | 42 | 33 |    |    |
| 6  | 57 | 52 | 41 | 33 | 27 | 22 | 19 | 17 | 16 | 17 | 20 | 22 | 22 | 20 | 18 | 18 | 22 | 29 | 40 | 47 | 48 | 44 | 35 | 30 | 30 | 31 | 33 | 34 | 33 | 35 | 39 | 31 |
| 7  | 44 | 38 | 29 | 22 | 18 | 16 | 16 | 15 | 15 | 16 | 21 | 23 | 23 | 21 | 18 | 17 | 19 | 27 | 39 | 46 | 46 | 43 | 36 | 33 | 32 | 33 | 34 | 34 | 34 | 36 | 39 | 31 |
| 8  | 29 | 26 | 21 | 18 | 16 | 16 | 15 | 15 | 13 | 15 | 18 | 21 | 22 | 22 | 20 | 18 | 19 | 23 | 33 | 36 | 35 | 34 | 35 | 36 | 36 | 35 | 33 | 33 | 36 | 39 | 42 | 32 |
| 9  | 19 | 19 | 16 | 15 | 15 | 15 | 16 | 15 | 13 | 13 | 16 | 19 | 22 | 23 | 22 | 21 | 20 | 23 | 28 | 31 | 31 | 32 | 35 | 36 | 37 | 36 | 34 | 35 | 39 | 42 | 43 | 33 |
| 10 | 15 | 16 | 15 | 15 | 15 | 16 | 16 | 15 | 14 | 13 | 13 | 16 | 22 | 24 | 24 | 23 | 23 | 24 | 27 | 31 | 34 | 36 | 34 | 34 | 34 | 36 | 38 | 40 | 42 | 43 | 44 | 33 |
| 11 | 13 | 14 | 15 | 15 | 15 | 16 | 16 | 16 | 14 | 13 | 12 | 15 | 20 | 23 | 25 | 26 | 26 | 27 | 29 | 32 | 36 | 37 | 35 | 34 | 35 | 37 | 41 | 43 | 43 | 44 | 44 | 33 |
| 12 | 12 | 14 | 15 | 15 | 15 | 15 | 16 | 16 | 15 | 14 | 13 | 13 | 16 | 20 | 25 | 29 | 29 | 31 | 33 | 35 | 36 | 37 | 37 | 38 | 39 | 41 | 42 | 43 | 43 | 44 | 44 | 33 |
| 13 | 12 | 13 | 14 | 15 | 15 | 15 | 16 | 16 | 16 | 15 | 13 | 13 | 14 | 17 | 23 | 28 | 30 | 32 | 35 | 37 | 38 | 39 | 40 | 41 | 42 | 42 | 41 | 42 | 43 | 44 | 45 | 34 |
| 14 | 11 | 12 | 13 | 14 | 15 | 15 | 15 | 16 | 16 | 16 | 14 | 14 | 13 | 15 | 19 | 23 | 28 | 31 | 34 | 38 | 43 | 45 | 44 | 43 | 43 | 41 | 38 | 39 | 42 | 44 | 45 | 34 |
| 15 | 12 | 12 | 13 | 14 | 15 | 15 | 15 | 16 | 17 | 17 | 16 | 15 | 14 | 15 | 17 | 21 | 27 | 31 | 34 | 38 | 45 | 47 | 45 | 44 | 42 | 39 | 39 | 43 | 45 | 46 | 35 |    |
| 16 | 13 | 14 | 14 | 14 | 14 | 15 | 15 | 16 | 17 | 17 | 17 | 16 | 16 | 16 | 17 | 21 | 28 | 33 | 35 | 38 | 42 | 45 | 45 | 45 | 45 | 44 | 43 | 44 | 45 | 46 | 46 | 35 |
| 17 | 14 | 15 | 15 | 14 | 14 | 14 | 15 | 16 | 17 | 18 | 17 | 17 | 17 | 17 | 17 | 20 | 27 | 32 | 35 | 38 | 40 | 42 | 44 | 45 | 45 | 45 | 46 | 46 | 47 | 46 | 46 | 34 |
| 18 | 16 | 16 | 16 | 15 | 14 | 14 | 15 | 16 | 17 | 18 | 18 | 18 | 17 | 17 | 16 | 19 | 25 | 31 | 35 | 38 | 39 | 40 | 41 | 43 | 45 | 46 | 46 | 47 | 46 | 46 | 45 | 33 |
| 19 | 16 | 17 | 16 | 15 | 14 | 14 | 15 | 16 | 17 | 18 | 18 | 18 | 18 | 17 | 15 | 17 | 22 | 27 | 33 | 36 | 37 | 38 | 39 | 41 | 44 | 46 | 46 | 46 | 45 | 45 | 44 | 33 |
| 20 | 17 | 17 | 17 | 16 | 14 | 14 | 14 | 15 | 17 | 18 | 18 | 18 | 19 | 17 | 14 | 14 | 17 | 22 | 30 | 34 | 36 | 38 | 38 | 40 | 44 | 46 | 46 | 45 | 44 | 43 | 43 | 32 |
| 21 | 17 | 17 | 17 | 16 | 15 | 14 | 13 | 14 | 16 | 18 | 20 | 21 | 22 | 19 | 14 | 12 | 14 | 19 | 27 | 32 | 35 | 37 | 37 | 39 | 42 | 45 | 45 | 45 | 43 | 42 | 40 | 30 |
| 22 | 17 | 17 | 17 | 16 | 16 | 15 | 13 | 14 | 15 | 19 | 23 | 26 | 27 | 24 | 17 | 13 | 14 | 17 | 24 | 29 | 33 | 35 | 36 | 38 | 40 | 43 | 46 | 46 | 44 | 41 | 37 | 27 |
| 23 | 17 | 18 | 17 | 16 | 16 | 16 | 14 | 14 | 15 | 18 | 24 | 28 | 29 | 25 | 17 | 13 | 13 | 16 | 22 | 27 | 30 | 33 | 35 | 37 | 38 | 41 | 45 | 45 | 42 | 38 | 33 | 23 |
| 24 | 17 | 18 | 17 | 17 | 17 | 16 | 15 | 14 | 14 | 17 | 23 | 26 | 26 | 23 | 16 | 12 | 12 | 14 | 20 | 24 | 27 | 30 | 34 | 36 | 37 | 39 | 41 | 41 | 37 | 32 | 27 | 18 |
| 25 | 17 | 18 | 18 | 18 | 18 | 17 | 16 | 15 | 14 | 15 | 20 | 22 | 22 | 19 | 14 | 11 | 11 | 13 | 17 | 21 | 25 | 28 | 32 | 34 | 35 | 35 | 36 | 34 | 31 | 27 | 23 | 16 |
| 26 | 17 | 17 | 18 | 19 | 19 | 19 | 17 | 15 | 14 | 14 | 16 | 16 | 15 | 13 | 11 | 11 | 11 | 12 | 14 | 18 | 23 | 27 | 29 | 31 | 32 | 31 | 28 | 26 | 25 | 23 | 23 | 17 |
| 27 | 17 | 17 | 18 | 19 | 20 | 19 | 17 | 16 | 15 | 14 | 13 | 12 | 11 | 11 | 10 | 10 | 10 | 11 | 12 | 15 | 20 | 24 | 26 | 27 | 28 | 26 | 23 | 22 | 21 | 22 | 22 | 17 |
| 28 | 17 | 17 | 17 | 18 | 20 | 20 | 18 | 16 | 15 | 14 | 13 | 12 | 11 | 10 | 10 | 10 | 10 | 11 | 13 | 16 | 19 | 22 | 23 | 23 | 23 | 22 | 21 | 21 | 22 | 22 | 17 |    |
| 29 | 16 | 16 | 16 | 17 | 19 | 19 | 17 | 16 | 16 | 15 | 14 | 12 | 11 | 10 | 10 | 10 | 10 | 10 | 12 | 14 | 17 | 20 | 21 | 21 | 21 | 21 | 21 | 21 | 22 | 23 | 18 |    |
| 30 | 15 | 15 | 16 | 16 | 17 | 17 | 16 | 16 | 15 | 15 | 14 | 13 | 12 | 11 | 11 | 11 | 11 | 11 | 12 | 14 | 17 | 19 | 21 | 21 | 21 | 21 | 22 | 23 | 25 | 20 |    |    |
| 31 | 14 | 15 | 16 | 16 | 16 | 16 | 16 | 16 | 15 | 15 | 14 | 13 | 12 | 12 | 12 | 12 | 12 | 14 | 16 | 18 | 20 | 21 | 21 | 21 | 20 | 21 | 23 | 25 | 28 | 22 |    |    |
| 32 | 13 | 14 | 16 | 17 | 17 | 16 | 16 | 16 | 16 | 15 | 14 | 13 | 12 | 12 | 12 | 13 | 14 | 15 | 17 | 19 | 20 | 21 | 21 | 21 | 20 | 20 | 21 | 25 | 29 | 33 | 26 |    |
| 33 | 13 | 14 | 16 | 17 | 17 | 17 | 17 | 17 | 16 | 16 | 15 | 14 | 13 | 13 | 13 | 13 | 15 | 18 | 20 | 21 | 22 | 22 | 22 | 21 | 20 | 19 | 22 | 27 | 32 | 36 | 29 |    |
| 34 | 13 | 14 | 16 | 17 | 18 | 18 | 18 | 18 | 18 | 17 | 17 | 16 | 14 | 13 | 13 | 14 | 16 | 19 | 21 | 22 | 22 | 22 | 22 | 22 | 21 | 20 | 22 | 27 | 33 | 38 | 31 |    |
| 35 | 13 | 14 | 16 | 17 | 18 | 18 | 18 | 18 | 18 | 19 | 17 | 17 | 15 | 14 | 14 | 13 | 14 | 15 | 19 | 21 | 21 | 22 | 22 | 22 | 22 | 22 | 21 | 23 | 28 | 33 | 38 | 30 |
| 36 | 14 | 15 | 16 | 17 | 17 | 17 | 17 | 17 | 17 | 17 | 17 | 16 | 16 | 15 | 14 | 13 | 14 | 17 | 19 | 21 | 22 | 22 | 22 | 22 | 23 | 24 | 26 | 28 | 31 | 35 | 28 |    |
| 37 | 14 | 15 | 16 | 17 | 17 | 16 | 16 | 16 | 16 | 16 | 16 | 17 | 16 | 15 | 14 | 12 | 13 | 16 | 18 | 20 | 21 | 21 | 22 | 22 | 23 | 26 | 28 | 30 | 32 | 34 | 26 |    |
| 38 | 14 | 15 | 16 | 17 | 16 | 16 | 16 | 15 | 15 | 15 | 16 | 16 | 15 | 13 | 12 | 11 | 12 | 14 | 17 | 19 | 20 | 21 | 21 | 22 | 24 | 28 | 31 | 33 | 34 | 35 | 26 |    |
| 39 | 14 | 15 | 16 | 17 | 16 | 16 | 16 | 15 | 15 | 15 | 15 | 15 | 14 | 12 | 11 | 11 | 11 | 11 | 13 | 15 | 18 | 19 | 20 | 21 | 22 | 25 | 30 | 34 | 35 | 36 | 35 | 26 |
| 40 | 14 | 15 | 16 | 17 | 16 | 15 | 15 | 16 | 15 | 15 | 15 | 16 | 14 | 12 | 11 | 11 | 11 | 12 | 13 | 16 | 18 | 20 | 21 | 22 | 25 | 32 | 35 | 37 | 37 | 35 | 26 |    |
| 41 | 14 | 15 | 16 | 16 | 16 | 15 | 16 | 16 | 15 | 15 | 15 | 14 | 13 | 13 | 14 | 15 | 14 | 12 | 12 | 14 | 16 | 19 | 20 | 22 | 25 | 32 | 36 | 38 | 38 | 36 | 26 |    |
| 42 | 14 | 15 | 15 | 16 | 15 | 15 | 16 | 16 | 15 | 14 | 13 | 13 | 13 | 16 | 20 | 22 | 21 | 18 | 14 | 12 | 13 | 15 | 18 | 20 | 21 | 26 | 32 | 36 | 38 | 38 | 36 | 26 |
| 43 | 14 | 15 | 15 | 15 | 15 | 15 | 15 | 16 | 16 | 14 | 14 | 13 | 14 | 16 | 20 | 25 | 26 | 25 | 22 | 16 | 13 | 13 | 14 | 16 | 19 | 21 | 26 | 32 | 36 | 38 | 38 | 36 | 26 |
| 44 | 14 | 15 | 15 | 15 | 15 | 14 | 14 | 13 | 12 | 13 | 15 | 18 | 23 | 26 | 28 | 29 | 28 | 24 | 19 | 16 | 14 | 14 | 15 | 18 | 21 | 26 | 32 | 35 | 37 | 37 | 35 | 26 |
| 45 | 14 | 14 | 15 | 15 | 14 | 13 | 13 | 13 | 13 | 15 | 19 | 23 | 28 | 31 | 32 | 32 | 30 | 27 | 23 | 19 | 15 | 14 | 15 | 17 | 21 | 26 | 32 | 35 | 37 | 36 | 32 | 23 |
| 46 | 13 | 14 | 15 | 14 | 13 | 12 | 12 | 14 | 17 | 21 | 25 | 29 | 32 | 34 | 36 | 35 | 32 | 29 | 26 | 22 | 17 | 14 | 15 | 16 | 19 | 25 | 32 | 36 | 37 | 33 | 26 | 16 |
| 47 | 13 | 13 | 14 | 14 | 12 | 13 | 14 | 17 | 21 | 25 | 29 | 33 | 35 | 37 | 39 | 38 | 34 | 31 | 29 | 25 | 19 | 16 | 15 | 16 | 19 | 23 | 30 | 33 | 32 | 28 | 20 | 12 |
| 48 | 13 | 12 | 12 | 13 | 16 | 19 | 22 | 25 | 28 | 32 | 34 | 36 | 38 | 39 | 39 | 37 | 34 | 30 | 26 | 23 | 19 | 16 | 16 | 18 | 21 | 25 | 26 | 23 | 20 | 16 | 10 |    |
| 49 | 13 | 12 | 12 | 13 | 16 | 20 | 24 | 27 | 29 | 31 | 33 | 35 | 37 | 38 | 39 | 39 | 35 | 32 | 29 | 26 | 23 | 19 | 19 | 22 | 24 | 24 | 22 | 19 | 16 | 14 | 9 |    |
| 50 | 14 | 13 | 13 | 16 | 21 | 26 | 29 | 32 | 33 | 33 | 32 | 33 | 36 | 38 | 39 | 39 | 38 | 36 | 35 | 32 | 29 | 27 | 24 | 25 | 29 | 30 | 26 | 22 | 19 | 16 | 14 | 10 |
| 51 | 17 | 16 | 15 | 17 | 22 | 26 | 30 | 32 | 31 | 31 | 31 | 32 | 36 | 38 | 39 | 39 | 38 | 37 | 37 | 35 | 32 | 30 | 29 | 30 | 35 | 34 | 29 | 24 | 20 | 18 | 16 | 11 |
| 52 | 21 | 19 | 16 | 16 | 19 | 22 | 25 | 26 | 25 | 25 | 28 | 31 | 37 | 40 | 41 | 40 | 39 | 38 | 37 | 33 | 32 | 33 | 34 | 37 | 37 | 32 | 28 | 24 | 21 | 17 | 12 |    |
| 53 | 24 | 22 | 17 | 15 | 17 | 19 | 23 | 24 | 23 | 24 | 28 | 33 | 37 | 40 | 41 | 40 | 39 | 39 | 39 | 38 | 35 | 33 | 34 | 35 | 36 | 36 | 33 | 30 | 27 | 23 | 19 | 13 |
| 54 | 26 | 22 | 19 | 16 | 15 | 16 | 22 | 25 | 25 | 28 | 33 | 36 | 39 | 40 | 40 | 39 | 39 | 39 | 40 | 39 | 37 | 35 | 32 | 31 | 31 | 31 | 30 | 29 | 28 | 26 | 22 | 15 |
| 55 | 27 | 23 | 20 | 17 | 15 | 16 | 20 | 24 | 26 | 30 | 36 | 39 | 39 | 39 | 39 | 39 | 39 | 39 | 40 | 39 | 38 | 36 | 33 | 31 | 30 | 30 | 30 | 29 | 29 | 27 | 25 | 17 |
| 56 | 26 | 24 | 20 | 18 | 18 | 17 | 18 | 20 | 25 | 31 | 37 | 40 | 38 | 37 | 37 | 38 | 39 | 39 | 39 | 38 | 37 | 35 | 33 | 33 | 32 | 32 | 31 | 29 | 28 | 27 | 20 |    |
| 57 | 27 | 25 | 21 | 20 | 20 | 18 | 16 | 18 | 23 | 29 | 36 | 38 | 37 | 37 | 37 | 38 | 38 | 38 | 38 | 37 | 35 | 34 | 34 | 33 | 34 | 34 | 33 | 32 | 30 | 29 | 29 | 22 |
| 58 | 29 | 26 | 23 | 21 | 21 | 19 | 15 | 16 | 21 | 25 | 30 | 34 | 37 | 38 | 37 | 36 | 36 | 36 | 36 | 36 | 36 | 35 | 35 | 35 | 35 | 34 | 33 | 31 | 30 | 22 |    |    |
| 59 | 29 | 27 | 23 | 21 | 21 | 19 | 15 | 15 | 18 | 21 | 26 | 30 | 35 | 37 | 35 | 34 | 34 | 35 | 35 | 35 | 36 | 36 | 36 | 36 | 36 | 35 | 34 | 32 | 30 | 22 |    |    |
| 60 | 28 | 26 | 23 | 20 | 18 | 17 | 15 | 15 | 15 | 17 | 22 | 26 | 31 | 33 | 33 | 33 | 32 | 33 | 34 | 35 | 35 | 35 | 36 | 36 | 36 | 37 | 37 | 36 | 35 | 33 | 30 | 21 |
| 61 | 26 | 24 | 21 | 19 | 17 | 16 | 16 | 15 | 14 | 15 | 18 | 22 | 27 | 29 | 28 | 29 | 30 | 32 | 34 | 35 | 35 | 35 | 36 | 36 | 36 | 36 | 36 | 35 | 34 | 30 | 22 |    |
| 62 | 22 | 19 | 17 | 16 | 16 | 16 | 15 | 14 | 14 | 15 | 18 | 24 | 25 | 21 | 23 | 28 | 32 | 33 | 34 | 36 | 36 | 36 | 36 | 36 | 35 | 35 | 36 | 35 | 33 | 24 |    |    |
| 63 | 14 | 13 | 12 | 11 | 12 | 12 | 12 | 12 | 11 | 11 | 10 | 12 | 17 | 17 | 14 | 16 | 20 | 24 | 25 | 26 | 27 | 27 | 27 | 27 | 27 | 26 | 25 | 26 | 27 | 27 | 25 | 18 |

GRAYSCALE REPRESENTATION OF IMAGE 0004'

Fig. 20

DOWN-SAMPLING TO 1/2 (0004)
(COMPUTED USING OF0004to0004X/Y)

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|---|---|---|---|---|---|---|---|---|---|----|----|----|----|----|----|----|----|----|----|----|----|----|----|----|----|----|----|----|----|----|----|
| 0  | 7 | 11 | 18 | 20 | 13 | 9 | 9 | 9 | 9 | 9 | 8 | 8 | 12 | 29 | 48 | 57 | 59 | 54 | 33 | 15 | 11 | 11 | 11 | 11 | 11 | 15 | 31 | 32 | 22 | 20 | 27 | 16 |
| 1  | 16 | 28 | 31 | 31 | 25 | 17 | 12 | 11 | 12 | 12 | 11 | 11 | 12 | 26 | 58 | 74 | 77 | 74 | 58 | 30 | 17 | 15 | 15 | 17 | 25 | 31 | 33 | 31 | 28 | 26 | 31 | 31 |
| 2  | 23 | 33 | 33 | 33 | 34 | 32 | 19 | 12 | 11 | 12 | 11 | 11 | 10 | 16 | 43 | 68 | 70 | 60 | 43 | 25 | 18 | 16 | 18 | 21 | 29 | 36 | 38 | 31 | 28 | 29 | 35 | 37 |
| 3  | 25 | 33 | 34 | 39 | 48 | 53 | 35 | 16 | 11 | 11 | 12 | 11 | 11 | 12 | 23 | 47 | 47 | 32 | 22 | 17 | 16 | 21 | 21 | 18 | 25 | 42 | 44 | 34 | 32 | 33 | 35 | 35 |
| 4  | 24 | 36 | 43 | 51 | 55 | 61 | 51 | 23 | 12 | 11 | 12 | 14 | 13 | 12 | 14 | 23 | 24 | 18 | 16 | 15 | 14 | 18 | 22 | 20 | 22 | 32 | 34 | 35 | 36 | 34 | 39 | 37 |
| 5  | 20 | 44 | 51 | 56 | 59 | 58 | 49 | 26 | 13 | 12 | 16 | 20 | 17 | 13 | 11 | 12 | 15 | 15 | 16 | 16 | 14 | 15 | 22 | 25 | 25 | 30 | 35 | 35 | 36 | 40 | 43 | 38 |
| 6  | 18 | 41 | 51 | 57 | 53 | 43 | 33 | 23 | 14 | 13 | 18 | 20 | 17 | 13 | 11 | 11 | 13 | 15 | 15 | 16 | 15 | 13 | 17 | 26 | 30 | 35 | 38 | 39 | 41 | 42 | 44 | 39 |
| 7  | 19 | 33 | 47 | 48 | 36 | 29 | 25 | 18 | 15 | 14 | 16 | 17 | 15 | 12 | 11 | 11 | 12 | 14 | 15 | 16 | 16 | 15 | 15 | 21 | 29 | 36 | 44 | 44 | 43 | 40 | 43 | 40 |
| 8  | 21 | 27 | 34 | 34 | 27 | 22 | 17 | 14 | 14 | 16 | 19 | 19 | 15 | 13 | 12 | 12 | 14 | 14 | 14 | 16 | 17 | 17 | 17 | 19 | 30 | 37 | 42 | 45 | 45 | 45 | 46 | 40 |
| 9  | 23 | 27 | 27 | 25 | 20 | 15 | 12 | 12 | 13 | 16 | 20 | 19 | 16 | 14 | 13 | 14 | 16 | 16 | 14 | 15 | 17 | 18 | 17 | 17 | 26 | 35 | 39 | 41 | 45 | 46 | 45 | 39 |
| 10 | 23 | 30 | 26 | 18 | 13 | 11 | 11 | 12 | 13 | 14 | 15 | 14 | 14 | 14 | 14 | 15 | 17 | 16 | 14 | 14 | 17 | 20 | 19 | 14 | 18 | 30 | 36 | 39 | 44 | 45 | 43 | 36 |
| 11 | 21 | 30 | 25 | 16 | 12 | 11 | 11 | 12 | 13 | 13 | 12 | 13 | 14 | 14 | 15 | 15 | 17 | 17 | 16 | 14 | 17 | 25 | 25 | 15 | 15 | 25 | 33 | 36 | 41 | 45 | 41 | 30 |
| 12 | 22 | 28 | 20 | 14 | 12 | 11 | 12 | 13 | 13 | 12 | 13 | 14 | 15 | 15 | 15 | 16 | 17 | 17 | 17 | 15 | 15 | 23 | 22 | 14 | 13 | 20 | 28 | 33 | 36 | 37 | 32 | 22 |
| 13 | 18 | 19 | 15 | 14 | 13 | 13 | 17 | 17 | 16 | 13 | 14 | 15 | 15 | 15 | 16 | 17 | 17 | 18 | 19 | 16 | 14 | 15 | 13 | 11 | 11 | 15 | 23 | 28 | 29 | 25 | 23 | 20 |
| 14 | 11 | 15 | 14 | 14 | 14 | 17 | 20 | 18 | 15 | 13 | 12 | 13 | 14 | 14 | 14 | 15 | 16 | 17 | 19 | 17 | 15 | 13 | 11 | 10 | 10 | 12 | 17 | 22 | 22 | 21 | 22 | 20 |
| 15 | 9 | 14 | 13 | 12 | 13 | 15 | 18 | 18 | 15 | 14 | 12 | 12 | 13 | 13 | 13 | 14 | 15 | 16 | 17 | 16 | 15 | 14 | 12 | 11 | 11 | 12 | 16 | 20 | 21 | 21 | 23 | 24 |
| 16 | 11 | 14 | 12 | 12 | 14 | 17 | 23 | 28 | 21 | 17 | 15 | 13 | 13 | 13 | 13 | 14 | 16 | 17 | 16 | 16 | 15 | 13 | 12 | 14 | 17 | 20 | 21 | 21 | 21 | 28 | 31 |   |
| 17 | 13 | 15 | 13 | 14 | 17 | 18 | 24 | 38 | 35 | 29 | 23 | 17 | 13 | 13 | 13 | 14 | 16 | 18 | 18 | 18 | 17 | 14 | 13 | 15 | 19 | 22 | 22 | 22 | 22 | 30 | 34 |   |
| 18 | 11 | 17 | 18 | 17 | 17 | 18 | 21 | 33 | 46 | 45 | 32 | 24 | 15 | 12 | 13 | 14 | 14 | 16 | 17 | 16 | 16 | 16 | 14 | 13 | 17 | 21 | 22 | 23 | 26 | 31 | 31 |   |
| 19 | 12 | 28 | 27 | 19 | 17 | 18 | 19 | 25 | 42 | 53 | 38 | 27 | 18 | 13 | 13 | 13 | 14 | 16 | 16 | 16 | 15 | 15 | 12 | 11 | 15 | 19 | 21 | 23 | 31 | 34 | 30 |   |
| 20 | 26 | 36 | 23 | 17 | 18 | 19 | 20 | 21 | 32 | 52 | 44 | 25 | 17 | 13 | 12 | 13 | 14 | 16 | 16 | 16 | 15 | 15 | 13 | 13 | 13 | 13 | 16 | 20 | 24 | 34 | 37 | 31 |
| 21 | 36 | 28 | 19 | 18 | 20 | 21 | 21 | 21 | 24 | 34 | 29 | 19 | 16 | 15 | 13 | 13 | 14 | 15 | 15 | 16 | 14 | 14 | 17 | 23 | 21 | 14 | 14 | 18 | 24 | 34 | 37 | 31 |
| 22 | 32 | 23 | 19 | 19 | 21 | 22 | 21 | 20 | 20 | 20 | 18 | 17 | 17 | 16 | 13 | 14 | 15 | 14 | 13 | 14 | 19 | 27 | 30 | 27 | 19 | 14 | 16 | 23 | 33 | 37 | 29 |   |
| 23 | 14 | 24 | 22 | 21 | 21 | 20 | 20 | 18 | 17 | 17 | 16 | 17 | 17 | 18 | 18 | 15 | 13 | 14 | 13 | 15 | 21 | 29 | 34 | 36 | 32 | 25 | 17 | 16 | 22 | 32 | 32 | 19 |
| 24 | 9 | 23 | 25 | 23 | 20 | 18 | 17 | 17 | 16 | 16 | 17 | 17 | 18 | 18 | 17 | 16 | 13 | 13 | 17 | 23 | 28 | 33 | 37 | 39 | 36 | 29 | 23 | 18 | 22 | 24 | 20 | 13 |
| 25 | 8 | 16 | 26 | 26 | 20 | 18 | 17 | 16 | 16 | 17 | 18 | 18 | 18 | 17 | 16 | 16 | 15 | 15 | 23 | 30 | 31 | 32 | 37 | 39 | 37 | 34 | 29 | 27 | 31 | 26 | 18 | 13 |
| 26 | 8 | 12 | 17 | 21 | 20 | 18 | 17 | 16 | 17 | 17 | 17 | 17 | 16 | 17 | 21 | 23 | 21 | 16 | 19 | 24 | 25 | 30 | 38 | 40 | 39 | 38 | 33 | 34 | 36 | 30 | 24 | 16 |
| 27 | 8 | 11 | 13 | 16 | 18 | 17 | 17 | 17 | 18 | 17 | 16 | 15 | 16 | 24 | 33 | 32 | 25 | 18 | 16 | 22 | 28 | 36 | 39 | 39 | 39 | 39 | 36 | 32 | 31 | 30 | 27 | 20 |
| 28 | 8 | 10 | 11 | 14 | 17 | 17 | 18 | 18 | 17 | 15 | 14 | 15 | 20 | 28 | 34 | 30 | 25 | 20 | 18 | 18 | 27 | 37 | 37 | 37 | 38 | 38 | 37 | 34 | 33 | 32 | 29 | 24 |
| 29 | 8 | 11 | 11 | 12 | 15 | 17 | 18 | 17 | 16 | 15 | 17 | 20 | 23 | 28 | 31 | 30 | 27 | 22 | 20 | 16 | 21 | 30 | 36 | 36 | 35 | 36 | 36 | 36 | 36 | 35 | 32 | 26 |
| 30 | 8 | 11 | 11 | 11 | 12 | 14 | 16 | 16 | 17 | 22 | 25 | 24 | 26 | 30 | 31 | 29 | 26 | 21 | 17 | 15 | 15 | 22 | 29 | 30 | 32 | 34 | 35 | 36 | 36 | 36 | 34 | 26 |
| 31 | 7 | 10 | 9 | 9 | 9 | 10 | 13 | 14 | 20 | 25 | 24 | 23 | 26 | 27 | 26 | 22 | 17 | 14 | 14 | 14 | 13 | 15 | 20 | 19 | 26 | 29 | 31 | 32 | 31 | 30 | 31 | 25 |

Fig. 21

DOWN-SAMPLING TO 1/2 (0005)
(COMPUTED USING OF0005to0004X/Y)

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|---|---|---|---|---|---|---|---|---|---|----|----|----|----|----|----|----|----|----|----|----|----|----|----|----|----|----|----|----|----|----|----|
| 0  | 7 | 13 | 15 | 20 | 17 | 9 | 9 | 9 | 9 | 9 | 8 | 8 | 9 | 23 | 34 | 49 | 58 | 59 | 50 | 22 | 11 | 11 | 11 | 11 | 11 | 14 | 30 | 33 | 30 | 19 | 26 | 20 |
| 1  | 13 | 13 | 26 | 30 | 26 | 16 | 12 | 11 | 11 | 12 | 11 | 11 | 11 | 24 | 42 | 64 | 76 | 77 | 67 | 42 | 17 | 15 | 14 | 16 | 20 | 23 | 29 | 35 | 33 | 26 | 30 | 30 |
| 2  | 21 | 30 | 32 | 32 | 31 | 28 | 18 | 12 | 11 | 12 | 11 | 11 | 10 | 16 | 47 | 67 | 75 | 71 | 58 | 27 | 17 | 15 | 16 | 18 | 23 | 32 | 35 | 34 | 30 | 27 | 33 | 32 |
| 3  | 25 | 33 | 33 | 34 | 40 | 46 | 37 | 18 | 11 | 11 | 11 | 11 | 10 | 12 | 35 | 48 | 59 | 45 | 29 | 20 | 17 | 20 | 20 | 19 | 22 | 32 | 44 | 40 | 30 | 32 | 36 | 33 |
| 4  | 25 | 33 | 36 | 48 | 56 | 58 | 54 | 26 | 12 | 11 | 12 | 12 | 12 | 12 | 17 | 32 | 32 | 22 | 17 | 15 | 15 | 21 | 22 | 20 | 20 | 33 | 39 | 36 | 34 | 34 | 37 | 35 |
| 5  | 22 | 38 | 50 | 54 | 58 | 59 | 54 | 22 | 11 | 12 | 14 | 18 | 15 | 12 | 13 | 16 | 17 | 16 | 16 | 16 | 13 | 16 | 22 | 23 | 23 | 27 | 34 | 35 | 36 | 38 | 41 | 38 |
| 6  | 18 | 39 | 49 | 57 | 56 | 51 | 36 | 24 | 12 | 15 | 19 | 19 | 14 | 11 | 11 | 12 | 14 | 15 | 15 | 16 | 14 | 14 | 19 | 26 | 28 | 33 | 37 | 37 | 39 | 42 | 44 | 37 |
| 7  | 18 | 32 | 44 | 53 | 43 | 32 | 26 | 18 | 13 | 16 | 18 | 15 | 12 | 11 | 11 | 12 | 13 | 14 | 15 | 16 | 16 | 14 | 16 | 24 | 31 | 37 | 43 | 42 | 41 | 40 | 44 | 37 |
| 8  | 20 | 28 | 36 | 38 | 28 | 23 | 18 | 15 | 14 | 18 | 17 | 14 | 12 | 11 | 11 | 12 | 13 | 14 | 15 | 16 | 17 | 16 | 16 | 22 | 32 | 39 | 45 | 45 | 43 | 43 | 45 | 38 |
| 9  | 22 | 27 | 29 | 26 | 17 | 15 | 12 | 13 | 16 | 21 | 18 | 15 | 14 | 13 | 12 | 13 | 16 | 15 | 14 | 16 | 18 | 17 | 17 | 21 | 31 | 38 | 41 | 44 | 46 | 46 | 45 | 34 |
| 10 | 23 | 29 | 24 | 16 | 12 | 11 | 11 | 13 | 15 | 17 | 16 | 15 | 15 | 14 | 14 | 15 | 17 | 16 | 14 | 15 | 18 | 18 | 16 | 17 | 27 | 35 | 38 | 41 | 45 | 45 | 43 | 28 |
| 11 | 22 | 30 | 22 | 12 | 11 | 11 | 11 | 13 | 13 | 13 | 13 | 13 | 14 | 14 | 15 | 15 | 17 | 16 | 15 | 14 | 20 | 24 | 18 | 15 | 23 | 31 | 36 | 39 | 44 | 45 | 39 | 25 |
| 12 | 22 | 26 | 18 | 12 | 11 | 11 | 11 | 13 | 12 | 13 | 13 | 13 | 14 | 14 | 15 | 15 | 16 | 17 | 17 | 16 | 14 | 21 | 26 | 16 | 13 | 18 | 27 | 32 | 36 | 40 | 40 | 30 | 18 |
| 13 | 20 | 21 | 14 | 13 | 12 | 14 | 16 | 15 | 13 | 13 | 14 | 15 | 15 | 15 | 15 | 16 | 17 | 18 | 18 | 15 | 16 | 15 | 12 | 11 | 14 | 22 | 29 | 32 | 31 | 27 | 23 | 16 |
| 14 | 14 | 15 | 15 | 14 | 15 | 19 | 19 | 17 | 15 | 13 | 13 | 14 | 14 | 14 | 15 | 16 | 17 | 18 | 19 | 16 | 14 | 11 | 10 | 10 | 11 | 17 | 23 | 25 | 23 | 22 | 22 | 17 |
| 15 | 14 | 14 | 13 | 13 | 14 | 18 | 18 | 16 | 15 | 13 | 12 | 13 | 13 | 13 | 14 | 14 | 15 | 16 | 18 | 16 | 15 | 13 | 11 | 11 | 11 | 14 | 19 | 21 | 21 | 21 | 23 | 20 |
| 16 | 14 | 12 | 11 | 12 | 14 | 16 | 21 | 23 | 17 | 15 | 13 | 12 | 13 | 13 | 13 | 13 | 14 | 16 | 16 | 16 | 15 | 14 | 12 | 12 | 14 | 17 | 20 | 21 | 20 | 23 | 28 | 25 |
| 17 | 15 | 12 | 12 | 14 | 16 | 18 | 25 | 36 | 27 | 22 | 17 | 14 | 13 | 13 | 13 | 13 | 14 | 17 | 18 | 17 | 17 | 15 | 13 | 13 | 17 | 21 | 22 | 22 | 21 | 24 | 34 | 26 |
| 18 | 15 | 15 | 15 | 16 | 17 | 18 | 23 | 37 | 43 | 34 | 25 | 17 | 13 | 13 | 13 | 14 | 15 | 17 | 17 | 17 | 17 | 16 | 15 | 14 | 17 | 21 | 22 | 22 | 23 | 27 | 32 | 32 |
| 19 | 11 | 24 | 23 | 18 | 17 | 18 | 19 | 29 | 49 | 45 | 30 | 20 | 13 | 12 | 13 | 14 | 15 | 17 | 16 | 16 | 16 | 16 | 14 | 13 | 16 | 19 | 21 | 22 | 27 | 32 | 33 | 33 |
| 20 | 20 | 34 | 25 | 18 | 17 | 18 | 19 | 22 | 44 | 51 | 37 | 21 | 15 | 12 | 13 | 14 | 15 | 16 | 16 | 15 | 15 | 14 | 12 | 12 | 14 | 17 | 20 | 22 | 30 | 36 | 33 | 18 |
| 21 | 33 | 31 | 20 | 17 | 19 | 20 | 21 | 22 | 34 | 42 | 29 | 19 | 16 | 14 | 13 | 13 | 15 | 16 | 16 | 15 | 14 | 14 | 17 | 19 | 14 | 15 | 18 | 23 | 31 | 34 | 38 | 22 |
| 22 | 36 | 24 | 18 | 19 | 21 | 22 | 21 | 21 | 23 | 23 | 19 | 17 | 16 | 16 | 14 | 13 | 15 | 15 | 14 | 14 | 15 | 19 | 21 | 27 | 23 | 14 | 17 | 23 | 34 | 37 | 29 | 20 |
| 23 | 25 | 23 | 20 | 20 | 21 | 21 | 20 | 19 | 18 | 17 | 16 | 17 | 17 | 18 | 16 | 14 | 14 | 13 | 13 | 14 | 20 | 24 | 31 | 34 | 30 | 18 | 17 | 22 | 33 | 35 | 21 | 5 |
| 24 | 22 | 25 | 23 | 21 | 20 | 19 | 18 | 17 | 16 | 16 | 17 | 17 | 18 | 18 | 17 | 13 | 13 | 13 | 15 | 19 | 24 | 32 | 36 | 39 | 34 | 28 | 16 | 17 | 24 | 22 | 12 | 2 |
| 25 | 16 | 24 | 27 | 23 | 19 | 17 | 17 | 16 | 16 | 17 | 17 | 18 | 18 | 17 | 16 | 14 | 13 | 17 | 21 | 28 | 31 | 33 | 37 | 39 | 37 | 32 | 27 | 24 | 27 | 16 | 11 | 2 |
| 26 | 13 | 19 | 23 | 23 | 19 | 17 | 16 | 16 | 17 | 18 | 18 | 17 | 16 | 17 | 19 | 19 | 17 | 20 | 23 | 26 | 27 | 30 | 37 | 40 | 38 | 36 | 32 | 33 | 35 | 23 | 13 | 4 |
| 27 | 12 | 14 | 17 | 19 | 18 | 17 | 17 | 17 | 17 | 17 | 16 | 15 | 19 | 21 | 27 | 30 | 22 | 16 | 20 | 24 | 26 | 33 | 39 | 40 | 39 | 39 | 35 | 33 | 32 | 29 | 20 | 3 |
| 28 | 11 | 12 | 13 | 15 | 17 | 17 | 17 | 18 | 17 | 15 | 14 | 16 | 20 | 25 | 34 | 32 | 23 | 18 | 18 | 23 | 28 | 38 | 38 | 38 | 39 | 39 | 36 | 33 | 31 | 30 | 28 | 7 |
| 29 | 10 | 11 | 13 | 14 | 16 | 17 | 18 | 17 | 15 | 15 | 16 | 19 | 22 | 27 | 32 | 30 | 25 | 21 | 18 | 22 | 30 | 34 | 37 | 37 | 37 | 37 | 36 | 35 | 35 | 33 | 30 | 21 |
| 30 | 11 | 11 | 11 | 13 | 15 | 16 | 17 | 16 | 17 | 19 | 23 | 23 | 25 | 30 | 31 | 30 | 26 | 21 | 18 | 15 | 19 | 27 | 33 | 33 | 33 | 35 | 35 | 36 | 36 | 35 | 32 | 22 |
| 31 | 11 | 10 | 10 | 11 | 12 | 14 | 15 | 17 | 20 | 26 | 26 | 25 | 28 | 30 | 29 | 26 | 21 | 18 | 16 | 15 | 14 | 20 | 25 | 24 | 27 | 33 | 35 | 35 | 35 | 34 | 32 | 22 |

Fig. 22

DOWN-SAMPLING TO 1/2 (0003)
(COMPUTED USING OF0003to0004X/Y)

|    | 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|----|----|----|----|----|----|----|----|----|----|----|----|----|----|----|----|----|
| 0  | 7  | 7  | 15 | 21 | 14 | 9  | 9  | 9  | 9  | 9  | 8  | 9  | 21 | 41 | 54 | 58 | 58 | 54 | 31 | 14 | 11 | 11 | 11 | 11 | 11 | 22 | 34 | 29 | 19 | 22 | 27 | 21 |
| 1  | 17 | 29 | 32 | 31 | 28 | 21 | 14 | 12 | 12 | 12 | 11 | 10 | 16 | 42 | 71 | 76 | 76 | 76 | 57 | 30 | 18 | 15 | 15 | 21 | 32 | 33 | 32 | 29 | 27 | 27 | 32 | 33 |
| 2  | 33 | 33 | 33 | 34 | 37 | 36 | 20 | 12 | 11 | 12 | 11 | 11 | 11 | 27 | 52 | 56 | 68 | 53 | 40 | 24 | 18 | 17 | 19 | 27 | 37 | 40 | 37 | 30 | 29 | 31 | 36 | 39 |
| 3  | 33 | 34 | 36 | 42 | 52 | 55 | 31 | 14 | 11 | 12 | 12 | 12 | 11 | 14 | 21 | 43 | 44 | 30 | 20 | 16 | 15 | 21 | 20 | 19 | 40 | 43 | 40 | 33 | 33 | 34 | 36 | 35 |
| 4  | 23 | 40 | 50 | 52 | 58 | 62 | 49 | 20 | 11 | 12 | 13 | 15 | 15 | 13 | 12 | 17 | 21 | 17 | 16 | 15 | 14 | 18 | 22 | 21 | 26 | 32 | 33 | 36 | 36 | 35 | 41 | 33 |
| 5  | 37 | 46 | 51 | 57 | 58 | 58 | 41 | 25 | 14 | 13 | 18 | 20 | 20 | 16 | 12 | 11 | 14 | 15 | 15 | 16 | 14 | 14 | 22 | 26 | 27 | 32 | 36 | 36 | 36 | 39 | 43 | 35 |
| 6  | 18 | 39 | 54 | 55 | 49 | 35 | 31 | 25 | 16 | 13 | 16 | 19 | 18 | 15 | 12 | 10 | 12 | 14 | 15 | 16 | 15 | 13 | 16 | 26 | 32 | 35 | 39 | 40 | 41 | 41 | 44 | 35 |
| 7  | 19 | 39 | 45 | 42 | 30 | 32 | 24 | 20 | 15 | 14 | 15 | 17 | 17 | 15 | 12 | 11 | 11 | 14 | 15 | 16 | 16 | 15 | 15 | 20 | 30 | 37 | 45 | 45 | 44 | 41 | 42 | 44 |
| 8  | 27 | 28 | 32 | 30 | 29 | 23 | 20 | 14 | 13 | 15 | 18 | 20 | 20 | 17 | 13 | 12 | 13 | 15 | 14 | 16 | 17 | 17 | 17 | 18 | 27 | 37 | 41 | 43 | 45 | 45 | 45 | 46 |
| 9  | 28 | 27 | 26 | 25 | 22 | 18 | 13 | 11 | 12 | 14 | 16 | 19 | 19 | 16 | 14 | 14 | 16 | 16 | 14 | 15 | 17 | 18 | 18 | 16 | 20 | 31 | 37 | 40 | 44 | 46 | 46 | 45 |
| 10 | 30 | 30 | 26 | 22 | 17 | 13 | 11 | 11 | 12 | 13 | 13 | 14 | 14 | 14 | 14 | 15 | 17 | 16 | 15 | 14 | 16 | 20 | 21 | 18 | 14 | 23 | 34 | 37 | 41 | 45 | 45 | 42 |
| 11 | 21 | 30 | 28 | 23 | 14 | 12 | 11 | 11 | 13 | 13 | 13 | 13 | 14 | 14 | 15 | 15 | 17 | 17 | 16 | 14 | 15 | 22 | 27 | 22 | 14 | 18 | 28 | 35 | 39 | 43 | 43 | 36 |
| 12 | 27 | 26 | 21 | 16 | 13 | 12 | 11 | 12 | 14 | 14 | 13 | 15 | 15 | 15 | 15 | 16 | 17 | 18 | 18 | 16 | 14 | 17 | 22 | 18 | 12 | 15 | 22 | 30 | 35 | 36 | 33 | 26 |
| 13 | 17 | 17 | 15 | 14 | 14 | 14 | 14 | 18 | 17 | 15 | 14 | 15 | 15 | 15 | 15 | 16 | 17 | 18 | 19 | 17 | 15 | 14 | 14 | 12 | 10 | 12 | 17 | 24 | 28 | 26 | 23 | 22 |
| 14 | 11 | 15 | 14 | 14 | 14 | 14 | 18 | 19 | 17 | 14 | 12 | 13 | 13 | 14 | 14 | 15 | 16 | 17 | 19 | 17 | 15 | 14 | 13 | 11 | 10 | 10 | 13 | 18 | 22 | 21 | 21 | 22 |
| 15 | 10 | 10 | 14 | 12 | 12 | 14 | 18 | 20 | 17 | 15 | 13 | 12 | 13 | 13 | 13 | 13 | 14 | 16 | 16 | 16 | 15 | 13 | 12 | 12 | 12 | 15 | 18 | 21 | 21 | 21 | 21 | 26 |
| 16 | 12 | 12 | 14 | 12 | 13 | 17 | 23 | 30 | 26 | 20 | 17 | 14 | 13 | 13 | 13 | 13 | 14 | 16 | 17 | 17 | 16 | 16 | 14 | 13 | 13 | 16 | 19 | 21 | 22 | 20 | 24 | 33 |
| 17 | 13 | 13 | 15 | 14 | 17 | 18 | 24 | 37 | 39 | 34 | 28 | 22 | 15 | 13 | 13 | 13 | 14 | 16 | 18 | 18 | 18 | 17 | 16 | 14 | 14 | 17 | 21 | 22 | 22 | 22 | 25 | 33 |
| 18 | 11 | 11 | 20 | 18 | 17 | 18 | 20 | 32 | 44 | 49 | 40 | 29 | 22 | 13 | 13 | 14 | 14 | 16 | 17 | 16 | 16 | 16 | 16 | 13 | 13 | 18 | 21 | 22 | 24 | 29 | 33 |
| 19 | 14 | 29 | 27 | 19 | 17 | 18 | 19 | 24 | 37 | 52 | 48 | 33 | 24 | 17 | 12 | 13 | 14 | 16 | 16 | 16 | 15 | 15 | 15 | 13 | 11 | 14 | 19 | 21 | 25 | 33 | 35 |
| 20 | 28 | 35 | 22 | 17 | 18 | 19 | 20 | 21 | 27 | 49 | 48 | 32 | 19 | 15 | 13 | 12 | 13 | 15 | 16 | 16 | 16 | 15 | 14 | 14 | 14 | 15 | 13 | 16 | 20 | 26 | 36 | 37 |
| 21 | 37 | 27 | 18 | 18 | 20 | 22 | 21 | 21 | 22 | 29 | 28 | 21 | 17 | 16 | 15 | 13 | 13 | 15 | 15 | 15 | 15 | 14 | 15 | 21 | 25 | 23 | 17 | 13 | 18 | 25 | 36 | 31 |
| 22 | 28 | 23 | 19 | 20 | 21 | 22 | 21 | 21 | 20 | 19 | 18 | 17 | 17 | 17 | 17 | 16 | 13 | 14 | 14 | 13 | 13 | 17 | 29 | 31 | 27 | 24 | 21 | 15 | 16 | 25 | 36 | 26 |
| 23 | 12 | 25 | 22 | 21 | 21 | 20 | 19 | 18 | 17 | 17 | 16 | 17 | 17 | 18 | 18 | 17 | 15 | 13 | 14 | 13 | 19 | 32 | 36 | 37 | 32 | 27 | 23 | 17 | 16 | 24 | 32 | 30 |
| 24 | 8  | 23 | 25 | 25 | 21 | 19 | 18 | 17 | 16 | 16 | 17 | 17 | 18 | 18 | 18 | 17 | 16 | 13 | 13 | 23 | 30 | 34 | 38 | 39 | 36 | 30 | 26 | 21 | 22 | 24 | 24 | 18 |
| 25 | 8  | 8  | 20 | 27 | 22 | 18 | 17 | 16 | 16 | 17 | 17 | 18 | 17 | 17 | 17 | 17 | 17 | 16 | 20 | 30 | 31 | 32 | 37 | 39 | 38 | 36 | 30 | 29 | 32 | 31 | 26 | 21 |
| 26 | 8  | 8  | 11 | 19 | 20 | 18 | 17 | 16 | 17 | 17 | 17 | 17 | 16 | 17 | 20 | 24 | 24 | 19 | 19 | 24 | 25 | 32 | 39 | 40 | 39 | 38 | 35 | 33 | 35 | 33 | 30 | 26 |
| 27 | 8  | 8  | 11 | 12 | 16 | 17 | 17 | 17 | 18 | 17 | 17 | 15 | 16 | 28 | 35 | 32 | 26 | 20 | 16 | 22 | 29 | 37 | 39 | 39 | 39 | 39 | 37 | 33 | 31 | 30 | 29 | 27 |
| 28 | 8  | 8  | 10 | 11 | 13 | 17 | 18 | 18 | 17 | 17 | 15 | 14 | 20 | 31 | 33 | 31 | 27 | 22 | 19 | 18 | 27 | 36 | 37 | 37 | 38 | 38 | 37 | 35 | 34 | 33 | 31 | 28 |
| 29 | 8  | 8  | 11 | 11 | 11 | 14 | 17 | 17 | 16 | 16 | 17 | 20 | 24 | 29 | 31 | 30 | 30 | 24 | 20 | 16 | 18 | 27 | 35 | 35 | 34 | 35 | 35 | 36 | 36 | 36 | 34 | 29 |
| 30 | 8  | 8  | 11 | 11 | 11 | 11 | 13 | 15 | 17 | 23 | 26 | 25 | 26 | 29 | 31 | 30 | 25 | 21 | 17 | 15 | 14 | 20 | 28 | 29 | 31 | 34 | 35 | 36 | 36 | 36 | 36 | 31 |
| 31 | 7  | 7  | 9  | 9  | 9  | 9  | 9  | 11 | 15 | 23 | 23 | 22 | 24 | 25 | 25 | 23 | 16 | 13 | 13 | 13 | 12 | 12 | 18 | 18 | 24 | 27 | 29 | 30 | 30 | 28 | 29 | 28 |

Fig. 23

RESULTS OF COMPUTING DIFFERENCES
(CORRESPONDING TO BASE IMAGE 0004)

|    | 0  | 1 | 2 | 3  | 4 | 5 | 6  | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|----|---|---|----|---|---|----|---|---|---|----|----|----|----|----|----|----|----|----|----|----|----|----|----|----|----|----|----|----|----|----|----|
| 0  | 6  | 2 | 7 | 10 | 2 | 3 | 3  | 3 | 3 | 3 | 3  | 2  | 0  | 10 | 18 | 21 | 19 | 23 | 10 | 0  | 4  | 4  | 4  | 4  | 3  | 0  | 15 | 14 | 5  | 3  | 15 | 5  |
| 1  | 4  | 3 | 2 | 2  | 1 | 3 | 1  | 0 | 0 | 0 | 0  | 0  | 2  | 6  | 8  | 2  | 0  | 4  | 11 | 1  | 2  | 0  | 1  | 2  | 2  | 4  | 4  | 3  | 0  | 2  | 4  | 7  |
| 2  | 10 | 1 | 0 | 1  | 2 | 2 | 5  | 1 | 0 | 0 | 0  | 0  | 1  | 6  | 1  | 8  | 5  | 5  | 1  | 3  | 0  | 2  | 0  | 0  | 3  | 2  | 2  | 2  | 1  | 2  | 2  | 8  |
| 3  | 9  | 0 | 3 | 3  | 2 | 9 | 1  | 4 | 0 | 0 | 0  | 0  | 0  | 2  | 7  | 8  | 3  | 6  | 5  | 1  | 1  | 3  | 2  | 3  | 4  | 8  | 8  | 3  | 1  | 3  | 3  | 5  |
| 4  | 9  | 3 | 0 | 3  | 2 | 4 | 10 | 4 | 2 | 0 | 1  | 1  | 1  | 0  | 3  | 2  | 2  | 3  | 0  | 0  | 2  | 0  | 1  | 1  | 4  | 1  | 6  | 2  | 3  | 5  | 1  | 7  |
| 5  | 6  | 5 | 2 | 0  | 2 | 3 | 6  | 1 | 2 | 1 | 0  | 4  | 1  | 0  | 0  | 2  | 0  | 0  | 0  | 1  | 1  | 2  | 3  | 1  | 1  | 3  | 4  | 3  | 2  | 2  | 1  | 6  |
| 6  | 5  | 3 | 0 | 4  | 4 | 1 | 2  | 0 | 1 | 2 | 2  | 1  | 0  | 0  | 0  | 1  | 0  | 0  | 0  | 0  | 0  | 1  | 2  | 3  | 1  | 2  | 2  | 0  | 1  | 1  | 0  | 5  |
| 7  | 6  | 3 | 6 | 4  | 4 | 3 | 2  | 0 | 0 | 1 | 2  | 0  | 1  | 0  | 0  | 0  | 1  | 0  | 0  | 0  | 1  | 0  | 2  | 2  | 0  | 2  | 5  | 0  | 1  | 5  | 0  | 6  |
| 8  | 7  | 4 | 0 | 1  | 0 | 1 | 1  | 2 | 0 | 1 | 1  | 1  | 0  | 1  | 0  | 1  | 1  | 0  | 0  | 0  | 0  | 0  | 0  | 2  | 2  | 0  | 0  | 1  | 0  | 1  | 1  | 6  |
| 9  | 8  | 1 | 2 | 2  | 0 | 2 | 1  | 0 | 0 | 1 | 3  | 1  | 0  | 0  | 0  | 0  | 1  | 1  | 1  | 1  | 0  | 0  | 0  | 2  | 1  | 2  | 1  | 0  | 1  | 1  | 0  | 5  |
| 10 | 8  | 1 | 1 | 2  | 2 | 0 | 0  | 0 | 0 | 0 | 1  | 1  | 0  | 0  | 0  | 0  | 1  | 0  | 0  | 1  | 0  | 1  | 0  | 3  | 3  | 2  | 1  | 1  | 2  | 0  | 1  | 6  |
| 11 | 6  | 1 | 3 | 2  | 0 | 0 | 0  | 0 | 1 | 0 | 1  | 1  | 0  | 0  | 0  | 0  | 1  | 0  | 1  | 1  | 1  | 3  | 5  | 2  | 2  | 1  | 1  | 0  | 1  | 4  | 2  | 4  |
| 12 | 8  | 4 | 1 | 1  | 0 | 1 | 1  | 1 | 0 | 1 | 0  | 0  | 0  | 0  | 0  | 0  | 0  | 0  | 0  | 0  | 3  | 4  | 3  | 2  | 2  | 1  | 1  | 1  | 0  | 3  | 0  | 1  |
| 13 | 7  | 2 | 2 | 1  | 0 | 2 | 1  | 2 | 2 | 1 | 1  | 1  | 0  | 0  | 0  | 1  | 0  | 1  | 1  | 0  | 1  | 1  | 2  | 1  | 0  | 2  | 2  | 1  | 1  | 3  | 2  | 3  |
| 14 | 3  | 0 | 1 | 1  | 1 | 2 | 3  | 0 | 0 | 0 | 1  | 0  | 0  | 0  | 0  | 0  | 1  | 1  | 2  | 0  | 0  | 0  | 1  | 0  | 1  | 1  | 2  | 0  | 1  | 0  | 0  | 3  |
| 15 | 2  | 0 | 1 | 1  | 1 | 0 | 2  | 2 | 2 | 1 | 0  | 1  | 0  | 0  | 0  | 0  | 0  | 0  | 1  | 0  | 0  | 1  | 0  | 0  | 0  | 2  | 1  | 0  | 0  | 0  | 1  | 4  |
| 16 | 4  | 1 | 1 | 1  | 1 | 1 | 0  | 1 | 3 | 3 | 1  | 1  | 2  | 0  | 0  | 0  | 0  | 1  | 1  | 0  | 0  | 0  | 0  | 0  | 0  | 0  | 1  | 1  | 0  | 0  | 2  | 1  | 7 |
| 17 | 6  | 1 | 2 | 0  | 1 | 0 | 2  | 9 | 1 | 2 | 0  | 1  | 1  | 0  | 0  | 0  | 1  | 0  | 1  | 1  | 1  | 1  | 1  | 1  | 0  | 2  | 1  | 0  | 0  | 3  | 0  | 9  |
| 18 | 4  | 3 | 1 | 0  | 0 | 0 | 3  | 1 | 7 | 4 | 1  | 2  | 2  | 0  | 0  | 0  | 0  | 1  | 0  | 0  | 0  | 0  | 1  | 1  | 2  | 0  | 0  | 0  | 1  | 0  | 1  | 4  |
| 19 | 0  | 4 | 5 | 2  | 0 | 0 | 1  | 4 | 1 | 8 | 5  | 1  | 1  | 1  | 0  | 0  | 0  | 1  | 0  | 0  | 0  | 0  | 1  | 1  | 1  | 0  | 1  | 0  | 1  | 1  | 1  | 4  |
| 20 | 10 | 8 | 3 | 1  | 0 | 0 | 0  | 2 | 5 | 11| 8  | 2  | 1  | 1  | 1  | 0  | 0  | 1  | 0  | 0  | 0  | 1  | 1  | 2  | 2  | 1  | 0  | 1  | 2  | 2  | 2  | 4  |
| 21 | 15 | 4 | 2 | 1  | 0 | 1 | 0  | 0 | 3 | 2 | 2  | 3  | 0  | 1  | 1  | 0  | 0  | 0  | 0  | 2  | 0  | 2  | 3  | 3  | 3  | 3  | 1  | 0  | 2  | 2  | 1  | 4  |
| 22 | 15 | 6 | 1 | 0  | 0 | 1 | 0  | 1 | 0 | 2 | 2  | 0  | 0  | 0  | 1  | 2  | 0  | 0  | 0  | 1  | 3  | 2  | 2  | 1  | 1  | 1  | 1  | 1  | 0  | 1  | 2  | 5  |
| 23 | 0  | 4 | 1 | 0  | 0 | 0 | 0  | 0 | 0 | 0 | 0  | 0  | 1  | 1  | 0  | 1  | 2  | 2  | 3  | 0  | 2  | 1  | 3  | 0  | 2  | 3  | 1  | 2  | 5  | 5  | 1  |  |
| 24 | 3  | 5 | 0 | 1  | 0 | 0 | 1  | 0 | 0 | 0 | 0  | 0  | 1  | 0  | 0  | 1  | 1  | 2  | 2  | 0  | 0  | 1  | 1  | 2  | 1  | 1  | 0  | 4  | 2  | 1  | 3  | 1  |
| 25 | 2  | 3 | 5 | 4  | 2 | 0 | 0  | 0 | 0 | 0 | 0  | 1  | 0  | 0  | 1  | 2  | 1  | 1  | 3  | 4  | 3  | 1  | 0  | 0  | 0  | 1  | 0  | 2  | 4  | 1  | 2  | 1  |
| 26 | 3  | 2 | 1 | 0  | 1 | 0 | 0  | 0 | 0 | 0 | 0  | 0  | 2  | 2  | 0  | 2  | 3  | 0  | 0  | 5  | 3  | 2  | 2  | 1  | 2  | 2  | 2  | 4  | 2  | 0  | 1  |    |
| 27 | 3  | 0 | 1 | 0  | 0 | 1 | 0  | 0 | 0 | 0 | 0  | 3  | 0  | 6  | 4  | 0  | 0  | 4  | 2  | 0  | 2  | 1  | 0  | 0  | 1  | 1  | 2  | 3  | 1  | 1  | 1  |    |
| 28 | 2  | 0 | 1 | 0  | 0 | 0 | 0  | 0 | 0 | 1 | 2  | 0  | 1  | 3  | 2  | 0  | 1  | 1  | 3  | 1  | 5  | 2  | 0  | 1  | 0  | 1  | 0  | 1  | 0  | 1  | 4  |    |
| 29 | 3  | 0 | 0 | 1  | 1 | 1 | 1  | 0 | 0 | 2 | 1  | 0  | 0  | 0  | 1  | 1  | 0  | 2  | 3  | 0  | 0  | 3  | 0  | 0  | 0  | 0  | 0  | 0  | 1  | 1  | 3  |    |
| 30 | 3  | 0 | 0 | 0  | 1 | 1 | 1  | 0 | 2 | 0 | 3  | 1  | 1  | 1  | 1  | 1  | 2  | 0  | 1  | 0  | 3  | 0  | 1  | 2  | 1  | 1  | 1  | 0  | 0  | 1  | 1  | 1  |
| 31 | 4  | 1 | 1 | 1  | 1 | 1 | 2  | 1 | 5 | 7 | 3  | 3  | 5  | 4  | 4  | 3  | 0  | 1  | 2  | 2  | 2  | 1  | 5  | 3  | 5  | 4  | 5  | 5  | 5  | 3  | 6  | 8  |

Fig. 24

RESULTS OF COMPUTING DIFFERENCES
(CORRESPONDING TO REFERENCE IMAGE 0005)

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | 6 | 2 | 3 | 11 | 6 | 3 | 3 | 3 | 3 | 3 | 3 | 2 | 1 | 9 | 8 | 20 | 20 | 19 | 24 | 1 | 4 | 4 | 4 | 4 | 4 | 1 | 13 | 14 | 12 | 1 | 17 | 5 |
| 1 | 1 | 1 | 5 | 3 | 3 | 2 | 1 | 0 | 0 | 0 | 0 | 0 | 1 | 6 | 1 | 3 | 1 | 1 | 9 | 3 | 2 | 0 | 0 | 2 | 3 | 1 | 4 | 7 | 4 | 0 | 3 | 6 |
| 2 | 10 | 3 | 0 | 0 | 1 | 2 | 4 | 1 | 0 | 0 | 0 | 0 | 1 | 5 | 3 | 8 | 2 | 5 | 9 | 1 | 0 | 1 | 2 | 1 | 3 | 4 | 1 | 2 | 2 | 0 | 5 | 11 |
| 3 | 9 | 1 | 0 | 3 | 3 | 4 | 6 | 5 | 0 | 0 | 0 | 0 | 2 | 2 | 8 | 8 | 1 | 7 | 3 | 0 | 1 | 3 | 1 | 4 | 1 | 8 | 5 | 3 | 1 | 1 | 1 | 6 |
| 4 | 8 | 0 | 4 | 4 | 0 | 1 | 10 | 7 | 1 | 0 | 0 | 0 | 0 | 1 | 6 | 1 | 1 | 5 | 1 | 0 | 2 | 7 | 2 | 1 | 5 | 5 | 3 | 4 | 4 | 5 | 1 | 9 |
| 5 | 9 | 1 | 3 | 0 | 1 | 5 | 9 | 2 | 1 | 1 | 2 | 0 | 0 | 0 | 3 | 2 | 2 | 0 | 0 | 1 | 1 | 3 | 4 | 0 | 1 | 4 | 1 | 0 | 5 | 2 | 1 | 6 |
| 6 | 4 | 6 | 0 | 2 | 4 | 4 | 1 | 3 | 1 | 0 | 6 | 2 | 0 | 0 | 1 | 0 | 0 | 0 | 0 | 1 | 0 | 2 | 1 | 2 | 4 | 3 | 3 | 3 | 2 | 2 | 0 | 7 |
| 7 | 6 | 3 | 1 | 7 | 1 | 4 | 0 | 1 | 0 | 2 | 0 | 0 | 1 | 0 | 0 | 0 | 0 | 0 | 0 | 0 | 1 | 1 | 3 | 3 | 4 | 1 | 5 | 0 | 1 | 6 | 0 | 9 |
| 8 | 6 | 5 | 2 | 2 | 2 | 2 | 1 | 2 | 0 | 1 | 1 | 1 | 0 | 0 | 1 | 1 | 0 | 0 | 0 | 0 | 1 | 0 | 1 | 5 | 1 | 1 | 4 | 0 | 1 | 0 | 1 | 9 |
| 9 | 8 | 1 | 4 | 3 | 2 | 3 | 2 | 0 | 0 | 2 | 1 | 0 | 0 | 0 | 0 | 2 | 0 | 0 | 1 | 0 | 0 | 0 | 0 | 4 | 0 | 1 | 1 | 0 | 1 | 1 | 1 | 10 |
| 10 | 9 | 2 | 1 | 2 | 1 | 0 | 0 | 0 | 1 | 1 | 0 | 1 | 0 | 0 | 0 | 0 | 1 | 0 | 2 | 1 | 0 | 0 | 1 | 4 | 2 | 2 | 1 | 2 | 2 | 0 | 0 | 9 |
| 11 | 6 | 1 | 2 | 1 | 0 | 0 | 0 | 1 | 0 | 1 | 1 | 1 | 0 | 0 | 0 | 0 | 1 | 0 | 0 | 2 | 1 | 3 | 1 | 3 | 2 | 1 | 1 | 1 | 2 | 1 | 1 | 9 |
| 12 | 7 | 7 | 2 | 0 | 0 | 1 | 0 | 0 | 0 | 1 | 0 | 0 | 0 | 0 | 0 | 1 | 1 | 1 | 0 | 1 | 2 | 6 | 0 | 2 | 1 | 1 | 1 | 0 | 0 | 7 | 1 | 1 |
| 13 | 9 | 2 | 1 | 1 | 2 | 2 | 0 | 1 | 1 | 0 | 1 | 1 | 0 | 0 | 0 | 0 | 2 | 0 | 0 | 3 | 3 | 2 | 1 | 2 | 2 | 0 | 2 | 0 | 4 | 2 | 5 |  |
| 14 | 4 | 0 | 2 | 1 | 1 | 5 | 2 | 0 | 0 | 1 | 0 | 0 | 0 | 0 | 1 | 1 | 4 | 0 | 0 | 1 | 0 | 0 | 1 | 2 | 3 | 0 | 3 | 0 | 1 | 5 |  |  |
| 15 | 1 | 0 | 1 | 0 | 1 | 0 | 2 | 2 | 0 | 0 | 1 | 0 | 0 | 0 | 0 | 1 | 0 | 0 | 1 | 0 | 0 | 0 | 1 | 0 | 1 | 3 | 1 | 0 | 0 | 1 | 2 | 5 |
| 16 | 0 | 0 | 1 | 1 | 1 | 1 | 1 | 1 | 2 | 0 | 1 | 0 | 0 | 0 | 0 | 0 | 1 | 0 | 0 | 0 | 0 | 1 | 0 | 0 | 0 | 1 | 1 | 0 | 1 | 0 | 0 | 7 |
| 17 | 1 | 1 | 1 | 0 | 1 | 0 | 0 | 8 | 5 | 1 | 0 | 2 | 0 | 0 | 0 | 1 | 1 | 1 | 0 | 0 | 1 | 1 | 1 | 1 | 1 | 1 | 1 | 2 | 3 | 6 | 12 |  |
| 18 | 1 | 3 | 0 | 1 | 0 | 1 | 4 | 5 | 4 | 2 | 1 | 2 | 1 | 0 | 0 | 1 | 1 | 1 | 0 | 1 | 1 | 1 | 1 | 0 | 0 | 0 | 0 | 1 | 3 | 1 | 0 |  |
| 19 | 1 | 2 | 1 | 1 | 0 | 0 | 1 | 5 | 5 | 1 | 1 | 1 | 2 | 0 | 0 | 0 | 0 | 0 | 0 | 1 | 0 | 0 | 1 | 0 | 1 | 0 | 0 | 2 | 1 | 1 | 2 |  |
| 20 | 2 | 10 | 1 | 1 | 0 | 1 | 0 | 2 | 4 | 11 | 3 | 1 | 1 | 1 | 0 | 0 | 0 | 0 | 0 | 0 | 0 | 2 | 2 | 0 | 0 | 1 | 1 | 1 | 2 | 2 | 6 |  |
| 21 | 15 | 0 | 3 | 1 | 0 | 1 | 0 | 1 | 7 | 17 | 3 | 2 | 0 | 0 | 1 | 0 | 1 | 0 | 1 | 1 | 1 | 2 | 2 | 4 | 3 | 1 | 1 | 1 | 1 | 3 | 2 | 6 |
| 22 | 22 | 7 | 1 | 0 | 0 | 0 | 0 | 0 | 2 | 4 | 3 | 0 | 0 | 0 | 1 | 1 | 1 | 0 | 1 | 1 | 3 | 2 | 1 | 2 | 2 | 1 | 1 | 1 | 0 | 1 | 8 | 8 |
| 23 | 2 | 2 | 0 | 0 | 1 | 0 | 0 | 0 | 0 | 0 | 0 | 0 | 1 | 1 | 2 | 3 | 1 | 1 | 3 | 1 | 2 | 1 | 2 | 1 | 2 | 2 | 1 | 2 | 5 | 0 | 0 |  |
| 24 | 7 | 5 | 2 | 0 | 0 | 0 | 0 | 0 | 0 | 0 | 0 | 0 | 1 | 0 | 1 | 1 | 1 | 3 | 2 | 1 | 1 | 1 | 2 | 3 | 1 | 1 | 2 | 2 | 2 | 2 | 1 | 0 |
| 25 | 3 | 4 | 2 | 1 | 1 | 0 | 0 | 0 | 0 | 0 | 0 | 1 | 0 | 0 | 0 | 1 | 2 | 2 | 2 | 1 | 5 | 0 | 0 | 0 | 1 | 0 | 1 | 4 | 2 | 2 | 2 | 0 |
| 26 | 3 | 2 | 8 | 0 | 1 | 0 | 0 | 0 | 0 | 1 | 0 | 0 | 0 | 1 | 4 | 1 | 1 | 2 | 0 | 2 | 3 | 5 | 1 | 1 | 1 | 1 | 2 | 4 | 5 | 1 | 2 | 1 |
| 27 | 0 | 1 | 2 | 2 | 1 | 0 | 0 | 0 | 1 | 0 | 0 | 0 | 4 | 4 | 1 | 5 | 1 | 4 | 2 | 2 | 2 | 2 | 1 | 0 | 2 | 1 | 0 | 2 | 2 | 0 | 0 |  |
| 28 | 0 | 1 | 1 | 0 | 1 | 1 | 0 | 1 | 0 | 0 | 1 | 2 | 2 | 1 | 6 | 1 | 2 | 1 | 5 | 4 | 0 | 3 | 1 | 1 | 1 | 1 | 2 | 1 | 0 | 1 | 1 | 1 |
| 29 | 0 | 1 | 0 | 0 | 1 | 1 | 0 | 0 | 0 | 2 | 2 | 1 | 1 | 1 | 1 | 0 | 1 | 0 | 0 | 1 | 2 | 1 | 2 | 0 | 0 | 0 | 0 | 0 | 1 | 1 | 0 | 8 |
| 30 | 0 | 0 | 0 | 0 | 1 | 1 | 0 | 0 | 3 | 3 | 3 | 2 | 1 | 1 | 1 | 2 | 2 | 0 | 1 | 2 | 0 | 4 | 0 | 0 | 0 | 0 | 0 | 0 | 1 | 0 | 4 |  |
| 31 | 0 | 0 | 0 | 0 | 1 | 1 | 1 | 1 | 0 | 4 | 0 | 1 | 2 | 2 | 2 | 2 | 0 | 2 | 0 | 1 | 1 | 1 | 2 | 1 | 1 | 1 | 2 | 1 | 2 | 2 | 3 |  |

Fig. 25

RESULTS OF COMPUTING DIFFERENCES
(CORRESPONDING TO REFERENCE IMAGE 0003)

|    | 0  | 1 | 2 | 3  | 4 | 5  | 6  | 7 | 8 | 9  | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|----|---|---|----|---|----|----|---|---|----|----|----|----|----|----|----|----|----|----|----|----|----|----|----|----|----|----|----|----|----|----|----|
| 0  | 6  | 6 | 3 | 11 | 3 | 2  | 3  | 3 | 3 | 3  | 3  | 1  | 8  | 10 | 23 | 20 | 20 | 24 | 6  | 1  | 4  | 4  | 4  | 4  | 3  | 3  | 18 | 11 | 3  | 8  | 14 | 5  |
| 1  | 7  | 3 | 1 | 1  | 2 | 3  | 3  | 0 | 0 | 0  | 0  | 1  | 5  | 1  | 5  | 1  | 1  | 1  | 12 | 2  | 1  | 0  | 1  | 0  | 4  | 1  | 3  | 1  | 1  | 4  | 6  | 10 |
| 2  | 1  | 0 | 0 | 2  | 3 | 6  | 6  | 1 | 0 | 0  | 0  | 0  | 1  | 9  | 9  | 11 | 8  | 3  | 2  | 4  | 0  | 2  | 2  | 2  | 2  | 4  | 2  | 1  | 2  | 0  | 5  | 5  |
| 3  | 0  | 3 | 4 | 0  | 2 | 11 | 7  | 3 | 0 | 0  | 0  | 0  | 0  | 4  | 7  | 6  | 4  | 7  | 4  | 0  | 2  | 6  | 1  | 5  | 9  | 6  | 2  | 4  | 3  | 0  | 4  | 6  |
| 4  | 9  | 2 | 3 | 2  | 3 | 4  | 11 | 4 | 1 | 0  | 1  | 2  | 1  | 0  | 1  | 4  | 2  | 2  | 0  | 0  | 2  | 0  | 1  | 0  | 3  | 4  | 5  | 5  | 4  | 4  | 1  | 10 |
| 5  | 7  | 5 | 1 | 2  | 2 | 4  | 3  | 4 | 2 | 1  | 2  | 6  | 4  | 0  | 0  | 1  | 0  | 0  | 0  | 1  | 1  | 2  | 3  | 1  | 3  | 0  | 3  | 1  | 2  | 2  | 0  | 9  |
| 6  | 6  | 2 | 4 | 4  | 3 | 4  | 2  | 1 | 0 | 1  | 1  | 1  | 0  | 0  | 1  | 0  | 0  | 1  | 0  | 0  | 1  | 1  | 3  | 4  | 4  | 0  | 0  | 1  | 1  | 0  | 0  | 9  |
| 7  | 6  | 1 | 7 | 2  | 4 | 5  | 2  | 1 | 1 | 0  | 1  | 1  | 0  | 1  | 0  | 0  | 0  | 0  | 0  | 1  | 0  | 1  | 4  | 3  | 1  | 5  | 2  | 0  | 0  | 1  | 2  |    |
| 8  | 1  | 3 | 3 | 2  | 2 | 2  | 0  | 2 | 0 | 0  | 1  | 2  | 1  | 1  | 1  | 0  | 0  | 1  | 1  | 0  | 0  | 0  | 0  | 1  | 3  | 1  | 1  | 2  | 0  | 0  | 1  | 1  |
| 9  | 1  | 2 | 1 | 2  | 0 | 1  | 2  | 0 | 1 | 1  | 0  | 3  | 2  | 0  | 0  | 0  | 1  | 1  | 0  | 1  | 0  | 0  | 1  | 3  | 3  | 1  | 1  | 0  | 1  | 1  | 0  |    |
| 10 | 0  | 1 | 1 | 2  | 2 | 1  | 0  | 0 | 0 | 0  | 0  | 0  | 1  | 0  | 0  | 0  | 1  | 0  | 0  | 2  | 0  | 1  | 1  | 2  | 4  | 2  | 2  | 0  | 0  | 1  | 1  | 1  |
| 11 | 6  | 4 | 7 | 2  | 1 | 0  | 0  | 0 | 0 | 1  | 0  | 1  | 0  | 0  | 0  | 1  | 1  | 1  | 0  | 0  | 2  | 2  | 6  | 4  | 2  | 1  | 0  | 1  | 2  | 3  | 5  | 3  |
| 12 | 4  | 3 | 2 | 3  | 0 | 0  | 1  | 2 | 1 | 1  | 0  | 0  | 0  | 0  | 0  | 0  | 1  | 1  | 0  | 1  | 3  | 4  | 1  | 2  | 2  | 1  | 0  | 1  | 1  | 2  | 4  |    |
| 13 | 6  | 2 | 2 | 1  | 1 | 1  | 2  | 4 | 2 | 1  | 0  | 0  | 0  | 1  | 1  | 1  | 0  | 1  | 1  | 0  | 0  | 1  | 2  | 1  | 0  | 1  | 1  | 3  | 2  | 2  | 2  | 0  |
| 14 | 2  | 0 | 0 | 0  | 0 | 1  | 3  | 0 | 1 | 0  | 1  | 0  | 0  | 0  | 0  | 1  | 1  | 1  | 0  | 0  | 0  | 1  | 0  | 1  | 0  | 1  | 2  | 2  | 1  | 0  | 0  | 1  |
| 15 | 2  | 2 | 0 | 1  | 0 | 1  | 2  | 1 | 2 | 1  | 0  | 1  | 0  | 0  | 0  | 0  | 1  | 0  | 0  | 0  | 0  | 1  | 0  | 0  | 1  | 1  | 1  | 0  | 0  | 1  | 0  |    |
| 16 | 4  | 4 | 0 | 1  | 1 | 0  | 0  | 5 | 2 | 3  | 1  | 1  | 0  | 0  | 0  | 0  | 1  | 1  | 0  | 0  | 1  | 0  | 0  | 1  | 1  | 0  | 1  | 1  | 0  | 1  | 1  | 3  |
| 17 | 6  | 6 | 0 | 1  | 1 | 0  | 3  | 7 | 7 | 1  | 1  | 1  | 3  | 0  | 0  | 0  | 1  | 0  | 0  | 0  | 1  | 2  | 1  | 0  | 1  | 1  | 1  | 0  | 0  | 0  | 4  | 8  |
| 18 | 2  | 2 | 1 | 0  | 0 | 0  | 2  | 3 | 6 | 5  | 0  | 2  | 2  | 2  | 0  | 0  | 0  | 0  | 0  | 0  | 0  | 0  | 0  | 1  | 0  | 1  | 1  | 0  | 0  | 2  | 1  | 1  |
| 19 | 0  | 4 | 5 | 2  | 0 | 0  | 0  | 3 | 3 | 9  | 4  | 5  | 2  | 1  | 0  | 0  | 0  | 1  | 0  | 0  | 0  | 0  | 0  | 1  | 0  | 1  | 0  | 1  | 0  | 2  | 4  | 0  |
| 20 | 13 | 6 | 4 | 1  | 1 | 0  | 0  | 2 | 5 | 8  | 16 | 1  | 2  | 0  | 1  | 0  | 0  | 1  | 0  | 0  | 0  | 2  | 1  | 1  | 3  | 0  | 2  | 0  | 0  | 2  | 4  | 3  |
| 21 | 17 | 5 | 2 | 0  | 1 | 1  | 0  | 0 | 1 | 5  | 1  | 4  | 0  | 0  | 1  | 1  | 0  | 1  | 0  | 1  | 3  | 1  | 3  | 0  | 5  | 3  | 3  | 2  | 0  | 1  | 1  | 5  |
| 22 | 8  | 5 | 0 | 0  | 0 | 1  | 0  | 0 | 0 | 1  | 1  | 0  | 0  | 0  | 1  | 1  | 2  | 1  | 0  | 0  | 1  | 3  | 2  | 1  | 1  | 3  | 1  | 2  | 1  | 1  | 1  | 3  |
| 23 | 1  | 5 | 1 | 0  | 0 | 0  | 0  | 0 | 0 | 0  | 0  | 0  | 0  | 0  | 1  | 1  | 0  | 1  | 1  | 2  | 1  | 1  | 2  | 2  | 0  | 1  | 2  | 3  | 2  | 1  | 6  | 4  |
| 24 | 2  | 3 | 0 | 2  | 1 | 0  | 0  | 0 | 0 | 0  | 0  | 1  | 0  | 0  | 0  | 1  | 1  | 2  | 0  | 1  | 1  | 0  | 1  | 1  | 1  | 2  | 3  | 1  | 2  | 3  | 3  |    |
| 25 | 2  | 2 | 2 | 9  | 1 | 0  | 0  | 0 | 0 | 0  | 1  | 0  | 0  | 0  | 1  | 2  | 0  | 5  | 10 | 4  | 0  | 1  | 0  | 0  | 1  | 0  | 0  | 4  | 3  | 1  | 2  |    |
| 26 | 3  | 3 | 1 | 2  | 1 | 0  | 0  | 0 | 0 | 1  | 0  | 0  | 0  | 2  | 4  | 1  | 1  | 1  | 0  | 3  | 4  | 0  | 2  | 2  | 1  | 2  | 0  | 2  | 4  | 2  | 5  | 4  |
| 27 | 2  | 2 | 1 | 0  | 1 | 1  | 0  | 0 | 0 | 0  | 0  | 0  | 2  | 5  | 5  | 3  | 0  | 1  | 3  | 3  | 0  | 2  | 0  | 0  | 0  | 1  | 1  | 1  | 3  | 1  | 1  | 1  |
| 28 | 3  | 3 | 0 | 0  | 1 | 0  | 0  | 0 | 0 | 0  | 0  | 2  | 1  | 2  | 0  | 3  | 1  | 3  | 4  | 3  | 1  | 4  | 1  | 0  | 1  | 0  | 0  | 0  | 1  | 1  | 0  | 2  |
| 29 | 3  | 3 | 0 | 0  | 1 | 0  | 1  | 0 | 0 | 3  | 3  | 1  | 1  | 0  | 0  | 2  | 1  | 1  | 2  | 2  | 3  | 0  | 3  | 0  | 0  | 0  | 0  | 0  | 0  | 0  | 1  | 1  |
| 30 | 3  | 3 | 0 | 0  | 0 | 0  | 1  | 1 | 1 | 1  | 3  | 0  | 1  | 1  | 1  | 1  | 2  | 0  | 1  | 0  | 1  | 1  | 0  | 2  | 0  | 1  | 1  | 0  | 0  | 1  | 1  | 0  |
| 31 | 4  | 4 | 2 | 2  | 2 | 2  | 2  | 1 | 3 | 8  | 6  | 3  | 7  | 7  | 5  | 4  | 0  | 2  | 3  | 3  | 3  | 0  | 2  | 2  | 7  | 5  | 8  | 7  | 7  | 3  | 8  | 9  |

Fig. 26

UP-SAMPLING TO 2/1 (REFERENCE IMAGE 0005) (LEFT HALF)

Fig. 27

UP-SAMPLING TO 2/1 (REFERENCE IMAGE 0005) (RIGHT HALF)

| | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|
| 0 | 43 | 43 | 46 | 47 | 35 | 15 | 4 | 3 | 6 | 8 | 8 | 8 | 8 | 8 | 8 | 8 | 7 | 6 | 4 | 11 | 25 | 31 | 30 | 26 | 18 | 9 | 8 | 18 | 30 | 24 | 14 | 7 |
| 1 | 42 | 42 | 47 | 49 | 38 | 20 | 7 | 3 | 5 | 6 | 7 | 8 | 7 | 7 | 6 | 6 | 6 | 6 | 5 | 12 | 23 | 29 | 26 | 20 | 13 | 7 | 8 | 14 | 25 | 24 | 15 | 8 |
| 2 | 16 | 18 | 24 | 29 | 28 | 21 | 8 | 1 | 0 | 0 | 2 | 2 | 1 | 0 | 0 | 0 | 2 | 6 | 8 | 7 | 3 | 1 | 2 | 3 | 4 | 2 | 1 | 2 | 0 | 8 | 18 | 12 |
| 3 | 6 | 7 | 11 | 18 | 21 | 20 | 6 | 0 | 2 | 3 | 2 | 2 | 3 | 3 | 3 | 1 | 3 | 7 | 7 | 2 | 4 | 8 | 7 | 5 | 1 | 1 | 4 | 9 | 10 | 0 | 21 | 15 |
| 4 | 12 | 11 | 12 | 12 | 14 | 9 | 0 | 3 | 2 | 2 | 3 | 3 | 2 | 1 | 0 | 2 | 6 | 6 | 3 | 1 | 1 | 1 | 3 | 4 | 2 | 2 | 3 | 6 | 5 | 7 | 19 | 19 |
| 5 | 19 | 13 | 9 | 4 | 2 | 5 | 8 | 6 | 2 | 1 | 2 | 1 | 2 | 2 | 0 | 0 | 2 | 2 | 3 | 7 | 11 | 8 | 1 | 4 | 3 | 2 | 1 | 1 | 2 | 11 | 16 | 15 |
| 6 | 18 | 10 | 1 | 8 | 11 | 11 | 8 | 6 | 4 | 0 | 4 | 6 | 6 | 2 | 4 | 7 | 7 | 0 | 10 | 17 | 18 | 12 | 1 | 6 | 4 | 0 | 1 | 1 | 0 | 3 | 12 | 15 |
| 7 | 9 | 2 | 9 | 14 | 12 | 8 | 4 | 3 | 4 | 0 | 7 | 11 | 8 | 1 | 6 | 10 | 10 | 2 | 14 | 18 | 14 | 7 | 0 | 2 | 1 | 1 | 0 | 3 | 6 | 0 | 11 | 17 |
| 8 | 0 | 4 | 9 | 10 | 6 | 3 | 1 | 2 | 4 | 2 | 3 | 8 | 5 | 1 | 4 | 7 | 7 | 0 | 7 | 6 | 0 | 5 | 3 | 2 | 6 | 3 | 4 | 8 | 4 | 2 | 13 | 21 |
| 9 | 5 | 5 | 5 | 4 | 2 | 0 | 0 | 3 | 4 | 2 | 0 | 4 | 2 | 1 | 2 | 4 | 6 | 5 | 4 | 5 | 7 | 1 | 4 | 3 | 1 | 6 | 4 | 1 | 5 | 15 | 21 | |
| 10 | 4 | 3 | 2 | 1 | 1 | 0 | 2 | 1 | 2 | 4 | 5 | 3 | 5 | 5 | 2 | 0 | 3 | 6 | 7 | 4 | 1 | 1 | 1 | 3 | 4 | 0 | 2 | 2 | 7 | 14 | 19 | |
| 11 | 1 | 0 | 0 | 0 | 0 | 0 | 2 | 2 | 1 | 3 | 5 | 4 | 2 | 5 | 4 | 0 | 4 | 5 | 3 | 1 | 2 | 2 | 3 | 5 | 4 | 1 | 3 | 5 | 3 | 6 | 13 | 18 |
| 12 | 1 | 0 | 1 | 0 | 0 | 0 | 1 | 1 | 1 | 4 | 4 | 3 | 0 | 5 | 5 | 1 | 0 | 2 | 2 | 1 | 1 | 2 | 3 | 0 | 3 | 3 | 3 | 2 | 5 | 14 | 19 | |
| 13 | 1 | 0 | 1 | 1 | 0 | 0 | 0 | 1 | 1 | 0 | 2 | 5 | 6 | 3 | 4 | 8 | 7 | 6 | 3 | 2 | 2 | 3 | 2 | 1 | 2 | 2 | 1 | 3 | 2 | 4 | 14 | 20 |
| 14 | 1 | 1 | 0 | 0 | 0 | 0 | 0 | 2 | 1 | 1 | 3 | 5 | 5 | 1 | 2 | 3 | 3 | 0 | 1 | 7 | 9 | 5 | 2 | 2 | 0 | 5 | 7 | 4 | 3 | 12 | 19 | |
| 15 | 2 | 1 | 1 | 0 | 0 | 0 | 0 | 1 | 1 | 0 | 1 | 3 | 5 | 7 | 6 | 3 | 1 | 2 | 1 | 9 | 10 | 5 | 1 | 1 | 0 | 3 | 5 | 2 | 2 | 11 | 16 | |
| 16 | 1 | 0 | 0 | 1 | 1 | 0 | 0 | 1 | 1 | 1 | 0 | 1 | 2 | 6 | 5 | 1 | 1 | 0 | 0 | 4 | 6 | 4 | 2 | 1 | 1 | 0 | 0 | 1 | 4 | 10 | 14 | |
| 17 | 0 | 2 | 1 | 1 | 1 | 1 | 0 | 1 | 1 | 1 | 1 | 1 | 0 | 3 | 1 | 3 | 6 | 4 | 1 | 1 | 1 | 3 | 2 | 1 | 1 | 2 | 2 | 3 | 4 | 10 | 14 | |
| 18 | 2 | 2 | 2 | 0 | 2 | 2 | 0 | 1 | 1 | 1 | 0 | 0 | 1 | 0 | 2 | 2 | 1 | 5 | 5 | 3 | 0 | 1 | 0 | 1 | 1 | 2 | 2 | 3 | 2 | 3 | 8 | 12 |
| 19 | 2 | 2 | 2 | 0 | 2 | 2 | 1 | 1 | 1 | 1 | 0 | 0 | 0 | 1 | 4 | 6 | 4 | 3 | 5 | 5 | 1 | 1 | 2 | 2 | 1 | 3 | 3 | 2 | 1 | 2 | 8 | 12 |
| 20 | 1 | 2 | 1 | 0 | 1 | 2 | 2 | 0 | 1 | 0 | 1 | 0 | 0 | 2 | 6 | 9 | 8 | 2 | 3 | 4 | 3 | 0 | 2 | 2 | 1 | 4 | 2 | 0 | 1 | 1 | 5 | 10 |
| 21 | 1 | 2 | 1 | 0 | 0 | 1 | 3 | 3 | 1 | 1 | 1 | 2 | 3 | 1 | 6 | 9 | 9 | 6 | 1 | 3 | 4 | 2 | 1 | 2 | 0 | 4 | 2 | 0 | 1 | 1 | 6 | 10 |
| 22 | 1 | 1 | 0 | 0 | 1 | 0 | 2 | 4 | 3 | 0 | 3 | 8 | 9 | 5 | 2 | 7 | 7 | 4 | 1 | 2 | 3 | 2 | 1 | 2 | 1 | 3 | 5 | 5 | 4 | 4 | 6 | 9 |
| 23 | 1 | 1 | 0 | 1 | 0 | 0 | 1 | 4 | 4 | 1 | 7 | 12 | 14 | 9 | 1 | 5 | 5 | 2 | 1 | 1 | 1 | 2 | 2 | 1 | 1 | 2 | 8 | 12 | 9 | 5 | 4 | 5 |
| 24 | 1 | 1 | 0 | 0 | 1 | 1 | 1 | 3 | 3 | 1 | 5 | 11 | 11 | 6 | 0 | 4 | 5 | 2 | 1 | 1 | 1 | 1 | 2 | 1 | 0 | 2 | 7 | 10 | 7 | 1 | 1 | 1 |
| 25 | 0 | 1 | 1 | 2 | 2 | 1 | 0 | 1 | 3 | 4 | 0 | 5 | 4 | 1 | 3 | 4 | 4 | 4 | 1 | 1 | 2 | 1 | 2 | 3 | 3 | 2 | 3 | 3 | 0 | 4 | 4 | 1 |
| 26 | 0 | 0 | 1 | 2 | 3 | 2 | 1 | 0 | 2 | 4 | 2 | 2 | 4 | 4 | 3 | 2 | 3 | 3 | 1 | 2 | 3 | 3 | 4 | 4 | 1 | 2 | 4 | 5 | 4 | 1 | 4 | |
| 27 | 1 | 0 | 1 | 1 | 3 | 4 | 2 | 0 | 0 | 2 | 3 | 4 | 4 | 4 | 3 | 2 | 1 | 2 | 3 | 3 | 0 | 4 | 4 | 4 | 2 | 2 | 5 | 6 | 5 | 1 | 3 | 6 |
| 28 | 1 | 0 | 2 | 1 | 3 | 5 | 2 | 0 | 0 | 0 | 1 | 2 | 3 | 2 | 1 | 1 | 1 | 2 | 3 | 4 | 3 | 0 | 2 | 1 | 1 | 3 | 5 | 5 | 2 | 0 | 3 | 6 |
| 29 | 1 | 0 | 1 | 1 | 1 | 2 | 0 | 0 | 0 | 1 | 0 | 1 | 2 | 2 | 1 | 1 | 1 | 2 | 4 | 5 | 5 | 3 | 2 | 2 | 2 | 2 | 1 | 1 | 2 | 1 | 2 | 6 |
| 30 | 0 | 0 | 1 | 1 | 1 | 1 | 1 | 1 | 0 | 1 | 1 | 0 | 1 | 1 | 1 | 1 | 1 | 1 | 2 | 3 | 5 | 4 | 3 | 1 | 1 | 1 | 0 | 1 | 2 | 3 | 2 | 4 | 8 |
| 31 | 1 | 1 | 0 | 0 | 1 | 1 | 1 | 1 | 0 | 0 | 1 | 1 | 0 | 1 | 1 | 0 | 0 | 1 | 2 | 2 | 1 | 0 | 1 | 1 | 1 | 0 | 1 | 2 | 2 | 0 | 6 | 10 |
| 32 | 1 | 1 | 1 | 1 | 0 | 0 | 1 | 1 | 1 | 0 | 0 | 1 | 0 | 1 | 1 | 0 | 0 | 0 | 0 | 1 | 2 | 2 | 2 | 1 | 0 | 1 | 3 | 3 | 1 | 3 | 10 | 13 |
| 33 | 1 | 1 | 1 | 2 | 1 | 1 | 0 | 0 | 1 | 1 | 0 | 0 | 1 | 1 | 1 | 1 | 0 | 1 | 2 | 3 | 3 | 2 | 2 | 1 | 0 | 2 | 4 | 5 | 0 | 7 | 16 | 17 |
| 34 | 1 | 2 | 1 | 2 | 2 | 2 | 2 | 1 | 1 | 1 | 1 | 1 | 1 | 1 | 2 | 1 | 1 | 3 | 3 | 3 | 2 | 1 | 1 | 0 | 2 | 5 | 7 | 1 | 10 | 17 | 17 | |
| 35 | 1 | 2 | 0 | 1 | 1 | 1 | 1 | 1 | 2 | 2 | 3 | 2 | 1 | 0 | 1 | 1 | 1 | 0 | 2 | 2 | 1 | 1 | 1 | 0 | 1 | 4 | 8 | 3 | 7 | 14 | 11 | |
| 36 | 1 | 1 | 0 | 1 | 0 | 1 | 1 | 0 | 0 | 1 | 1 | 2 | 2 | 2 | 2 | 0 | 2 | 2 | 1 | 2 | 2 | 1 | 0 | 0 | 1 | 2 | 3 | 4 | 2 | 3 | 8 | 6 |
| 37 | 1 | 1 | 1 | 1 | 0 | 0 | 1 | 1 | 0 | 1 | 1 | 0 | 0 | 0 | 1 | 2 | 2 | 0 | 3 | 3 | 0 | 2 | 2 | 1 | 0 | 0 | 2 | 3 | 2 | 1 | 2 | 5 | 4 |
| 38 | 0 | 0 | 1 | 1 | 0 | 0 | 0 | 0 | 1 | 1 | 1 | 0 | 1 | 2 | 0 | 2 | 3 | 3 | 1 | 1 | 2 | 2 | 1 | 0 | 2 | 4 | 0 | 3 | 3 | 3 | 5 | 5 |
| 39 | 0 | 1 | 1 | 1 | 0 | 0 | 0 | 0 | 0 | 0 | 0 | 1 | 0 | 2 | 3 | 4 | 3 | 2 | 0 | 1 | 2 | 1 | 0 | 3 | 4 | 1 | 5 | 4 | 4 | 6 | 7 | |
| 40 | 0 | 1 | 2 | 1 | 0 | 1 | 1 | 1 | 0 | 1 | 1 | 1 | 0 | 2 | 5 | 5 | 4 | 3 | 3 | 2 | 0 | 1 | 1 | 0 | 3 | 3 | 2 | 6 | 6 | 5 | 8 | 8 |
| 41 | 0 | 1 | 2 | 0 | 1 | 1 | 1 | 0 | 1 | 1 | 1 | 0 | 3 | 4 | 5 | 3 | 0 | 0 | 4 | 4 | 2 | 0 | 1 | 0 | 3 | 3 | 3 | 7 | 7 | 6 | 9 | 8 |
| 42 | 0 | 1 | 1 | 0 | 1 | 0 | 1 | 0 | 2 | 4 | 6 | 4 | 0 | 5 | 6 | 2 | 5 | 5 | 4 | 2 | 0 | 0 | 3 | 2 | 2 | 5 | 7 | 11 | 11 | 8 | | |
| 43 | 0 | 1 | 1 | 0 | 0 | 1 | 3 | 3 | 1 | 3 | 5 | 7 | 7 | 4 | 2 | 7 | 8 | 5 | 3 | 4 | 4 | 3 | 1 | 1 | 3 | 2 | 1 | 2 | 9 | 13 | 13 | 9 |
| 44 | 1 | 2 | 2 | 1 | 0 | 0 | 1 | 0 | 2 | 5 | 6 | 5 | 2 | 0 | 2 | 4 | 5 | 5 | 1 | 2 | 3 | 3 | 3 | 2 | 2 | 0 | 1 | 2 | 2 | 7 | 11 | 11 |
| 45 | 1 | 2 | 4 | 1 | 1 | 2 | 2 | 4 | 5 | 6 | 5 | 2 | 1 | 4 | 4 | 3 | 2 | 2 | 1 | 1 | 4 | 5 | 4 | 3 | 1 | 1 | 4 | 5 | 6 | 7 | 8 | 6 |
| 46 | 2 | 0 | 3 | 1 | 2 | 4 | 5 | 5 | 4 | 2 | 1 | 2 | 3 | 5 | 6 | 4 | 1 | 0 | 1 | 0 | 4 | 6 | 5 | 4 | 3 | 1 | 5 | 10 | 11 | 11 | 4 | 0 |
| 47 | 2 | 2 | 0 | 1 | 4 | 5 | 5 | 4 | 2 | 1 | 3 | 4 | 4 | 5 | 7 | 6 | 2 | 1 | 2 | 1 | 3 | 6 | 5 | 5 | 5 | 1 | 4 | 9 | 8 | 6 | 0 | 1 |
| 48 | 2 | 3 | 4 | 4 | 4 | 4 | 3 | 1 | 1 | 2 | 3 | 4 | 3 | 4 | 5 | 5 | 3 | 2 | 1 | 0 | 1 | 5 | 7 | 6 | 6 | 4 | 0 | 1 | 2 | 3 | 2 | 1 |
| 49 | 2 | 4 | 5 | 3 | 1 | 0 | 0 | 2 | 5 | 4 | 3 | 2 | 2 | 1 | 2 | 3 | 2 | 0 | 0 | 1 | 3 | 6 | 6 | 6 | 3 | 4 | 3 | 6 | 6 | 1 | 1 | |
| 50 | 3 | 3 | 2 | 2 | 4 | 7 | 6 | 11 | 9 | 2 | 0 | 0 | 0 | 1 | 0 | 1 | 1 | 1 | 1 | 1 | 1 | 4 | 4 | 2 | 5 | 0 | 4 | 4 | 4 | 0 | 0 | 3 |
| 51 | 2 | 1 | 1 | 4 | 6 | 9 | 11 | 13 | 5 | 4 | 5 | 2 | 1 | 2 | 1 | 0 | 0 | 1 | 2 | 2 | 0 | 1 | 0 | 4 | 9 | 10 | 3 | 1 | 1 | 2 | 1 | 3 |
| 52 | 1 | 1 | 0 | 1 | 2 | 4 | 5 | 3 | 4 | 9 | 7 | 3 | 2 | 4 | 3 | 2 | 0 | 0 | 3 | 3 | 1 | 2 | 1 | 6 | 11 | 10 | 6 | 3 | 2 | 1 | 1 | 2 |
| 53 | 4 | 2 | 1 | 3 | 2 | 0 | 2 | 4 | 8 | 8 | 4 | 0 | 3 | 5 | 4 | 2 | 0 | 0 | 3 | 3 | 1 | 2 | 1 | 3 | 6 | 5 | 5 | 6 | 6 | 4 | 2 | 1 |
| 54 | 4 | 0 | 2 | 5 | 6 | 2 | 0 | 0 | 3 | 3 | 2 | 4 | 4 | 3 | 2 | 1 | 0 | 0 | 3 | 3 | 1 | 1 | 3 | 2 | 2 | 2 | 0 | 3 | 4 | 4 | 2 | 1 |
| 55 | 1 | 2 | 2 | 4 | 6 | 4 | 0 | 4 | 2 | 2 | 6 | 6 | 2 | 0 | 0 | 0 | 0 | 1 | 2 | 3 | 3 | 1 | 2 | 4 | 5 | 4 | 2 | 1 | 1 | 3 | 2 | 2 |
| 56 | 0 | 3 | 3 | 0 | 1 | 4 | 4 | 0 | 2 | 3 | 8 | 7 | 1 | 2 | 1 | 0 | 1 | 1 | 2 | 2 | 2 | 2 | 0 | 2 | 1 | 0 | 1 | 1 | 1 | 2 | 4 | 5 |
| 57 | 0 | 2 | 3 | 1 | 3 | 2 | 5 | 2 | 1 | 4 | 7 | 6 | 2 | 0 | 0 | 0 | 1 | 1 | 0 | 0 | 1 | 1 | 1 | 1 | 2 | 1 | 0 | 0 | 2 | 5 | 7 | |
| 58 | 1 | 0 | 1 | 2 | 4 | 1 | 4 | 3 | 1 | 1 | 2 | 4 | 5 | 4 | 2 | 0 | 0 | 0 | 0 | 1 | 0 | 0 | 0 | 1 | 1 | 1 | 2 | 2 | 1 | 3 | 7 | 10 |
| 59 | 3 | 3 | 2 | 3 | 4 | 1 | 3 | 5 | 4 | 3 | 2 | 1 | 6 | 7 | 3 | 1 | 1 | 1 | 0 | 0 | 1 | 1 | 0 | 0 | 1 | 1 | 2 | 2 | 2 | 2 | 6 | 8 |
| 60 | 4 | 4 | 3 | 2 | 1 | 0 | 1 | 3 | 5 | 5 | 3 | 0 | 4 | 6 | 4 | 2 | 0 | 1 | 1 | 1 | 0 | 1 | 1 | 0 | 1 | 1 | 2 | 3 | 2 | 2 | 4 | 5 |
| 61 | 3 | 2 | 1 | 1 | 1 | 0 | 1 | 0 | 2 | 3 | 2 | 0 | 3 | 4 | 2 | 1 | 1 | 2 | 3 | 3 | 2 | 1 | 2 | 2 | 3 | 3 | 3 | 4 | 4 | 4 | 5 | 6 |
| 62 | 2 | 1 | 0 | 1 | 2 | 3 | 4 | 4 | 2 | 1 | 0 | 2 | 4 | 4 | 1 | 6 | 8 | 8 | 8 | 8 | 9 | 9 | 9 | 8 | 7 | 6 | 8 | 10 | 11 | 11 | 9 | |
| 63 | 1 | 1 | 1 | 2 | 4 | 4 | 5 | 5 | 4 | 3 | 0 | 2 | 4 | 3 | 1 | 3 | 7 | 10 | 9 | 9 | 10 | 11 | 11 | 11 | 10 | 8 | 7 | 9 | 13 | 14 | 13 | 8 |

Fig. 28

125: HIGH-RESOLUTION IMAGE 0004 (LEFT HALF)

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | 7 | 9 | 9 | 12 | 16 | 19 | 21 | 20 | 14 | 11 | 9 | 9 | 9 | 9 | 9 | 9 | 9 | 9 | 9 | 8 | 8 | 8 | 8 | 9 | 14 | 24 | 34 | 44 | 52 | 56 | 59 |
| 1 | 11 | 15 | 16 | 19 | 24 | 28 | 30 | 27 | 21 | 17 | 14 | 12 | 12 | 11 | 12 | 12 | 12 | 12 | 12 | 11 | 11 | 11 | 10 | 10 | 11 | 17 | 29 | 42 | 58 | 69 | 75 | 78 |
| 2 | 14 | 20 | 24 | 27 | 30 | 31 | 32 | 30 | 26 | 21 | 16 | 13 | 12 | 11 | 11 | 12 | 12 | 12 | 12 | 11 | 11 | 11 | 10 | 10 | 14 | 21 | 35 | 56 | 69 | 74 | 77 | |
| 3 | 18 | 25 | 30 | 32 | 32 | 33 | 32 | 31 | 29 | 26 | 21 | 17 | 14 | 12 | 12 | 11 | 12 | 12 | 12 | 12 | 11 | 11 | 11 | 10 | 10 | 12 | 16 | 29 | 50 | 65 | 72 | 76 |
| 4 | 22 | 30 | 32 | 33 | 33 | 33 | 32 | 32 | 31 | 30 | 30 | 25 | 17 | 13 | 12 | 11 | 11 | 12 | 12 | 12 | 11 | 11 | 11 | 11 | 10 | 11 | 12 | 22 | 40 | 56 | 69 | 76 |
| 5 | 25 | 33 | 33 | 33 | 33 | 33 | 33 | 34 | 36 | 38 | 40 | 36 | 24 | 17 | 13 | 11 | 11 | 11 | 12 | 12 | 11 | 11 | 11 | 11 | 10 | 10 | 10 | 17 | 30 | 45 | 62 | 70 |
| 6 | 25 | 33 | 33 | 32 | 32 | 33 | 35 | 38 | 43 | 48 | 53 | 49 | 36 | 25 | 16 | 11 | 11 | 11 | 11 | 12 | 12 | 11 | 11 | 11 | 10 | 10 | 10 | 13 | 20 | 32 | 51 | 59 |
| 7 | 25 | 33 | 33 | 33 | 34 | 36 | 39 | 43 | 48 | 54 | 60 | 58 | 47 | 34 | 20 | 13 | 12 | 11 | 11 | 12 | 12 | 12 | 12 | 11 | 11 | 11 | 10 | 12 | 14 | 23 | 38 | 46 |
| 8 | 25 | 33 | 33 | 35 | 39 | 43 | 47 | 50 | 52 | 56 | 62 | 62 | 57 | 45 | 27 | 16 | 12 | 11 | 11 | 11 | 12 | 12 | 12 | 12 | 12 | 12 | 11 | 11 | 12 | 16 | 25 | 29 |
| 9 | 23 | 33 | 35 | 39 | 44 | 48 | 52 | 55 | 55 | 58 | 62 | 63 | 61 | 50 | 30 | 18 | 13 | 11 | 11 | 12 | 12 | 13 | 15 | 15 | 14 | 13 | 13 | 12 | 11 | 12 | 16 | 19 |
| 10 | 21 | 32 | 41 | 46 | 49 | 52 | 55 | 57 | 58 | 60 | 61 | 61 | 58 | 48 | 31 | 20 | 14 | 11 | 11 | 12 | 14 | 16 | 20 | 20 | 18 | 16 | 14 | 13 | 11 | 11 | 13 | 14 |
| 11 | 19 | 31 | 42 | 49 | 51 | 54 | 56 | 58 | 59 | 59 | 57 | 55 | 51 | 42 | 30 | 21 | 15 | 11 | 11 | 12 | 15 | 18 | 22 | 22 | 19 | 17 | 14 | 13 | 11 | 11 | 11 | 11 |
| 12 | 18 | 29 | 40 | 47 | 50 | 53 | 58 | 59 | 59 | 55 | 50 | 44 | 39 | 33 | 27 | 21 | 15 | 12 | 12 | 13 | 17 | 20 | 21 | 21 | 18 | 16 | 14 | 12 | 11 | 10 | 10 | 11 |
| 13 | 18 | 28 | 36 | 43 | 49 | 53 | 57 | 57 | 53 | 48 | 41 | 36 | 32 | 28 | 24 | 20 | 16 | 13 | 12 | 13 | 17 | 19 | 20 | 19 | 17 | 15 | 13 | 12 | 11 | 10 | 10 | 11 |
| 14 | 18 | 27 | 31 | 38 | 48 | 53 | 54 | 50 | 42 | 36 | 32 | 29 | 28 | 25 | 21 | 18 | 15 | 14 | 13 | 13 | 15 | 16 | 17 | 17 | 16 | 14 | 13 | 12 | 11 | 11 | 10 | 11 |
| 15 | 19 | 26 | 28 | 33 | 43 | 48 | 47 | 43 | 35 | 29 | 27 | 25 | 24 | 22 | 18 | 16 | 15 | 14 | 14 | 14 | 15 | 16 | 17 | 17 | 15 | 14 | 12 | 12 | 11 | 11 | 11 | 11 |
| 16 | 21 | 27 | 26 | 29 | 35 | 38 | 38 | 35 | 31 | 27 | 25 | 22 | 20 | 17 | 15 | 14 | 14 | 15 | 15 | 17 | 18 | 19 | 19 | 18 | 16 | 14 | 13 | 12 | 11 | 11 | 11 | 12 |
| 17 | 22 | 28 | 26 | 26 | 30 | 31 | 31 | 30 | 27 | 24 | 22 | 19 | 16 | 14 | 12 | 12 | 13 | 14 | 16 | 17 | 20 | 21 | 20 | 19 | 17 | 15 | 13 | 12 | 12 | 12 | 12 | 13 |
| 18 | 23 | 29 | 27 | 26 | 27 | 28 | 28 | 27 | 24 | 20 | 17 | 14 | 13 | 12 | 12 | 12 | 13 | 14 | 15 | 17 | 20 | 22 | 21 | 19 | 17 | 15 | 14 | 13 | 13 | 13 | 13 | 14 |
| 19 | 23 | 30 | 28 | 27 | 26 | 25 | 25 | 23 | 20 | 17 | 14 | 12 | 11 | 11 | 11 | 12 | 13 | 13 | 14 | 16 | 19 | 21 | 19 | 18 | 16 | 15 | 14 | 14 | 13 | 13 | 14 | 15 |
| 20 | 23 | 30 | 30 | 29 | 27 | 24 | 21 | 18 | 15 | 13 | 12 | 11 | 11 | 11 | 12 | 13 | 13 | 14 | 15 | 16 | 16 | 15 | 15 | 15 | 15 | 14 | 14 | 14 | 14 | 14 | 14 | 15 |
| 21 | 22 | 30 | 30 | 30 | 28 | 24 | 18 | 14 | 13 | 11 | 11 | 11 | 11 | 11 | 12 | 12 | 13 | 13 | 13 | 14 | 14 | 13 | 13 | 13 | 14 | 14 | 14 | 14 | 14 | 14 | 15 | 15 |
| 22 | 21 | 29 | 30 | 30 | 29 | 25 | 18 | 14 | 12 | 11 | 11 | 11 | 11 | 11 | 12 | 12 | 13 | 13 | 13 | 13 | 12 | 12 | 13 | 13 | 14 | 14 | 14 | 14 | 14 | 15 | 15 | 16 |
| 23 | 21 | 29 | 31 | 30 | 27 | 23 | 17 | 13 | 12 | 11 | 11 | 11 | 11 | 11 | 11 | 12 | 13 | 13 | 12 | 12 | 12 | 12 | 13 | 13 | 14 | 14 | 14 | 14 | 15 | 15 | 15 | 16 |
| 24 | 22 | 30 | 31 | 29 | 24 | 19 | 15 | 13 | 12 | 12 | 11 | 10 | 10 | 11 | 11 | 12 | 13 | 13 | 12 | 12 | 13 | 13 | 14 | 14 | 15 | 14 | 14 | 15 | 15 | 15 | 15 | 16 |
| 25 | 21 | 28 | 28 | 25 | 20 | 16 | 14 | 13 | 13 | 12 | 11 | 11 | 12 | 13 | 13 | 14 | 14 | 13 | 12 | 12 | 13 | 14 | 15 | 15 | 15 | 15 | 15 | 15 | 15 | 15 | 16 | 16 |
| 26 | 19 | 24 | 22 | 19 | 16 | 14 | 14 | 14 | 13 | 13 | 12 | 15 | 16 | 17 | 16 | 15 | 13 | 13 | 14 | 15 | 15 | 15 | 15 | 15 | 15 | 15 | 16 | 16 | 17 | 17 | | |
| 27 | 16 | 20 | 17 | 15 | 14 | 14 | 15 | 15 | 14 | 13 | 13 | 15 | 18 | 19 | 19 | 18 | 17 | 16 | 14 | 13 | 14 | 14 | 15 | 15 | 15 | 15 | 15 | 15 | 16 | 16 | 16 | 17 |
| 28 | 12 | 16 | 16 | 15 | 15 | 15 | 15 | 15 | 14 | 14 | 16 | 18 | 21 | 21 | 19 | 17 | 16 | 15 | 13 | 13 | 13 | 14 | 14 | 14 | 14 | 14 | 14 | 14 | 14 | 15 | 15 | 16 |
| 29 | 10 | 14 | 15 | 15 | 14 | 14 | 14 | 14 | 14 | 16 | 18 | 21 | 21 | 18 | 16 | 15 | 14 | 14 | 13 | 12 | 12 | 13 | 13 | 13 | 13 | 13 | 13 | 13 | 13 | 14 | 14 | 15 |
| 30 | 9 | 13 | 14 | 14 | 13 | 13 | 12 | 12 | 13 | 14 | 15 | 17 | 18 | 17 | 16 | 15 | 14 | 14 | 13 | 12 | 12 | 12 | 13 | 13 | 13 | 13 | 13 | 13 | 13 | 13 | 14 | 14 |
| 31 | 9 | 13 | 14 | 14 | 12 | 12 | 11 | 12 | 12 | 13 | 14 | 15 | 17 | 19 | 20 | 19 | 17 | 15 | 15 | 14 | 13 | 12 | 12 | 12 | 13 | 13 | 13 | 13 | 13 | 13 | 13 | 13 |
| 32 | 11 | 14 | 15 | 14 | 12 | 11 | 11 | 12 | 13 | 14 | 15 | 18 | 20 | 23 | 26 | 25 | 20 | 17 | 16 | 15 | 14 | 13 | 12 | 12 | 13 | 13 | 13 | 13 | 13 | 13 | 13 | 13 |
| 33 | 12 | 16 | 15 | 14 | 12 | 11 | 12 | 12 | 14 | 15 | 17 | 19 | 22 | 26 | 32 | 32 | 25 | 21 | 20 | 18 | 17 | 16 | 14 | 12 | 13 | 13 | 13 | 13 | 13 | 13 | 13 | 13 |
| 34 | 14 | 17 | 16 | 14 | 12 | 12 | 13 | 14 | 16 | 17 | 17 | 19 | 21 | 28 | 38 | 40 | 34 | 29 | 26 | 23 | 22 | 20 | 17 | 14 | 13 | 12 | 13 | 13 | 13 | 13 | 13 | 13 |
| 35 | 14 | 17 | 16 | 14 | 13 | 13 | 14 | 16 | 17 | 18 | 18 | 19 | 20 | 27 | 38 | 43 | 40 | 38 | 34 | 30 | 27 | 24 | 20 | 17 | 14 | 12 | 13 | 13 | 13 | 13 | 13 | 13 |
| 36 | 12 | 15 | 14 | 14 | 15 | 16 | 16 | 17 | 17 | 17 | 18 | 18 | 19 | 23 | 32 | 39 | 46 | 47 | 44 | 40 | 33 | 28 | 25 | 21 | 15 | 13 | 12 | 13 | 13 | 13 | 13 | 14 |
| 37 | 11 | 15 | 17 | 19 | 20 | 20 | 18 | 17 | 17 | 17 | 18 | 18 | 18 | 21 | 27 | 35 | 46 | 51 | 51 | 47 | 37 | 30 | 28 | 23 | 17 | 14 | 12 | 12 | 13 | 13 | 14 | 14 |
| 38 | 10 | 17 | 24 | 28 | 28 | 25 | 20 | 17 | 17 | 17 | 18 | 18 | 18 | 20 | 23 | 30 | 40 | 49 | 55 | 52 | 39 | 32 | 29 | 25 | 20 | 16 | 13 | 12 | 13 | 13 | 13 | 14 |
| 39 | 14 | 22 | 31 | 34 | 31 | 26 | 20 | 17 | 17 | 17 | 18 | 18 | 19 | 19 | 20 | 25 | 35 | 45 | 56 | 56 | 44 | 35 | 30 | 25 | 20 | 16 | 13 | 12 | 12 | 13 | 13 | 14 |
| 40 | 22 | 32 | 38 | 36 | 27 | 21 | 18 | 17 | 17 | 18 | 18 | 19 | 19 | 20 | 20 | 23 | 28 | 39 | 54 | 58 | 51 | 42 | 30 | 23 | 19 | 16 | 13 | 12 | 12 | 12 | 13 | 13 |
| 41 | 29 | 39 | 39 | 34 | 24 | 18 | 17 | 17 | 18 | 18 | 19 | 20 | 20 | 20 | 21 | 24 | 33 | 48 | 53 | 48 | 40 | 28 | 20 | 18 | 16 | 14 | 13 | 12 | 12 | 13 | 13 | |
| 42 | 35 | 43 | 34 | 27 | 20 | 17 | 17 | 17 | 19 | 20 | 21 | 21 | 21 | 21 | 21 | 22 | 28 | 38 | 40 | 36 | 29 | 22 | 18 | 17 | 16 | 15 | 13 | 12 | 12 | 13 | | |
| 43 | 38 | 43 | 30 | 21 | 18 | 17 | 17 | 18 | 20 | 21 | 22 | 22 | 22 | 21 | 21 | 21 | 24 | 29 | 30 | 26 | 22 | 18 | 16 | 16 | 16 | 16 | 16 | 14 | 13 | 13 | 13 | |
| 44 | 36 | 41 | 26 | 19 | 18 | 19 | 19 | 20 | 21 | 22 | 22 | 22 | 21 | 21 | 21 | 21 | 22 | 22 | 20 | 18 | 17 | 16 | 16 | 16 | 16 | 16 | 16 | 15 | 13 | 13 | | |
| 45 | 29 | 34 | 25 | 20 | 19 | 19 | 20 | 20 | 21 | 21 | 22 | 22 | 21 | 21 | 20 | 20 | 19 | 19 | 18 | 17 | 16 | 17 | 17 | 17 | 17 | 17 | 17 | 16 | 14 | 13 | | |
| 46 | 16 | 23 | 24 | 24 | 22 | 20 | 20 | 21 | 21 | 21 | 21 | 21 | 20 | 20 | 19 | 18 | 18 | 17 | 17 | 16 | 16 | 16 | 17 | 17 | 17 | 18 | 18 | 18 | 17 | 16 | 14 | |
| 47 | 10 | 17 | 24 | 26 | 23 | 22 | 21 | 21 | 21 | 20 | 20 | 20 | 19 | 19 | 18 | 17 | 17 | 17 | 16 | 16 | 16 | 16 | 17 | 17 | 18 | 18 | 19 | 19 | 18 | 16 | 15 | |
| 48 | 9 | 16 | 24 | 27 | 25 | 23 | 22 | 21 | 20 | 20 | 19 | 18 | 18 | 18 | 17 | 17 | 17 | 16 | 16 | 16 | 16 | 17 | 17 | 17 | 18 | 18 | 18 | 18 | 17 | 17 | 15 | |
| 49 | 8 | 14 | 21 | 25 | 26 | 26 | 24 | 23 | 21 | 19 | 18 | 18 | 17 | 17 | 17 | 16 | 16 | 16 | 17 | 17 | 17 | 17 | 18 | 18 | 18 | 18 | 17 | 17 | 16 | 15 | | |
| 50 | 8 | 12 | 15 | 20 | 26 | 29 | 29 | 26 | 21 | 18 | 18 | 17 | 17 | 16 | 16 | 16 | 16 | 17 | 17 | 18 | 18 | 18 | 18 | 18 | 17 | 17 | 16 | 16 | 15 | 14 | | |
| 51 | 8 | 11 | 12 | 16 | 24 | 28 | 28 | 26 | 21 | 19 | 18 | 17 | 17 | 16 | 16 | 16 | 16 | 17 | 17 | 18 | 18 | 18 | 18 | 17 | 17 | 17 | 16 | 16 | 16 | 16 | | |
| 52 | 8 | 10 | 11 | 13 | 18 | 21 | 22 | 22 | 21 | 20 | 18 | 17 | 17 | 16 | 16 | 16 | 16 | 17 | 17 | 18 | 18 | 18 | 17 | 17 | 17 | 16 | 16 | 16 | 17 | 19 | 20 | 21 |
| 53 | 8 | 10 | 11 | 12 | 14 | 16 | 18 | 20 | 20 | 20 | 18 | 17 | 16 | 16 | 17 | 17 | 17 | 18 | 18 | 17 | 17 | 17 | 16 | 16 | 16 | 17 | 19 | 22 | 24 | 25 | 25 | |
| 54 | 8 | 10 | 11 | 12 | 12 | 14 | 16 | 18 | 19 | 18 | 17 | 16 | 16 | 16 | 17 | 17 | 18 | 17 | 17 | 16 | 15 | 15 | 14 | 16 | 20 | 26 | 31 | 34 | 33 | 30 | | |
| 55 | 8 | 10 | 11 | 11 | 11 | 12 | 15 | 16 | 17 | 18 | 16 | 17 | 17 | 18 | 18 | 17 | 16 | 16 | 15 | 14 | 14 | 15 | 18 | 23 | 29 | 35 | 37 | 35 | 31 | | | |
| 56 | 8 | 10 | 10 | 11 | 11 | 12 | 14 | 16 | 17 | 17 | 17 | 17 | 18 | 18 | 18 | 17 | 16 | 15 | 14 | 14 | 13 | 15 | 17 | 21 | 26 | 30 | 35 | 36 | 32 | 29 | | |
| 57 | 8 | 10 | 10 | 10 | 11 | 11 | 13 | 15 | 16 | 17 | 17 | 17 | 18 | 18 | 18 | 17 | 17 | 15 | 15 | 14 | 14 | 15 | 16 | 19 | 23 | 27 | 30 | 34 | 34 | 31 | 29 | |
| 58 | 8 | 11 | 10 | 11 | 11 | 11 | 12 | 13 | 15 | 16 | 17 | 18 | 18 | 18 | 17 | 17 | 16 | 14 | 14 | 15 | 16 | 18 | 19 | 21 | 24 | 27 | 29 | 32 | 32 | 31 | 30 | |
| 59 | 8 | 11 | 11 | 11 | 11 | 11 | 11 | 12 | 14 | 15 | 16 | 17 | 18 | 17 | 17 | 16 | 16 | 15 | 16 | 18 | 20 | 21 | 22 | 23 | 25 | 28 | 29 | 31 | 31 | 31 | 30 | |
| 60 | 8 | 11 | 11 | 11 | 11 | 11 | 11 | 11 | 12 | 13 | 14 | 15 | 16 | 16 | 16 | 17 | 19 | 21 | 24 | 25 | 23 | 23 | 24 | 26 | 29 | 30 | 31 | 31 | 31 | 31 | 30 | |
| 61 | 8 | 11 | 11 | 11 | 11 | 11 | 11 | 11 | 11 | 12 | 13 | 15 | 16 | 16 | 16 | 17 | 19 | 22 | 25 | 27 | 27 | 25 | 25 | 26 | 28 | 30 | 31 | 31 | 31 | 30 | 28 | |
| 62 | 9 | 11 | 11 | 11 | 11 | 11 | 11 | 11 | 11 | 11 | 12 | 14 | 15 | 16 | 17 | 21 | 24 | 27 | 28 | 28 | 27 | 26 | 27 | 29 | 30 | 31 | 31 | 30 | 29 | 27 | 25 | |
| 63 | 6 | 9 | 8 | 8 | 8 | 8 | 8 | 8 | 8 | 8 | 9 | 10 | 11 | 11 | 13 | 17 | 20 | 22 | 23 | 21 | 20 | 20 | 21 | 22 | 23 | 23 | 23 | 23 | 22 | 21 | 20 | 17 |

Fig. 29

125: HIGH-RESOLUTION IMAGE 0004 (RIGHT HALF)

| | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|
| 0 | 59 | 58 | 58 | 52 | 39 | 27 | 17 | 11 | 11 | 11 | 11 | 11 | 11 | 11 | 11 | 11 | 11 | 11 | 11 | 17 | 29 | 34 | 35 | 31 | 24 | 19 | 18 | 21 | 28 | 27 | 20 | 12 |
| 1 | 78 | 78 | 78 | 71 | 57 | 42 | 27 | 18 | 16 | 15 | 15 | 15 | 15 | 15 | 15 | 16 | 17 | 18 | 19 | 25 | 36 | 42 | 42 | 38 | 31 | 26 | 24 | 27 | 34 | 35 | 28 | 19 |
| 2 | 77 | 77 | 77 | 74 | 67 | 54 | 35 | 23 | 18 | 15 | 15 | 15 | 14 | 14 | 15 | 17 | 22 | 25 | 28 | 31 | 32 | 33 | 33 | 32 | 29 | 27 | 25 | 25 | 29 | 32 | 33 | 26 |
| 3 | 76 | 76 | 75 | 72 | 66 | 54 | 37 | 25 | 19 | 16 | 15 | 15 | 15 | 15 | 16 | 20 | 26 | 30 | 33 | 34 | 32 | 31 | 29 | 28 | 28 | 27 | 25 | 26 | 29 | 33 | 38 | 30 |
| 4 | 76 | 74 | 70 | 64 | 55 | 44 | 30 | 22 | 19 | 17 | 15 | 15 | 16 | 17 | 19 | 22 | 28 | 32 | 34 | 35 | 36 | 35 | 31 | 29 | 28 | 27 | 27 | 28 | 33 | 37 | 41 | 33 |
| 5 | 69 | 66 | 59 | 51 | 42 | 33 | 24 | 19 | 18 | 17 | 17 | 17 | 18 | 19 | 19 | 22 | 27 | 32 | 36 | 39 | 42 | 40 | 33 | 29 | 29 | 29 | 29 | 31 | 34 | 38 | 42 | 33 |
| 6 | 57 | 52 | 41 | 33 | 27 | 22 | 19 | 17 | 16 | 17 | 20 | 22 | 22 | 20 | 18 | 18 | 22 | 29 | 40 | 47 | 48 | 44 | 35 | 30 | 30 | 31 | 33 | 34 | 33 | 35 | 39 | 31 |
| 7 | 44 | 38 | 29 | 22 | 18 | 16 | 16 | 15 | 15 | 16 | 21 | 23 | 23 | 21 | 18 | 17 | 19 | 27 | 39 | 46 | 46 | 43 | 36 | 33 | 32 | 33 | 34 | 34 | 34 | 36 | 39 | 31 |
| 8 | 29 | 26 | 21 | 18 | 16 | 16 | 15 | 15 | 13 | 15 | 18 | 21 | 22 | 22 | 20 | 18 | 19 | 23 | 33 | 36 | 35 | 34 | 35 | 36 | 36 | 35 | 33 | 33 | 36 | 39 | 42 | 32 |
| 9 | 19 | 19 | 16 | 15 | 15 | 15 | 16 | 15 | 13 | 13 | 16 | 19 | 22 | 23 | 22 | 21 | 20 | 23 | 28 | 31 | 31 | 32 | 35 | 36 | 37 | 36 | 34 | 35 | 39 | 42 | 43 | 33 |
| 10 | 15 | 16 | 15 | 15 | 15 | 16 | 16 | 15 | 14 | 13 | 13 | 16 | 22 | 24 | 24 | 23 | 23 | 24 | 27 | 31 | 34 | 36 | 34 | 34 | 34 | 36 | 38 | 40 | 42 | 43 | 44 | 33 |
| 11 | 13 | 14 | 15 | 15 | 15 | 16 | 16 | 16 | 14 | 13 | 12 | 15 | 20 | 23 | 25 | 26 | 26 | 27 | 29 | 32 | 36 | 37 | 35 | 34 | 35 | 37 | 41 | 43 | 43 | 44 | 44 | 33 |
| 12 | 12 | 14 | 15 | 15 | 15 | 15 | 16 | 16 | 15 | 14 | 13 | 18 | 16 | 20 | 25 | 29 | 29 | 31 | 33 | 35 | 36 | 37 | 37 | 38 | 39 | 41 | 42 | 43 | 43 | 44 | 44 | 33 |
| 13 | 12 | 13 | 14 | 15 | 15 | 15 | 16 | 16 | 16 | 15 | 13 | 13 | 14 | 17 | 23 | 28 | 30 | 32 | 35 | 37 | 38 | 39 | 40 | 41 | 42 | 42 | 41 | 42 | 43 | 44 | 45 | 34 |
| 14 | 11 | 12 | 13 | 14 | 15 | 15 | 15 | 16 | 16 | 16 | 14 | 14 | 13 | 15 | 19 | 23 | 28 | 31 | 34 | 38 | 43 | 45 | 44 | 43 | 43 | 41 | 38 | 39 | 42 | 44 | 45 | 34 |
| 15 | 12 | 12 | 13 | 14 | 15 | 15 | 15 | 16 | 17 | 17 | 16 | 15 | 14 | 15 | 17 | 21 | 27 | 31 | 34 | 38 | 45 | 47 | 46 | 45 | 44 | 42 | 39 | 39 | 43 | 45 | 46 | 35 |
| 16 | 13 | 14 | 14 | 14 | 14 | 15 | 15 | 16 | 17 | 17 | 17 | 16 | 16 | 16 | 17 | 21 | 28 | 33 | 35 | 38 | 42 | 45 | 45 | 45 | 45 | 44 | 43 | 44 | 45 | 46 | 46 | 35 |
| 17 | 14 | 15 | 15 | 14 | 14 | 14 | 15 | 16 | 17 | 18 | 17 | 17 | 17 | 17 | 17 | 20 | 27 | 32 | 35 | 38 | 40 | 42 | 44 | 45 | 45 | 45 | 46 | 46 | 47 | 46 | 46 | 34 |
| 18 | 16 | 16 | 16 | 15 | 14 | 14 | 15 | 16 | 17 | 18 | 18 | 18 | 17 | 17 | 16 | 19 | 25 | 31 | 35 | 38 | 39 | 40 | 41 | 43 | 45 | 46 | 46 | 47 | 46 | 46 | 45 | 33 |
| 19 | 16 | 17 | 16 | 15 | 14 | 14 | 15 | 16 | 17 | 18 | 18 | 18 | 18 | 17 | 15 | 17 | 22 | 27 | 33 | 36 | 37 | 38 | 39 | 41 | 44 | 46 | 46 | 46 | 45 | 45 | 44 | 33 |
| 20 | 17 | 17 | 17 | 16 | 14 | 14 | 14 | 15 | 17 | 18 | 18 | 18 | 19 | 17 | 14 | 14 | 17 | 22 | 30 | 34 | 36 | 38 | 38 | 40 | 44 | 46 | 46 | 45 | 44 | 43 | 43 | 32 |
| 21 | 17 | 17 | 17 | 16 | 15 | 14 | 13 | 14 | 16 | 18 | 20 | 21 | 22 | 19 | 14 | 12 | 14 | 19 | 27 | 32 | 35 | 37 | 37 | 39 | 42 | 45 | 45 | 45 | 43 | 42 | 40 | 30 |
| 22 | 17 | 17 | 17 | 16 | 16 | 15 | 13 | 14 | 15 | 19 | 23 | 26 | 27 | 24 | 17 | 13 | 14 | 17 | 24 | 29 | 33 | 35 | 36 | 38 | 40 | 43 | 46 | 46 | 44 | 41 | 37 | 27 |
| 23 | 17 | 18 | 17 | 16 | 16 | 16 | 14 | 15 | 16 | 24 | 28 | 29 | 29 | 25 | 17 | 13 | 13 | 16 | 22 | 27 | 30 | 33 | 35 | 37 | 38 | 41 | 45 | 45 | 42 | 38 | 33 | 23 |
| 24 | 17 | 18 | 17 | 17 | 17 | 16 | 15 | 14 | 14 | 17 | 23 | 26 | 26 | 23 | 16 | 12 | 12 | 14 | 20 | 24 | 27 | 30 | 34 | 36 | 37 | 39 | 41 | 41 | 37 | 32 | 27 | 19 |
| 25 | 17 | 18 | 18 | 18 | 18 | 17 | 16 | 15 | 14 | 15 | 20 | 22 | 22 | 19 | 14 | 11 | 11 | 13 | 17 | 21 | 25 | 28 | 32 | 34 | 35 | 35 | 36 | 34 | 31 | 27 | 23 | 16 |
| 26 | 17 | 17 | 18 | 19 | 19 | 19 | 17 | 15 | 14 | 14 | 16 | 16 | 15 | 13 | 11 | 11 | 11 | 12 | 14 | 18 | 23 | 27 | 29 | 31 | 32 | 31 | 28 | 26 | 25 | 23 | 23 | 17 |
| 27 | 17 | 17 | 18 | 19 | 20 | 19 | 17 | 16 | 15 | 14 | 13 | 12 | 11 | 11 | 10 | 10 | 10 | 11 | 12 | 15 | 20 | 24 | 26 | 27 | 28 | 26 | 23 | 22 | 21 | 22 | 22 | 17 |
| 28 | 17 | 17 | 17 | 18 | 20 | 20 | 18 | 16 | 15 | 14 | 13 | 12 | 11 | 10 | 10 | 10 | 10 | 11 | 13 | 16 | 19 | 22 | 23 | 23 | 23 | 22 | 21 | 21 | 22 | 22 | 22 | 17 |
| 29 | 16 | 16 | 16 | 17 | 19 | 19 | 17 | 16 | 16 | 15 | 14 | 12 | 11 | 10 | 10 | 10 | 10 | 10 | 12 | 14 | 17 | 20 | 21 | 21 | 21 | 21 | 21 | 21 | 22 | 23 | 18 | |
| 30 | 15 | 15 | 16 | 16 | 17 | 17 | 16 | 16 | 15 | 15 | 14 | 13 | 12 | 11 | 11 | 11 | 11 | 11 | 12 | 14 | 17 | 19 | 21 | 21 | 21 | 21 | 21 | 22 | 23 | 25 | 20 | |
| 31 | 14 | 15 | 16 | 16 | 16 | 16 | 16 | 16 | 15 | 15 | 14 | 13 | 12 | 12 | 12 | 12 | 12 | 14 | 16 | 18 | 20 | 21 | 21 | 20 | 21 | 23 | 25 | 28 | 22 | | | |
| 32 | 14 | 15 | 16 | 16 | 16 | 16 | 17 | 16 | 16 | 16 | 15 | 14 | 13 | 12 | 12 | 12 | 13 | 14 | 15 | 17 | 19 | 20 | 21 | 21 | 20 | 20 | 21 | 23 | 25 | 29 | 33 | 26 |
| 33 | 13 | 14 | 16 | 17 | 17 | 17 | 17 | 17 | 16 | 16 | 15 | 14 | 13 | 13 | 13 | 13 | 15 | 18 | 20 | 21 | 22 | 22 | 22 | 21 | 20 | 19 | 22 | 27 | 32 | 36 | 29 | |
| 34 | 13 | 14 | 16 | 17 | 18 | 18 | 18 | 18 | 18 | 17 | 17 | 16 | 14 | 13 | 13 | 13 | 14 | 16 | 19 | 21 | 22 | 22 | 22 | 22 | 22 | 21 | 20 | 22 | 27 | 33 | 38 | 31 |
| 35 | 13 | 14 | 16 | 17 | 18 | 18 | 18 | 18 | 18 | 17 | 17 | 15 | 14 | 14 | 13 | 14 | 15 | 19 | 21 | 21 | 22 | 22 | 22 | 22 | 22 | 21 | 23 | 28 | 33 | 38 | 30 | |
| 36 | 14 | 15 | 16 | 17 | 17 | 17 | 17 | 17 | 17 | 17 | 17 | 16 | 16 | 15 | 14 | 13 | 14 | 17 | 19 | 21 | 22 | 22 | 22 | 22 | 23 | 24 | 26 | 28 | 31 | 35 | 28 | |
| 37 | 14 | 15 | 16 | 17 | 17 | 16 | 16 | 16 | 16 | 16 | 17 | 16 | 15 | 14 | 12 | 13 | 16 | 18 | 20 | 21 | 21 | 22 | 22 | 23 | 26 | 28 | 30 | 32 | 34 | 26 | | |
| 38 | 14 | 15 | 16 | 17 | 17 | 16 | 16 | 16 | 16 | 16 | 16 | 15 | 13 | 12 | 11 | 12 | 14 | 17 | 19 | 20 | 21 | 21 | 22 | 24 | 28 | 31 | 33 | 34 | 35 | 26 | | |
| 39 | 14 | 15 | 16 | 17 | 16 | 16 | 16 | 15 | 15 | 15 | 15 | 15 | 15 | 14 | 12 | 11 | 11 | 13 | 15 | 18 | 19 | 20 | 21 | 22 | 25 | 30 | 34 | 35 | 36 | 35 | 26 | |
| 40 | 14 | 15 | 16 | 17 | 16 | 16 | 15 | 15 | 15 | 16 | 15 | 14 | 13 | 12 | 11 | 11 | 11 | 12 | 13 | 16 | 18 | 20 | 22 | 25 | 32 | 35 | 37 | 37 | 35 | 26 | | |
| 41 | 14 | 15 | 16 | 16 | 16 | 15 | 16 | 16 | 15 | 15 | 15 | 14 | 13 | 13 | 14 | 15 | 14 | 12 | 12 | 14 | 16 | 19 | 20 | 22 | 25 | 32 | 36 | 38 | 38 | 36 | 26 | |
| 42 | 14 | 15 | 15 | 16 | 15 | 15 | 16 | 16 | 15 | 14 | 13 | 13 | 13 | 16 | 20 | 22 | 21 | 18 | 14 | 12 | 13 | 15 | 18 | 20 | 21 | 26 | 32 | 36 | 38 | 38 | 36 | 26 |
| 43 | 14 | 15 | 15 | 15 | 15 | 15 | 16 | 16 | 14 | 14 | 14 | 14 | 16 | 20 | 25 | 26 | 25 | 22 | 16 | 13 | 13 | 14 | 16 | 19 | 21 | 26 | 32 | 36 | 38 | 38 | 36 | 26 |
| 44 | 14 | 15 | 15 | 15 | 15 | 14 | 14 | 13 | 12 | 13 | 15 | 18 | 23 | 26 | 28 | 29 | 28 | 24 | 19 | 16 | 14 | 14 | 15 | 18 | 21 | 26 | 32 | 35 | 37 | 37 | 35 | 26 |
| 45 | 14 | 14 | 15 | 15 | 14 | 13 | 13 | 13 | 13 | 15 | 19 | 23 | 28 | 31 | 32 | 32 | 30 | 27 | 23 | 19 | 15 | 14 | 15 | 17 | 21 | 26 | 32 | 35 | 37 | 36 | 32 | 23 |
| 46 | 13 | 14 | 15 | 14 | 13 | 12 | 12 | 14 | 17 | 21 | 25 | 29 | 32 | 34 | 36 | 35 | 32 | 29 | 26 | 22 | 17 | 14 | 15 | 16 | 19 | 25 | 32 | 36 | 37 | 33 | 26 | 16 |
| 47 | 13 | 13 | 14 | 14 | 12 | 13 | 14 | 17 | 21 | 25 | 29 | 33 | 35 | 37 | 39 | 38 | 34 | 31 | 29 | 25 | 19 | 16 | 15 | 16 | 19 | 23 | 30 | 33 | 32 | 28 | 20 | 12 |
| 48 | 13 | 12 | 12 | 13 | 16 | 19 | 22 | 25 | 28 | 32 | 34 | 36 | 38 | 39 | 39 | 37 | 34 | 30 | 26 | 23 | 19 | 16 | 16 | 18 | 21 | 25 | 26 | 23 | 20 | 16 | 10 | |
| 49 | 13 | 12 | 12 | 13 | 16 | 20 | 24 | 27 | 29 | 31 | 33 | 35 | 37 | 38 | 39 | 39 | 38 | 35 | 32 | 29 | 26 | 23 | 19 | 19 | 22 | 24 | 24 | 22 | 19 | 16 | 14 | 9 |
| 50 | 14 | 13 | 13 | 16 | 21 | 26 | 29 | 32 | 33 | 33 | 32 | 33 | 36 | 38 | 38 | 38 | 38 | 36 | 35 | 32 | 29 | 27 | 24 | 25 | 29 | 30 | 26 | 22 | 19 | 16 | 14 | 10 |
| 51 | 17 | 16 | 15 | 17 | 22 | 26 | 30 | 32 | 31 | 31 | 31 | 32 | 36 | 38 | 39 | 39 | 38 | 37 | 37 | 35 | 32 | 30 | 29 | 30 | 35 | 34 | 29 | 24 | 20 | 18 | 16 | 11 |
| 52 | 21 | 19 | 16 | 16 | 19 | 22 | 25 | 26 | 25 | 25 | 28 | 31 | 37 | 40 | 41 | 40 | 39 | 38 | 38 | 37 | 33 | 32 | 33 | 34 | 37 | 37 | 32 | 28 | 24 | 21 | 17 | 12 |
| 53 | 24 | 22 | 17 | 15 | 17 | 19 | 23 | 24 | 23 | 24 | 28 | 33 | 37 | 40 | 41 | 40 | 39 | 39 | 39 | 38 | 35 | 33 | 34 | 35 | 36 | 36 | 33 | 30 | 27 | 23 | 19 | 13 |
| 54 | 26 | 22 | 19 | 16 | 15 | 16 | 22 | 25 | 25 | 28 | 33 | 36 | 39 | 40 | 40 | 39 | 39 | 39 | 39 | 40 | 39 | 37 | 35 | 32 | 31 | 31 | 31 | 30 | 29 | 28 | 26 | 22 | 15 |
| 55 | 27 | 23 | 20 | 17 | 15 | 16 | 22 | 26 | 30 | 36 | 39 | 39 | 39 | 39 | 39 | 39 | 40 | 39 | 38 | 37 | 35 | 31 | 30 | 30 | 30 | 29 | 29 | 27 | 25 | 17 | | |
| 56 | 26 | 24 | 20 | 18 | 18 | 17 | 18 | 20 | 25 | 31 | 37 | 40 | 38 | 37 | 38 | 39 | 39 | 39 | 39 | 38 | 37 | 35 | 33 | 33 | 32 | 32 | 31 | 29 | 28 | 27 | 20 | |
| 57 | 27 | 25 | 21 | 20 | 20 | 18 | 16 | 18 | 23 | 29 | 36 | 38 | 37 | 37 | 37 | 37 | 38 | 38 | 38 | 38 | 37 | 36 | 35 | 34 | 34 | 33 | 32 | 30 | 29 | 29 | 22 | |
| 58 | 29 | 26 | 23 | 21 | 21 | 19 | 15 | 16 | 21 | 25 | 30 | 34 | 37 | 38 | 37 | 36 | 36 | 36 | 36 | 36 | 36 | 36 | 35 | 35 | 35 | 34 | 33 | 31 | 30 | 22 | | |
| 59 | 29 | 27 | 23 | 21 | 21 | 19 | 15 | 15 | 18 | 21 | 26 | 30 | 35 | 37 | 35 | 34 | 34 | 34 | 35 | 35 | 35 | 36 | 36 | 36 | 36 | 35 | 34 | 32 | 30 | 22 | | |
| 60 | 28 | 26 | 23 | 20 | 18 | 17 | 15 | 15 | 15 | 17 | 22 | 26 | 31 | 33 | 33 | 33 | 32 | 33 | 34 | 35 | 35 | 35 | 36 | 36 | 36 | 37 | 37 | 36 | 35 | 33 | 30 | 21 |
| 61 | 26 | 24 | 21 | 19 | 17 | 16 | 16 | 15 | 14 | 15 | 18 | 22 | 27 | 29 | 28 | 29 | 30 | 32 | 34 | 35 | 35 | 35 | 36 | 36 | 36 | 36 | 36 | 35 | 34 | 30 | 22 | |
| 62 | 22 | 19 | 17 | 16 | 16 | 16 | 16 | 15 | 14 | 14 | 15 | 18 | 24 | 25 | 21 | 23 | 28 | 32 | 33 | 34 | 36 | 36 | 36 | 36 | 36 | 35 | 35 | 36 | 35 | 33 | 24 | |
| 63 | 14 | 13 | 12 | 11 | 12 | 12 | 12 | 12 | 11 | 11 | 10 | 12 | 17 | 17 | 14 | 15 | 20 | 24 | 25 | 26 | 27 | 27 | 27 | 27 | 27 | 26 | 25 | 26 | 27 | 27 | 25 | 18 |

125: GRAYSCALE REPRESENTATION OF HIGH-RESOLUTION IMAGE 0004

Fig. 31

125a: HIGH-RESOLUTION IMAGE 0004 (WHEN REPEATED TEN TIMES) (LEFT HALF)

|    | 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|----|----|----|----|----|----|----|----|----|----|----|----|----|----|----|----|----|
| 0  | 12 | 16 | 11 | 12 | 21 | 28 | 32 | 29 | 17 | 11 | 12 | 12 | 12 | 11 | 11 | 12 | 12 | 12 | 11 | 11 | 11 | 11 | 10 | 9  | 8  | 19 | 34 | 42 | 58 | 74 | 78 | 79 |
| 1  | 18 | 21 | 18 | 21 | 31 | 33 | 37 | 38 | 24 | 15 | 14 | 13 | 14 | 14 | 13 | 13 | 14 | 14 | 13 | 13 | 13 | 12 | 12 | 9  | 17 | 33 | 47 | 67 | 87 | 91 | 91 |
| 2  | 14 | 22 | 28 | 32 | 33 | 31 | 33 | 34 | 28 | 20 | 12 | 10 | 12 | 12 | 11 | 11 | 11 | 12 | 11 | 11 | 11 | 11 | 10 | 10 | 8  | 12 | 30 | 57 | 73 | 75 | 74 |
| 3  | 24 | 35 | 34 | 34 | 32 | 32 | 32 | 32 | 32 | 26 | 16 | 12 | 9  | 10 | 12 | 12 | 11 | 11 | 11 | 11 | 11 | 11 | 10 | 9  | 7  | 7  | 24 | 55 | 74 | 73 | 74 |
| 4  | 32 | 36 | 34 | 32 | 33 | 33 | 33 | 32 | 31 | 28 | 28 | 25 | 11 | 5  | 11 | 13 | 12 | 11 | 12 | 12 | 12 | 11 | 11 | 11 | 11 | 10 | 7  | 14 | 41 | 68 | 79 | 81 |
| 5  | 34 | 37 | 32 | 33 | 34 | 32 | 31 | 30 | 31 | 35 | 44 | 45 | 23 | 8  | 9  | 12 | 12 | 11 | 11 | 12 | 12 | 11 | 11 | 11 | 11 | 12 | 7  | 4  | 22 | 54 | 75 | 79 |
| 6  | 34 | 37 | 33 | 30 | 29 | 30 | 35 | 41 | 49 | 62 | 62 | 40 | 15 | 9  | 10 | 12 | 12 | 12 | 11 | 11 | 11 | 11 | 10 | 11 | 10 | 6  | 9  | 28 | 63 | 72 |    |    |
| 7  | 33 | 37 | 31 | 30 | 28 | 33 | 39 | 44 | 49 | 57 | 66 | 72 | 53 | 25 | 11 | 9  | 10 | 12 | 12 | 12 | 12 | 12 | 11 | 10 | 11 | 12 | 11 | 6  | 13 | 44 | 52 |    |
| 8  | 33 | 38 | 29 | 28 | 35 | 44 | 52 | 55 | 53 | 53 | 63 | 72 | 70 | 49 | 22 | 8  | 8  | 11 | 12 | 12 | 12 | 11 | 11 | 11 | 11 | 11 | 12 | 11 | 7  | 10 | 23 | 29 |
| 9  | 32 | 39 | 34 | 35 | 45 | 52 | 56 | 56 | 54 | 53 | 59 | 68 | 74 | 63 | 33 | 12 | 10 | 10 | 11 | 11 | 11 | 11 | 12 | 13 | 13 | 13 | 13 | 12 | 11 | 9  | 11 | 15 |
| 10 | 29 | 38 | 42 | 50 | 53 | 55 | 55 | 56 | 58 | 59 | 62 | 64 | 67 | 59 | 32 | 17 | 12 | 10 | 10 | 11 | 12 | 14 | 21 | 22 | 19 | 16 | 14 | 13 | 11 | 9  | 10 | 12 |
| 11 | 24 | 38 | 50 | 54 | 52 | 53 | 56 | 59 | 63 | 64 | 62 | 60 | 55 | 45 | 27 | 17 | 11 | 10 | 10 | 11 | 17 | 21 | 29 | 28 | 23 | 18 | 14 | 13 | 12 | 10 | 10 | 11 |
| 12 | 22 | 36 | 47 | 50 | 47 | 52 | 60 | 64 | 65 | 62 | 54 | 45 | 38 | 30 | 24 | 19 | 14 | 11 | 10 | 12 | 19 | 26 | 28 | 24 | 19 | 16 | 13 | 11 | 11 | 10 | 9  | 10 |
| 13 | 23 | 31 | 36 | 43 | 48 | 56 | 63 | 63 | 58 | 50 | 39 | 29 | 28 | 26 | 25 | 21 | 17 | 13 | 11 | 11 | 15 | 20 | 21 | 18 | 16 | 15 | 12 | 11 | 11 | 10 | 10 | 10 |
| 14 | 25 | 30 | 25 | 36 | 53 | 63 | 63 | 53 | 41 | 31 | 25 | 25 | 28 | 27 | 23 | 19 | 16 | 14 | 12 | 11 | 12 | 14 | 16 | 16 | 16 | 14 | 12 | 11 | 11 | 10 | 10 |    |
| 15 | 25 | 29 | 21 | 30 | 50 | 58 | 51 | 39 | 29 | 23 | 23 | 26 | 28 | 25 | 18 | 13 | 13 | 14 | 14 | 13 | 13 | 15 | 17 | 16 | 14 | 13 | 12 | 11 | 12 | 11 | 10 | 10 |
| 16 | 27 | 30 | 20 | 24 | 38 | 40 | 35 | 32 | 28 | 26 | 26 | 26 | 22 | 17 | 13 | 11 | 13 | 15 | 16 | 17 | 19 | 19 | 19 | 19 | 16 | 13 | 11 | 12 | 11 | 11 | 10 | 10 |
| 17 | 28 | 32 | 22 | 22 | 26 | 28 | 31 | 32 | 30 | 27 | 22 | 18 | 13 | 11 | 10 | 12 | 14 | 15 | 16 | 19 | 22 | 23 | 21 | 20 | 18 | 15 | 12 | 12 | 12 | 11 | 11 | 11 |
| 18 | 30 | 36 | 27 | 23 | 21 | 25 | 31 | 32 | 28 | 22 | 15 | 11 | 10 | 9  | 10 | 12 | 13 | 18 | 14 | 17 | 24 | 25 | 23 | 21 | 18 | 16 | 14 | 13 | 12 | 12 | 13 | 14 |
| 19 | 31 | 37 | 30 | 25 | 25 | 25 | 28 | 23 | 18 | 15 | 11 | 10 | 10 | 11 | 11 | 12 | 12 | 13 | 13 | 15 | 22 | 23 | 21 | 18 | 16 | 14 | 14 | 14 | 13 | 14 | 14 | 15 |
| 20 | 32 | 35 | 31 | 30 | 29 | 26 | 21 | 15 | 12 | 11 | 11 | 11 | 11 | 11 | 12 | 12 | 12 | 13 | 13 | 15 | 17 | 16 | 14 | 14 | 14 | 15 | 14 | 14 | 14 | 14 | 14 | 15 |
| 21 | 29 | 32 | 29 | 29 | 29 | 24 | 14 | 11 | 10 | 11 | 11 | 11 | 11 | 11 | 13 | 18 | 13 | 18 | 18 | 13 | 12 | 11 | 11 | 13 | 15 | 15 | 15 | 15 | 15 | 14 | 15 |    |
| 22 | 27 | 31 | 30 | 28 | 31 | 24 | 14 | 11 | 11 | 12 | 11 | 11 | 11 | 11 | 12 | 14 | 14 | 13 | 12 | 11 | 11 | 11 | 12 | 14 | 15 | 15 | 14 | 15 | 14 | 14 | 15 |    |
| 23 | 28 | 37 | 37 | 34 | 37 | 26 | 15 | 12 | 12 | 12 | 11 | 11 | 11 | 11 | 12 | 12 | 14 | 15 | 12 | 11 | 11 | 11 | 12 | 14 | 15 | 15 | 14 | 14 | 15 | 15 | 14 | 15 |
| 24 | 29 | 39 | 39 | 38 | 30 | 19 | 12 | 13 | 13 | 12 | 11 | 10 | 10 | 10 | 11 | 11 | 12 | 12 | 11 | 11 | 12 | 13 | 14 | 15 | 15 | 14 | 14 | 14 | 14 | 15 | 14 | 16 |
| 25 | 31 | 35 | 33 | 25 | 16 | 11 | 11 | 13 | 13 | 12 | 10 | 9  | 9  | 10 | 12 | 12 | 13 | 12 | 11 | 12 | 14 | 15 | 15 | 15 | 15 | 14 | 14 | 14 | 15 | 15 | 16 |    |
| 26 | 26 | 33 | 23 | 14 | 10 | 10 | 14 | 15 | 14 | 12 | 9  | 10 | 13 | 16 | 18 | 18 | 18 | 16 | 12 | 12 | 15 | 16 | 16 | 16 | 16 | 16 | 16 | 15 | 16 | 17 | 17 |    |
| 27 | 22 | 25 | 16 | 12 | 12 | 14 | 17 | 17 | 15 | 13 | 11 | 14 | 22 | 25 | 22 | 20 | 19 | 17 | 13 | 12 | 14 | 15 | 15 | 15 | 15 | 16 | 16 | 16 | 17 | 18 | 18 |    |
| 28 | 16 | 18 | 15 | 15 | 15 | 16 | 17 | 18 | 17 | 14 | 14 | 16 | 22 | 28 | 26 | 21 | 17 | 16 | 15 | 13 | 11 | 11 | 12 | 13 | 13 | 13 | 14 | 14 | 14 | 15 | 16 | 17 |
| 29 | 12 | 15 | 15 | 15 | 15 | 14 | 14 | 14 | 12 | 13 | 17 | 22 | 24 | 20 | 16 | 14 | 14 | 14 | 12 | 11 | 11 | 13 | 13 | 13 | 13 | 13 | 13 | 13 | 13 | 13 | 13 | 15 |
| 30 | 11 | 14 | 14 | 14 | 13 | 11 | 11 | 12 | 13 | 12 | 12 | 14 | 16 | 15 | 14 | 14 | 14 | 14 | 12 | 11 | 12 | 13 | 13 | 13 | 13 | 13 | 13 | 13 | 13 | 13 | 13 |    |
| 31 | 12 | 15 | 15 | 14 | 12 | 11 | 11 | 11 | 12 | 12 | 12 | 13 | 15 | 17 | 19 | 17 | 15 | 15 | 14 | 14 | 13 | 11 | 11 | 12 | 13 | 13 | 13 | 13 | 13 | 13 | 13 |    |
| 32 | 14 | 17 | 16 | 14 | 12 | 11 | 10 | 11 | 12 | 13 | 15 | 17 | 21 | 25 | 29 | 24 | 16 | 14 | 15 | 15 | 14 | 12 | 10 | 11 | 13 | 13 | 13 | 13 | 13 | 13 | 13 |    |
| 33 | 16 | 20 | 17 | 14 | 11 | 10 | 10 | 11 | 13 | 15 | 17 | 19 | 21 | 28 | 39 | 37 | 21 | 14 | 16 | 18 | 18 | 15 | 12 | 11 | 12 | 14 | 13 | 13 | 13 | 13 | 13 |    |
| 34 | 19 | 23 | 19 | 14 | 11 | 10 | 12 | 14 | 16 | 18 | 18 | 18 | 28 | 49 | 52 | 35 | 22 | 21 | 23 | 23 | 21 | 17 | 12 | 11 | 12 | 13 | 13 | 13 | 13 | 13 | 13 |    |
| 35 | 20 | 23 | 17 | 12 | 11 | 11 | 15 | 17 | 18 | 19 | 18 | 17 | 15 | 24 | 47 | 55 | 47 | 37 | 31 | 28 | 26 | 24 | 21 | 14 | 10 | 12 | 13 | 13 | 13 | 13 | 14 |    |
| 36 | 17 | 18 | 13 | 10 | 13 | 15 | 17 | 18 | 18 | 18 | 17 | 14 | 19 | 32 | 44 | 56 | 55 | 47 | 38 | 31 | 29 | 27 | 20 | 12 | 10 | 12 | 13 | 13 | 13 | 14 | 14 |    |
| 37 | 13 | 16 | 15 | 16 | 19 | 20 | 18 | 17 | 17 | 17 | 18 | 17 | 17 | 20 | 32 | 53 | 60 | 57 | 48 | 35 | 32 | 33 | 27 | 17 | 11 | 11 | 12 | 13 | 13 | 14 | 14 |    |
| 38 | 9  | 17 | 25 | 32 | 34 | 29 | 19 | 15 | 16 | 17 | 18 | 18 | 18 | 17 | 24 | 40 | 54 | 64 | 56 | 36 | 27 | 30 | 30 | 22 | 14 | 11 | 11 | 13 | 13 | 14 | 14 |    |
| 39 | 13 | 22 | 35 | 45 | 38 | 29 | 18 | 15 | 17 | 18 | 17 | 18 | 19 | 19 | 18 | 21 | 30 | 48 | 69 | 66 | 44 | 26 | 24 | 28 | 24 | 15 | 11 | 11 | 12 | 13 | 14 | 14 |
| 40 | 27 | 38 | 49 | 47 | 28 | 17 | 16 | 16 | 17 | 18 | 18 | 18 | 20 | 20 | 19 | 20 | 23 | 38 | 64 | 76 | 68 | 40 | 25 | 22 | 20 | 15 | 12 | 10 | 11 | 12 | 13 | 13 |
| 41 | 44 | 55 | 50 | 38 | 19 | 11 | 14 | 16 | 17 | 18 | 19 | 20 | 20 | 20 | 19 | 17 | 25 | 52 | 76 | 70 | 43 | 23 | 17 | 16 | 15 | 14 | 12 | 11 | 12 | 13 | 13 |    |
| 42 | 51 | 63 | 35 | 20 | 16 | 15 | 16 | 17 | 18 | 20 | 21 | 22 | 21 | 21 | 21 | 18 | 16 | 35 | 55 | 47 | 27 | 16 | 15 | 16 | 17 | 17 | 16 | 13 | 11 | 12 | 13 |    |
| 43 | 56 | 69 | 26 | 8  | 15 | 18 | 18 | 18 | 20 | 22 | 22 | 23 | 22 | 21 | 21 | 22 | 22 | 18 | 24 | 29 | 23 | 15 | 13 | 15 | 17 | 17 | 17 | 17 | 14 | 11 | 11 | 12 |
| 44 | 55 | 64 | 22 | 6  | 15 | 20 | 19 | 20 | 21 | 22 | 23 | 23 | 22 | 21 | 21 | 22 | 20 | 19 | 17 | 15 | 15 | 16 | 17 | 17 | 16 | 17 | 17 | 17 | 15 | 11 | 11 |    |
| 45 | 38 | 44 | 20 | 11 | 18 | 21 | 20 | 20 | 21 | 22 | 23 | 22 | 22 | 21 | 21 | 20 | 20 | 19 | 17 | 16 | 16 | 17 | 17 | 17 | 16 | 16 | 17 | 19 | 16 | 13 | 10 |    |
| 46 | 17 | 24 | 25 | 23 | 21 | 20 | 21 | 21 | 21 | 22 | 21 | 21 | 21 | 20 | 19 | 18 | 17 | 17 | 17 | 17 | 17 | 17 | 16 | 16 | 17 | 18 | 19 | 19 | 19 | 17 | 13 |    |
| 47 | 10 | 21 | 32 | 33 | 24 | 19 | 21 | 22 | 21 | 20 | 20 | 20 | 20 | 19 | 18 | 17 | 16 | 16 | 16 | 16 | 16 | 16 | 17 | 18 | 19 | 19 | 19 | 19 | 18 | 15 |    |    |
| 48 | 11 | 21 | 32 | 34 | 25 | 20 | 19 | 21 | 21 | 20 | 19 | 18 | 18 | 17 | 17 | 17 | 16 | 16 | 16 | 16 | 17 | 18 | 19 | 19 | 18 | 18 | 18 | 18 | 18 | 16 |    |    |
| 49 | 11 | 15 | 23 | 30 | 28 | 24 | 21 | 21 | 20 | 19 | 18 | 17 | 16 | 16 | 17 | 16 | 16 | 16 | 16 | 16 | 17 | 18 | 19 | 19 | 18 | 18 | 17 | 17 | 17 | 15 |    |    |
| 50 | 10 | 11 | 9  | 18 | 30 | 35 | 34 | 26 | 19 | 17 | 18 | 17 | 16 | 17 | 17 | 16 | 16 | 16 | 16 | 17 | 18 | 19 | 19 | 19 | 18 | 17 | 17 | 17 | 15 | 14 | 14 |    |
| 51 | 10 | 11 | 7  | 12 | 25 | 39 | 40 | 27 | 18 | 19 | 17 | 16 | 16 | 16 | 16 | 16 | 16 | 16 | 16 | 17 | 18 | 19 | 19 | 18 | 18 | 17 | 17 | 16 | 13 | 12 | 14 |    |
| 52 | 10 | 11 | 9  | 9  | 15 | 25 | 29 | 23 | 21 | 22 | 19 | 17 | 16 | 16 | 16 | 16 | 16 | 17 | 18 | 18 | 18 | 17 | 17 | 16 | 15 | 13 | 14 | 15 | 18 | 20 |    |    |
| 53 | 10 | 12 | 11 | 10 | 11 | 13 | 15 | 18 | 22 | 21 | 17 | 16 | 16 | 16 | 16 | 17 | 18 | 18 | 18 | 17 | 17 | 17 | 16 | 13 | 12 | 12 | 20 | 26 | 27 | 27 |    |    |
| 54 | 10 | 12 | 12 | 11 | 11 | 11 | 14 | 19 | 21 | 18 | 15 | 16 | 16 | 16 | 17 | 18 | 18 | 18 | 17 | 17 | 16 | 15 | 15 | 13 | 14 | 17 | 26 | 35 | 38 | 40 | 34 |    |
| 55 | 10 | 12 | 12 | 11 | 11 | 12 | 14 | 18 | 19 | 17 | 15 | 16 | 16 | 17 | 18 | 18 | 18 | 17 | 17 | 16 | 14 | 12 | 13 | 12 | 18 | 22 | 35 | 44 | 45 | 40 | 33 |    |
| 56 | 10 | 12 | 10 | 10 | 10 | 11 | 15 | 16 | 17 | 17 | 16 | 16 | 17 | 18 | 18 | 18 | 18 | 17 | 15 | 14 | 13 | 12 | 12 | 14 | 19 | 26 | 35 | 41 | 39 | 32 | 28 |    |
| 57 | 10 | 12 | 10 | 10 | 10 | 10 | 13 | 15 | 16 | 17 | 17 | 18 | 18 | 19 | 18 | 18 | 18 | 17 | 16 | 14 | 12 | 12 | 12 | 16 | 20 | 25 | 26 | 32 | 35 | 33 | 26 | 26 |
| 58 | 10 | 12 | 10 | 10 | 11 | 11 | 13 | 16 | 19 | 18 | 19 | 19 | 18 | 18 | 17 | 16 | 13 | 12 | 12 | 14 | 18 | 21 | 23 | 24 | 25 | 29 | 32 | 32 | 30 | 29 |    |    |
| 59 | 11 | 12 | 10 | 11 | 11 | 11 | 10 | 12 | 14 | 16 | 17 | 19 | 19 | 18 | 17 | 17 | 15 | 13 | 12 | 12 | 16 | 21 | 22 | 21 | 22 | 24 | 27 | 30 | 31 | 32 | 32 |    |
| 60 | 11 | 12 | 10 | 10 | 11 | 11 | 10 | 11 | 12 | 12 | 13 | 15 | 17 | 17 | 16 | 15 | 14 | 13 | 15 | 20 | 27 | 30 | 24 | 20 | 21 | 25 | 29 | 31 | 31 | 32 | 31 |    |
| 61 | 11 | 13 | 10 | 10 | 11 | 11 | 10 | 10 | 10 | 10 | 12 | 16 | 17 | 16 | 14 | 14 | 17 | 22 | 28 | 31 | 29 | 24 | 23 | 24 | 27 | 31 | 32 | 31 | 31 | 30 | 29 |    |
| 62 | 13 | 14 | 12 | 12 | 12 | 12 | 12 | 11 | 12 | 11 | 11 | 12 | 16 | 17 | 16 | 19 | 22 | 27 | 34 | 35 | 32 | 27 | 27 | 29 | 33 | 35 | 34 | 34 | 33 | 32 | 30 | 27 |
| 63 | 11 | 12 | 11 | 10 | 10 | 10 | 10 | 10 | 10 | 10 | 10 | 10 | 13 | 13 | 12 | 15 | 21 | 26 | 31 | 30 | 26 | 23 | 23 | 26 | 30 | 31 | 29 | 28 | 27 | 26 | 24 | 19 |

Fig. 32

125a: HIGH-RESOLUTION IMAGE 0004 (WHEN REPEATED TEN TIMES) (RIGHT HALF)

125a : HIGH-RESOLUTION IMAGE 0004
(WHEN REPEATED TEN TIMES)

HIGH-RESOLUTION IMAGE GENERATION APPARATUS, HIGH-RESOLUTION IMAGE GENERATION METHOD, AND HIGH-RESOLUTION IMAGE GENERATION PROGRAM

TECHNICAL FIELD

The present invention relates to a high-resolution image generation apparatus that receives an image obtained by capturing the image from a platform in the sky such as an optical earth observation satellite, and generates an image with a resolution which is higher than a resolution of the original image.

BACKGROUND ART

As conventional art related to the generation of a high-resolution image, a method is discussed in which in an image obtained from a radio wave observation satellite, a range of degradation in the image is identified in advance and the range is excluded from a process to perform resolution improvement, thereby avoiding a problem that may arise in resolution improvement (see Patent Literature 1).

In a resolution improvement process using a moving image as input, a method is discussed in which in order to reduce the influence of shielding that occurs, for example, when an object passes in front of another object, a shielding pattern is detected and is excluded from the process, thereby allowing a high-quality resolution improvement process (see Patent Literature 2).

CITATION LIST

Patent Literature

Patent Literature 1: JP 4305148 B
Patent Literature 2: JP 2009-146231 A

SUMMARY OF INVENTION

Technical Problem

There are a plurality of types of methods for improving a resolution of an image. What is to be discussed here is a computer process called reconstruction-based super-resolution by which a high-resolution image is restored properly by using a plurality of (normally four or more) images so as to increase sampling density of a subject. In order to perform this reconstruction-based super-resolution, it is necessary to compute optical flow (correspondence between pixels recording portions of the same subject) between the images.

For example, there is a multi-viewpoint image which is obtained by a plurality of image capturing from different directions. A multi-viewpoint image has inherent parallax, resulting in complexity in optical flow. This is because normally optical flow can often be represented only by translation and rotation of an entire image, but a multi-viewpoint image having inherent parallax may have a different direction and/or amount of displacement at each portion of the image.

As described above, there is a problem that with a multi-viewpoint image having inherent parallax, optical flow is complex and thus many errors are likely to be included when the optical flow is computed by conventional means.

The technique disclosed in Patent Literature 1 is a method in which a processing range is narrowed based on the characteristics of a radio wave image, and cannot solve the above-described problem that arises when a multi-viewpoint image is used.

The technique disclosed in Patent Literature 2 reduces the influence of shielding, and cannot solve the above-described problem that arises when a multi-viewpoint image is used.

The present invention has been conceived to solve the problem that is expected to arise when a resolution improvement process (reconstruction-based super-resolution) using a multi-viewpoint image as input is performed, and aims to obtain a high-resolution image generation apparatus that can generate a high-quality image by using depth information that can be computed from the multi-viewpoint image and, based on a result thereof, sorting good portions from faulty portions in optical flow.

Solution to Problem

A high-resolution image generation apparatus according to the present invention performs on an image a process to improve a resolution of the image to a higher resolution, and the high-resolution image generation apparatus includes:

an image storage unit to store a subject image whose resolution is to be improved and a plurality of reference images obtained by capturing an imaging subject of the subject image from viewpoints different from a viewpoint of the subject image, and store imaging device condition information which indicates an imaging condition of an imaging device when each of the subject image and the plurality of reference images is captured, in association with a corresponding one of the subject image and the plurality of reference images;

an optical flow computation unit to extract a plurality of pairs including the subject image and one of the plurality of reference images from the image storage unit, the plurality of pairs each including a different one of the plurality of reference images, and compute, with a processing device, optical flow including pixel-based correspondence information which indicates a pixel of the one of the plurality of reference images corresponding to each pixel of the subject image, for each of the plurality of pairs extracted;

a depth information computation unit to compute depth information which indicates depth of each pixel of the subject image for each of the plurality of pairs, based on the optical flow of each pair computed by the optical flow computation unit and the imaging device condition information corresponding to each of the subject image and the one of the plurality of reference images included in said pair, out of the imaging device condition information stored in the image storage unit; and an optical flow determination unit to determine, with the processing device, whether or not each piece of the pixel-based correspondence information included in the optical flow of each pair is to be used for improving the resolution of the subject image, based on at least two pieces of the depth information out of the depth information computed by the depth information computation unit.

Advantageous Effects of Invention

According to a high-resolution image generation apparatus according to the present invention, a depth information computation unit computes depth information which indicates depth of each pixel of a subject image for each pair of the subject image and a reference image, based on optical flow and imaging device condition information. An optical flow determination unit determines whether or not each piece of pixel-based correspondence information included in the optical flow of each pair is to be used for improving a resolution of the subject image, based on at least two pieces of the depth information. Thus, a high-resolution image generation apparatus that can generate a high-quality image can be obtained.

BRIEF DESCRIPTION OF DRAWINGS

FIG. 4 is a diagram illustrating multi-viewpoint image data 1222 (image 0005) according to this embodiment;

FIG. 5 is a diagram in which (a) indicates a multi-viewpoint image 1221 (image 0005), (b) indicates sensor position information 1231 (image 0005), and (c) indicates sensor vector information 1232 (image 0005);

FIG. 6 is a diagram illustrating multi-viewpoint image data 1222 (image 0004) according to this embodiment;

FIG. 8 is a diagram illustrating multi-viewpoint image data 1222 (image 0003) according to this embodiment;

FIG. 10 is a diagram illustrating OF0004to0005X which indicates an X component of optical flow from a base image 0004 to a reference image 0005;

FIG. 11 is a diagram illustrating OF0004to0005Y which indicates a Y component of the optical flow from the base image 0004 to the reference image 0005;

FIG. 12 is a diagram illustrating OF0005to0004X which indicates an X component of optical flow from the reference image 0005 to the base image 0004;

FIG. 13 is a diagram illustrating OF0005to0004Y which indicates a Y component of the optical flow from the reference image 0005 to the base image 0004;

FIG. 14 is a diagram illustrating results of converting geocentric coordinates computed for each pixel of the base image 0004 using the optical flow OF0004to0005X/Y from the base image 0004 to the reference image 0005 into altitude values;

FIG. 15 is a diagram illustrating results of converting geocentric coordinates computed for each pixel of the base image 0004 using the optical flow OF0004to0003X/Y from the base image 0004 to the reference image 0003 into altitude values;

FIG. 16 is a diagram illustrating results of computing absolute values of differences between the results of computing the altitude values illustrated in FIG. 14 and the results of computing the altitude values illustrated in FIG. 15;

FIG. 17 is a diagram illustrating a left half (from pixel (0, 0) to pixel (31, 63)) of an image 0004';

FIG. 18 is a diagram illustrating a right half (from pixel (32, 0) to pixel (63, 63)) of the image 0004';

FIG. 20 is a diagram illustrating results of down-sampling to 1/2 using OF0004to0004X/Y (corresponding to the base image 0004);

FIG. 21 is a diagram illustrating results of down-sampling to 1/2 using OF0005to0004X/Y (corresponding to the reference image 0005);

FIG. 22 is a diagram illustrating results of down-sampling to 1/2 using OF0003to0004X/Y (corresponding to the reference image 0003);

FIG. 23 is results of computing differences between the results of down-sampling using OF0004to0004X/Y (corresponding to the base image 0004) and the base image 0004;

FIG. 24 is results of computing differences between the results of down-sampling using OF0005to0004X/Y (corresponding to the reference image 0005) and the reference image 0005;

FIG. 25 is results of computing differences between the results of down-sampling using OF0003to0004X/Y (corresponding to the reference image 0003) and the reference image 0003;

FIG. 26 is a diagram illustrating a left half (from pixel (0, 0) to pixel (31, 63)) of results of up-sampling the differences with respect to the reference image 0005 to 2/1;

FIG. 27 is a diagram illustrating a right half (from pixel (32, 0) to pixel (63, 63)) of the results of up-sampling the differences with respect to the reference image 0005 to 2/1;

FIG. 28 is a diagram illustrating a left half (from pixel (0, 0) to pixel (31, 63)) of a high-resolution image 125;

FIG. 29 is a diagram illustrating a right half (from pixel (32, 0) to pixel (63, 63)) of the high-resolution image 125;

FIG. 31 is a diagram illustrating a left half (from pixel (0, 0) to pixel (31, 63)) of a high-resolution image 125a;

FIG. 32 is a diagram illustrating a right half (from pixel (32, 0) to pixel (63, 63)) of the high-resolution image 125a; and FIG. 33 is a grayscale representation of the high-resolution image 125a.

DESCRIPTION OF EMBODIMENTS

First Embodiment

Figure 1:
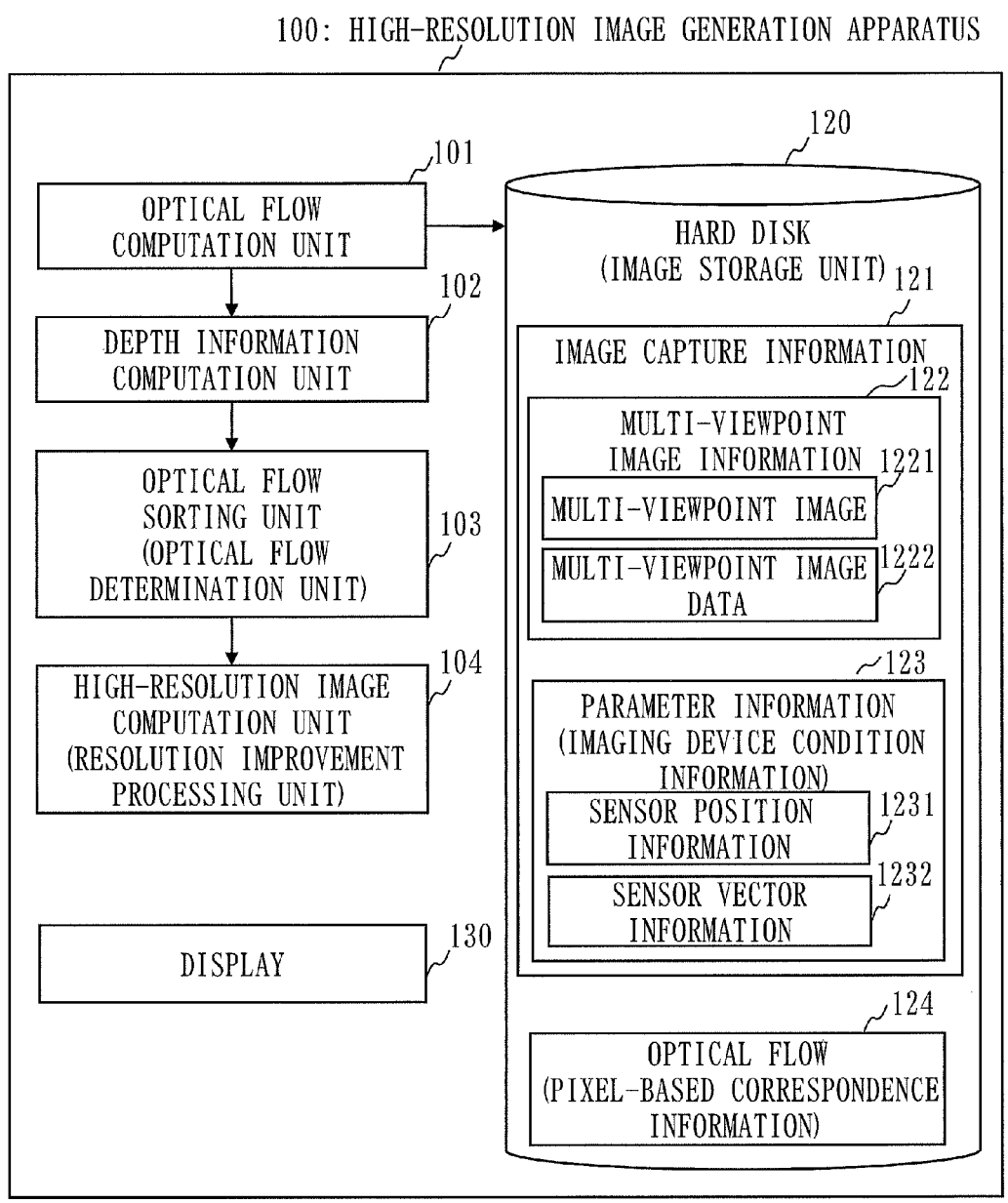
FIG. 1 is a diagram illustrating the block configuration of a high-resolution image generation apparatus 100 according to this embodiment.

FIG. 1 is a diagram illustrating the block configuration of a high-resolution image generation apparatus 100 according to this embodiment. With reference to FIG. 1, the block configuration of the high-resolution image generation apparatus 100 according to this embodiment will be described.

The high-resolution image generation apparatus 100 includes an optical flow computation unit 101, a depth information computation unit 102, an optical flow sorting unit 103 (optical flow determination unit), a high-resolution image computation unit 104 (resolution improvement processing unit), a hard disk 120 (image storage unit), and a display 130.

The hard disk 120 stores image capture information 121. The hard disk 120 may also temporarily store, as optical flow 124, optical flow which is calculated by the optical flow computation unit 101 to be described later.

The image capture information 121 has multi-viewpoint image information 122 and parameter information 123 corresponding to the multi-viewpoint image information 122.

The multi-viewpoint image information 122 is information on a plurality of images obtained by capturing images of the ground from different angles from the sky using a platform such as an optical observation satellite. The multi-viewpoint image information 122 has a multi-viewpoint image 1221 which is represented in grayscale and multi-viewpoint image data 1222 which indicates a density value of each pixel of the multi-viewpoint image 1221. The multi-viewpoint image 1221 and the multi-viewpoint image data 1222 will be described in detail later.

The hard disk 120 is an example of the image storage unit to store the multi-viewpoint image information 122 of each of a subject image (base image) whose resolution is to be improved and a plurality of reference images obtained by capturing an imaging subject of the base image from different viewpoints.

The parameter information 123 is information on internal and external parameters when the multi-viewpoint image 1221 included in the multi-viewpoint image information 122 is captured. The parameter information 123 is information such as a focal distance, a position, and an attitude of a camera or a sensor. The parameter information 123 has, for example, sensor position information 1231 and sensor vector information 1232.

The parameter information 123 is an example of imaging device condition information which indicates an imaging condition of an imaging device (camera, sensor, etc.) that has captured a corresponding multi-viewpoint image 1221.

The optical flow computation unit 101 extracts a plurality of pairs including a base image and a reference image from the hard disk 120, the plurality of pairs each including a different reference image, and computes optical flow for each extracted pair with a processing device. Optical flow is information including pixel-based correspondence information that represents a pixel on the reference image corresponding to each pixel of the base image.

The optical flow computation unit 101 selects a plurality of pairs of the multi-viewpoint image information 122 from the hard disk 120, and computes optical flow between each selected pair of the multi-viewpoint image information 122.

The depth information computation unit 102 computes depth information which indicates depth of each pixel of the base image for each pair, based on the optical flow of each pair computed by the optical flow computation unit 101 and the parameter information 123 corresponding to the image capture information 121 of each of the base image and the reference image included in the pair out of the parameter information 123 stored in the hard disk 120. It is assumed that the depth of an image indicates a distance or an altitude value from the sensor to an imaging subject represented by the image.

The optical flow sorting unit 103 determines, with the processing device, whether or not each piece of the pixel-based correspondence information for each pixel included in the optical flow of each pair is to be used for improving the resolution of the base image, based on at least two pieces of the depth information out of the depth information of each pair computed by the depth information computation unit 102. That is, the optical flow sorting unit 103 checks a plurality of results of computing the distance by the depth information computation unit 102, and sorts out good portions from faulty portions in the optical flow.

The high-resolution image computation unit 104 improves the resolution of the base image, based on pixel-based correspondence information that is determined by the optical flow sorting unit 103 to be used for improving the resolution of the base image (determined as good), out of the pixel-based correspondence information of each pixel included in the optical flow of each pair. That is, the high-resolution image computation unit 104 receives a portion of the optical flow determined as good and an area of the image corresponding thereto to compute and generate a high-resolution image, and does not use for improving the resolution a portion of the optical flow determined as faulty.

The display 130 outputs and displays a result of generating the high-resolution image.

Figure 2:
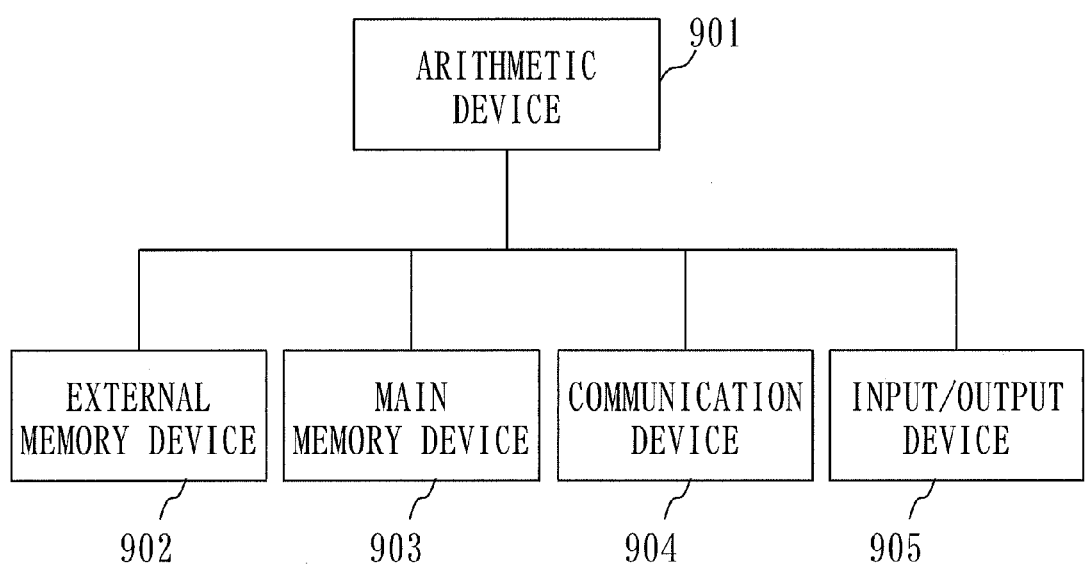
FIG. 2 is a diagram illustrating an example of the hardware configuration of the high-resolution image generation apparatus 100 according to this embodiment.

FIG. 2 is a diagram illustrating an example of the hardware configuration of the high-resolution image generation apparatus 100 according to this embodiment.

With reference to FIG. 2, an example of the hardware configuration of the high-resolution image generation apparatus 100 will be described.

The high-resolution image generation apparatus 100 is a computer, and each component of the high-resolution image generation apparatus 100 can be implemented by a program. That is, each of the optical flow computation unit 101, the depth information computation unit 102, the optical flow sorting unit 103, and the high-resolution image computation unit 104 can be implemented by a program.

As the hardware configuration of the high-resolution image generation apparatus 100, an arithmetic device 901, an external memory device 902, a main memory device 903, a communication device 904, and an input/output device 905 are connected to a bus.

The arithmetic device 901 is a CPU (Central Processing Unit) that executes programs.

The external memory device 902 is, for example, a ROM (Read, Only Memory), a flash memory, and a hard disk device. The hard disk 120 is an example of the external memory device 902.

The main memory device 903 is a RAM (Random Access Memory).

The communication device 904 is, for example, a communication board and the like, and is connected to a LAN (Local Area Network) and the like. Instead of the LAN, the communication device 904 may be connected to a WAN (Wide Area Network) such as an IP-VPN (Internet Protocol Virtual Private Network), a wide-area LAN, and an ATM (Asynchronous Transfer Mode) network, or the Internet. The LAN, the WAN, and the Internet are examples of a network.

The input/output device 905 is, for example, a mouse, a keyboard, a display device and the like. In place of the mouse, a touch panel, a touch pad, a trackball, a pen tablet, or other types of pointing devices may be used. The display device may be an LCD (Liquid Crystal Display), a CRT (Cathode Ray Tube), or other types of display devices. The display 130 is an example of the display device.

The programs are normally stored in the external memory device 902. The programs are loaded into the main memory device 903, and are sequentially read and executed by the arithmetic device 901.

The programs are programs that implement the functions described as "units" illustrated in FIG. 1.

Further, an operating system (OS) is also stored in the external memory device 902. At least part of the OS is loaded into the main memory device 903, and the arithmetic device 901 executes the programs that implement the functions of the "units" illustrated in FIG. 1 while executing the OS.

Application programs are also stored in the external memory device 902. The application programs are loaded into the main memory device 903, and are sequentially executed by the arithmetic device 901.

Information such as a ". . . table" is also stored in the external memory device 902.

Information, data, signal values, and variable values indicating results of processes described as "recognize", "determine", "extract", "detect", "set", "register", "select", "generate", "input", "output", and so on in the description of this embodiment are stored as files in the main memory device 903.

Data that is received by the high-resolution image generation apparatus 100 is also stored in the main memory device 903.

An encryption key, a decryption key, a random number value, and a parameter may also be stored as files in the main memory device 903.

The configuration of FIG. 2 indicates an example of the hardware configuration of the high-resolution image generation apparatus 100, and the hardware configuration of the high-resolution image generation apparatus 100 is not limited to and may be different from the configuration described in FIG. 2.

Figure 3:
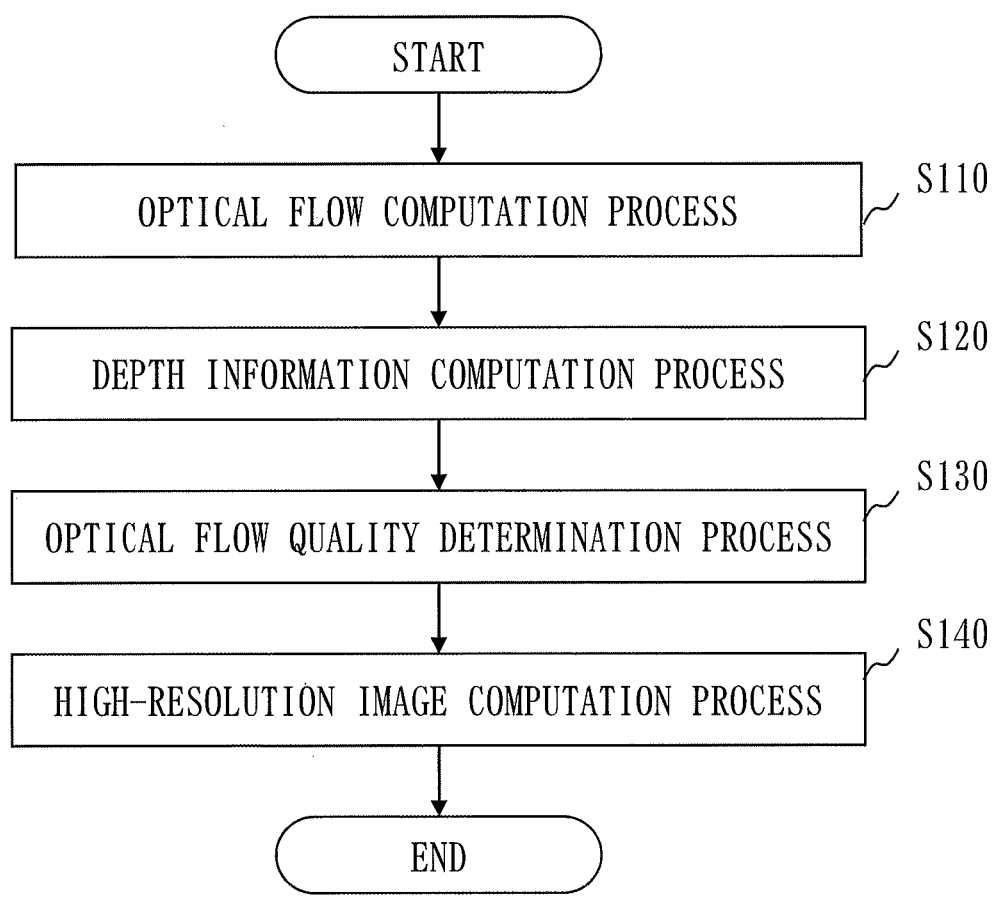
FIG. 3 is a flowchart illustrating the operation of a high-resolution image generation process by the high-resolution image generation apparatus 100 according to this embodiment.

FIG. 3 is a flowchart illustrating the operation of a high-resolution image generation method by the high-resolution image generation apparatus 100 according to this embodiment. The high-resolution image generation method is implemented by the optical flow computation unit 101, the depth information computation unit 102, the optical flow sorting unit 103, the high-resolution image computation unit 104, and so on in cooperation with hardware resources such as a processing device, a storage device, and an input/output device. For example, the high-resolution image generation apparatus 100 implements the high-resolution image generation method by executing an optical flow computation program, a depth information computation program, an optical flow sorting program, a high-resolution image computation program, and so on, with the processing device.

With reference to FIG. 3, a high-resolution image generation process (high-resolution image generation stage) (high-resolution image generation step) by the high-resolution image generation apparatus 100 will be described. In the following, the term "process" is interchangeable with "stage" or "step".

<Optical Flow Computation Process: S110>

First, an optical flow computation process by the optical flow computation unit 101 will be described.

It is assumed that the hard disk 120 illustrated in FIG. 1 stores image capture information 121 regarding a base image 0004 whose resolution is to be improved and regarding a reference image 0003 and a reference image 0005 which are captured from viewpoints different from a viewpoint of the base image 0004. The reference image 0003, the base image 0004, and the reference image 0005 will also be described simply as the image 0003, the image 0004, and the image 0005.

Figure 7:
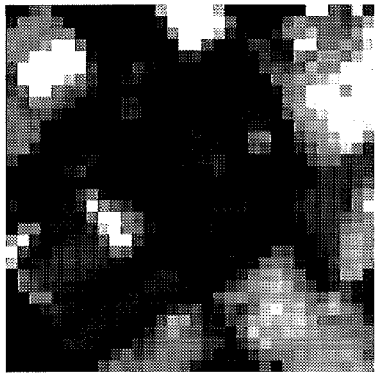
FIG. 7 is a diagram in which (a) indicates a multi-viewpoint image 1221 (image 0004), (b) indicates sensor position information 1231 (image 0004), and (c) indicates sensor vector information 1232 (image 0004)
Figure 9:
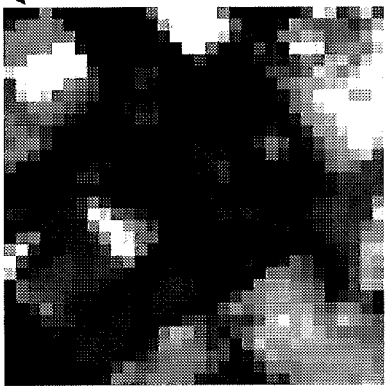
FIG. 9 is a diagram in which (a) indicates a multi-viewpoint image 1221 (image 0003), (b) indicates sensor position information 1231 (image 0003), and (c) indicates sensor vector information 1232 (image 0003)

FIG. 4 is a diagram illustrating multi-viewpoint image data 1222 (image 0005) according to this embodiment. FIG. 5 is a diagram in which (a) indicates a multi-viewpoint image 1221 (image 0005), (b) indicates sensor position information 1231 (image 0005), and (c) indicates sensor vector information 1232 (image 0005). FIG. 6 is a diagram illustrating multi-viewpoint image data 1222 (image 0004) according to this embodiment. FIG. 7 is a diagram in which (a) indicates a multi-viewpoint image 1221 (image 0004), (b) indicates sensor position information 1231 (image 0004), and (c) indicates sensor vector information 1232 (image 0004). FIG. 8 is a diagram illustrating multi-viewpoint image data 1222 (image 0003) according to this embodiment. FIG. 9 is a diagram in which (a) indicates a multi-viewpoint image 1221 (image 0003), (b) indicates sensor position information 1231 (image 0003), and (c) indicates sensor vector information 1232 (image 0003).

Here, the optical flow computation unit 101 receives a plurality of pieces of the image capture information 121 from the hard disk 120. Three pieces of the image capture information 121 are received. It is assumed that images indicated by the three pieces of the image capture information 121 are the reference image 0003, the base image 0004, and the reference image 0005.

In the following description, when (0005) in parentheses is attached as in the multi-viewpoint image data 1222 (0005), this will indicate the multi-viewpoint image data 1222 regarding the reference image 0005.

As described above, the image capture information 121 has the multi-viewpoint image information 122 and the parameter information 123 as information regarding an image. The multi-viewpoint image information 122 is information on the image, and is composed of the multi-viewpoint image 1221 and the multi-viewpoint image data 1222. The parameter information 123 is composed of the sensor position information 1231 and the sensor vector information 1232.

The multi-viewpoint image data 1222 (0005) illustrated in FIG. 4 is represented by re-scaling the density value of each pixel of the multi-viewpoint image 1221 (0005) to 0 through 99. The multi-viewpoint image data 1222 (0005) is pixel data that is identified by a value from 0 to 31 in both a horizontal direction and a vertical direction.

The multi-viewpoint image 1221 (0005) illustrated in (a) of FIG. 5 is a grayscale representation of the reference image 0005.

In the sensor position information 1231 illustrated in (b) of FIG. 5, a position of the sensor when the image 0005 is captured is indicated for each pixel in terms of geocentric coordinates. The image is captured with a line sensor from the right-hand side facing the front. Thus, coordinates in the same column are the same.

In the sensor vector information 1232 illustrated in (c) of FIG. 5, a vector from the center of the sensor to the surface of the ground when the image 0005 is captured is indicated for each pixel. The image is captured with the line sensor from the right-hand side facing the front. Thus, vectors in the same row are the same.

The optical flow computation unit 101 reads the image capture information 121 of the images 0003, 0004, and 0005 from the hard disk 120, and computes optical flow according to the following procedure.

When optical flow from an image A to an image B is computed, the image A will be called the "image to be the base", and the image B will be called the "image to be referenced". When optical flow between the image A and the image B is computed, optical flow from the image A to the image B and optical flow from the image B to the image A are computed. In the following, the optical flow from the image A to the image B will be represented as OFAtoBX/Y, and the optical flow from the image B to the image A will be represented as OFBtoAX/Y.

As an example, a method for computing optical flow between the base image 0004 and the reference image 0005 will be described herein. Using the base image 0004 as the image to be the base and the image 0005 as the image to be referenced, optical flow OF0004to0005X/Y from the base image 0004 to the reference image 0005 is computed. Conversely, using the reference image 0005 as the image to be the base and the base image 0004 as the image to be referenced, optical flow OF0005to0004X/Y from the reference image 0005 to the base image 0004 is computed.

The optical flow computation unit 101 calculates optical flow using the multi-viewpoint image data 1222.

The optical flow computation unit 101 calculates optical flow for each pixel of the multi-viewpoint image data 1222 of the image to be the base. First, a partial image of a predetermined size centered at a pixel for which optical flow is to be obtained is clipped from the image to be the base. Next, the partial image is placed over the image to be referenced, and then a location where the highest correlation is observed between overlapping pixels is found. This method is called an area correlation method, which is a widely known method and thus will not be described in detail.

In this way, the optical flow computation unit 101 calculates a numerical value indicating a location in the image to be referenced corresponding to each pixel of the image to be the base. In the optical flow, the above-described numerical value corresponding to each pixel will be referred to as pixel-based correspondence information.

FIG. 10 is a diagram illustrating OF0004to0005X which indicates an X component (horizontal direction) of the optical flow from the base image 0004 to the reference image 0005.

FIG. 11 is a diagram illustrating OF0004to0005Y which indicates a Y component (vertical direction) of the optical flow from the base image 0004 to the reference image 0005.

FIG. 12 is a diagram illustrating OF0005to0004X which indicates an X component (horizontal direction) of the optical flow from the reference image 0005 to the base image 0004.

FIG. 13 is a diagram illustrating OF0005to0004Y which indicates a Y component (vertical direction) of the optical flow from the reference image 0005 to the base image 0004.

In FIG. 10 to FIG. 13, the unit of a numerical value of each pixel in the optical flow is 0.1 pixels. In FIG. 10 to FIG. 13, a numerical value enclosed by heavy lines indicates a minus value.

Each value of the optical flow indicates an amount by which each pixel of the image to be the base is displaced in the image to be referenced.

The optical flow OF0004to0005X/Y from the base image 0004 to the reference image 0005 will be described using a specific example. As indicated in FIG. 10, the displacement amount in the X direction corresponding to pixel (13, 7) of the base image 0004 is 12. As indicated in FIG. 11, the displacement amount in the Y direction corresponding to pixel (13, 7) of the base image 0004 is −4.

This indicates that a pixel on the reference image 0005 corresponding to pixel (13, 7) of the base image 0004 resides at a position 1.2 pixels to the right of and 0.4 pixels above a position of pixel (13, 7) of the base image 0004. That is, this indicates that the coordinates of the pixel on the reference image 0005 corresponding to pixel (13, 7) of the base image 0004 are (14.2, 6.6).

In contrast, the optical flow OF0005to0004X/Y from the reference image 0005 to the base image 0004 will be described using a specific example. As indicated in FIG. 12, the displacement amount in the X direction corresponding to pixel (6, 7) of the reference image 0005 is −6. As indicated in FIG. 13, the displacement amount in the Y direction corresponding to pixel (6, 7) of the reference image 0005 is 4.

This indicates that a pixel on the base image 0004 corresponding to pixel (6, 7) of the reference image 0005 resides at a position 0.6 pixels to the left of and 0.4 pixels below a position of pixel (6, 7) of the reference image 0005. That is, this indicates that the coordinates of the pixel on the base image 0004 corresponding to pixel (6, 7) of the reference image 0005 are (−5.4, 7.4).

Similarly, the optical flow computation unit 101 also computes optical flow OF0004to0003X/Y and optical flow OF0003to0004X/Y between the base image 0004 and the reference image 0003.

<Depth Information Computation Process: S120>

A depth information computation process by the depth information computation unit 102 will now be described.

The depth information computation unit 102 computes depth (a distance or an altitude from the sensor) for each pixel of the base image 0004, based on the optical flow computed by the optical flow computation unit 101 and the sensor position information 1231 and the sensor vector information 1232 which are stored in the hard disk 120. A result of computing the depth for each pixel of the base image 0004 will be referred to as depth information.

First, the depth information computation unit 102 retrieves a sensor position (px, py, pz) and a sensor vector (vx, vy, vz) of a pixel of the base image 0004 to be computed (to be referred to as a computation subject pixel) from the sensor position information 1231 and the sensor vector information 1232 from the hard disk 120. Then, the depth information computation unit 102 calculates a straight line 1 which is determined by the retrieved sensor position (px, py, pz) and sensor vector (vx, vy, vz).

Then, the depth information computation unit 102 refers to the optical flow that is given about the computation subject pixel and obtains the pixel coordinates on the reference image 0005. Here, the optical flow from the base image 0004 to the reference image 0005 is used. That is, the pixel coordinates on the reference image 0005 are obtained using the optical flow OF0004to0005X/Y from the base image 0004 to the reference image 0005.

The depth information computation unit 102 calculates a straight line 1' which is determined by a sensor position (px', py', pz') and a sensor vector (vx', vy', vz') that are given to the pixel coordinates on the reference image. The depth information computation unit 102 obtains an intersection point of the straight line 1 calculated from the computation subject pixel of the base image and the straight line 1' calculated from the pixel coordinates of the reference image obtained from the optical flow. This intersection point is a position, in terms of geocentric coordinates, of the imaging subject represented by the computation subject pixel of the base image 0004. In this way, the depth information computation unit 102 computes a position of each pixel of the base image in terms of geocentric coordinates.

Generally, real values are given to the pixel coordinates on the reference image. Thus, in practice, the geocentric coordinates of the computation subject pixel are obtained by using straight lines corresponding to four nearest neighbor pixels of the pixel coordinates on the reference image to obtain geocentric coordinates of the four nearest neighbor pixels and performing linear interpolation. The geocentric coordinates can be converted into a distance from the earth ellipsoid by converting them into latitude and longitude coordinates.

In the above, it is described that the intersection point between the two straight lines is obtained. If the two straight lines do not intersect, a center point at a position where the distance between the two straight lines is the shortest is regarded as the intersection point.

Further, the depth information computation unit 102 calculates an altitude value, in terms of geocentric coordinates, of the computation subject pixel by subtracting a geoid height from the distance from the earth ellipsoid to the geocentric coordinates of the computation subject pixel.

FIG. 14 is a diagram illustrating results of converting the geocentric coordinates computed for each pixel of the base image 0004 using the optical flow OF0004to0005X/Y from the base image 0004 to the reference image 0005 into altitude values.

Figure 15:
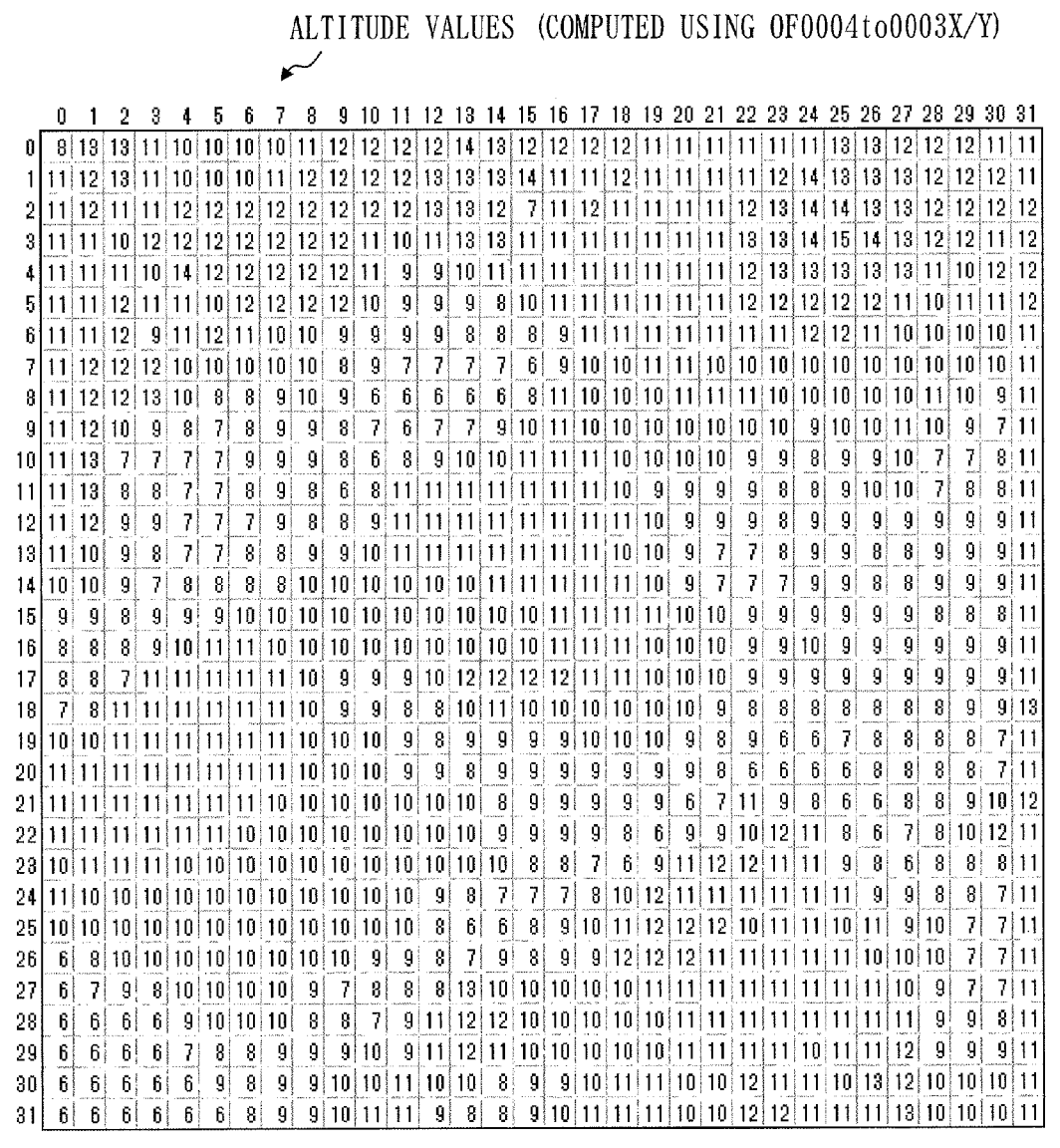

FIG. 15 is a diagram illustrating results of converting the geocentric coordinates computed for each pixel of the base image 0004 using the optical flow OF0004to0003X/Y from the base image 0004 to the reference image 0003 into altitude values.

The depth of each pixel is not limited to an altitude value, and a distance from the sensor may be used as the depth. In this embodiment, a value converted into an altitude value will be used as a result of computing the depth in the following description.

<Optical Flow Sorting Process: S130>

An optical flow sorting process (optical flow quality determination process) by the optical flow sorting unit 103 will now be described.

FIG. 16 is a diagram illustrating results of computing absolute values of differences between the results of computing the altitude values illustrated in FIG. 14 and the results of computing the altitude values illustrated in FIG. 15.

The optical flow sorting unit 103 extracts two pieces of the depth information from the depth information computed by the depth information computation unit 102, and calculates a difference in the depth for each pixel of the base image using the two extracted pieces of the depth information. If the calculated difference is less than a threshold value, the optical flow sorting unit 103 determines that pixel-based correspondence information in the optical flow corresponding to the computation subject pixel of the base image is a good portion that can be used for improving the resolution of the base image.

Specifically, the optical flow sorting unit 103 takes out the results of computing the altitude values illustrated in FIG. 14 and the results of computing the altitude values illustrated in FIG. 15, and obtains a difference (absolute value) for each pixel (FIG. 16). Further, the optical flow sorting unit 103 records a point (pixel) where the difference is, for example, three meters or greater as a faulty point. A point to be recorded as a faulty point is not limited to a point where the difference is three meters or greater, but this may be changed as appropriate to two meters, four meters, five meters, and so on.

When a point where the difference is three meters or greater is to be recorded as a faulty point, (0, 0), (15, 0), (16, 1), (17, 1), (15, 2), and so on are faulty points, for example, as indicated by dotted circles in FIG. 16. There are other faulty points, which will not be described here.

In the optical flow OF0004to0005X/Y and the optical flow OF0004to0003X/Y, values corresponding to the pixel coordinates of these faulty points are faulty portions that cannot be used for improving the resolution.

<High-Resolution Image Computation Process: S140>

A high-resolution image computation process by the high-resolution image computation unit 104 will now be described.

The high-resolution image computation unit 104 receives the base image 0004, the reference image 0005, the reference image 0003, the optical flow OF0004to0005X/Y and OF0005to0004X/Y, and the optical flow OF0004to0003X/Y and OF0003to0004X/Y, and generates an image with a resolution which is twice the resolution of the base image 0004 with the following procedure.

First, the high-resolution image computation unit 104 creates an image 0004' with twice the resolution from the base image 0004 by linear interpolation. Note that the image 0004' with twice the resolution is created here, but the image 0004 is simply enlarged twofold and the resolution is not improved.

Figure 17:
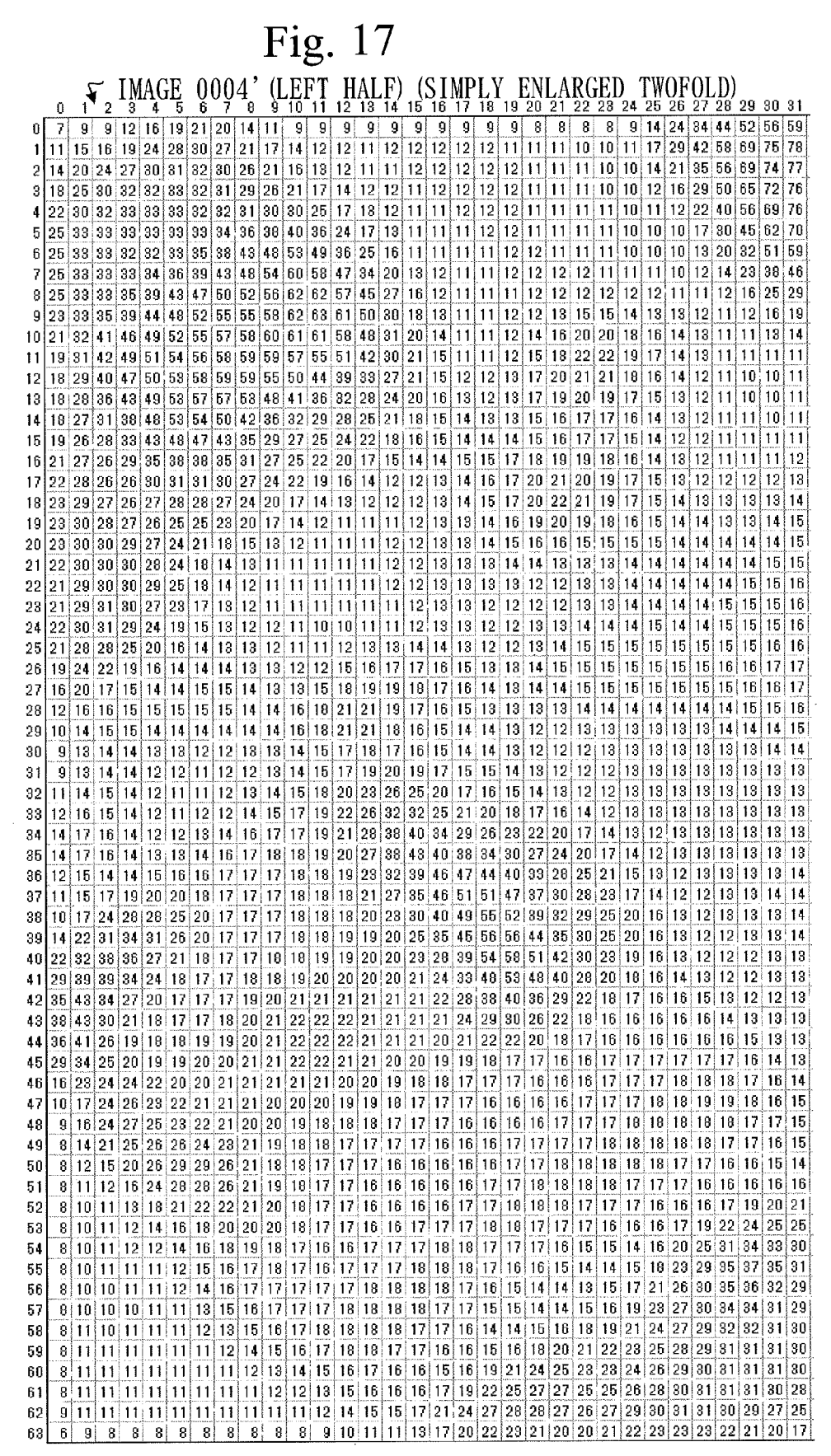

FIGS. 17 and 18 are diagrams illustrating the image 0004' with twice the resolution that is created from the base image 0004.

FIG. 17 is a diagram illustrating a left half (from pixel (0, 0) to pixel (31, 63)) of the image 0004'.

FIG. 18 is a diagram illustrating a right half (from pixel (32, 0) to pixel (63, 63)) of the image 0004'.

Figure 19:
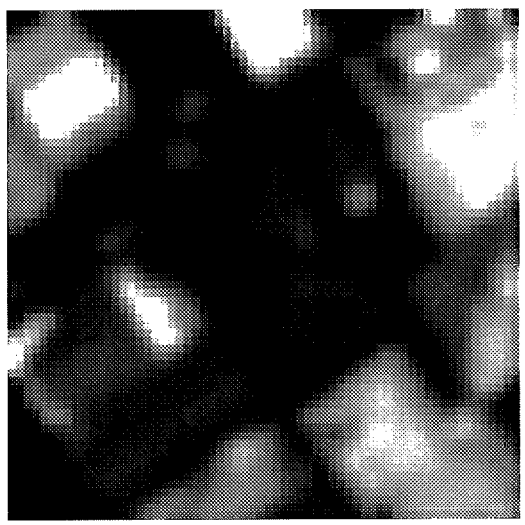
FIG. 19 is a grayscale representation of the image 0004'.

FIG. 19 is a grayscale representation of the image 0004'.

Then, the high-resolution image computation unit 104 down-samples the image 0004' of FIGS. 17 and 18 to 1/2, based on the optical flow (from the reference image to the base image) of each of the base image 0004, the reference image 0005, and the reference image 0003. That is, down-sampling to 1/2 is performed using OF0005to0004X/Y (corresponding to the reference image 0005), OF0003to0004X/Y (corresponding to the reference image 0003), and OF0004to0004X/Y (corresponding to the base image 0004). With the optical flow OF0004to0004X/Y of the base image 0004, the base image 0004 references itself. Thus, 0 is applied to both the X component and the Y component.

Coordinates (x', y') (x'=0, 1, 2, ..., 63, y'=0, 1, 2, ..., 63) on the image 0004' corresponding to coordinates (x, y) (x=0, 1, 2, ..., 31, y=0, 1, 2, ..., 31) on the down-sampled image are represented by Equation 1 and Equation 2 below. Note that flowX (x, y) and flowY (x, y) respectively denote the X component and the Y component in the optical flow at the coordinates (x, y).

$$x' = (x-15) \times 2 - 1 + \text{flow}X(x, y)/10 \times 2 + 31 \quad \text{(Equation 1)}$$

$$y' = (y-15) \times 2 - 1 + \text{flow}Y(x, y)/10 \times 2 + 31 \quad \text{(Equation 2)}$$

The high-resolution image computation unit 104 calculates the coordinates (x', y') on the image 0004', and obtains values of (x, y) from data of four pairs of the coordinates (x', y') around (x, y) by linear interpolation.

FIG. 20 is a diagram illustrating results of down-sampling to 1/2 using OF0004to0004X/Y (corresponding to the base image 0004).

FIG. 21 is a diagram illustrating results of down-sampling to 1/2 using OF0005to0004X/Y (corresponding to the reference image 0005).

FIG. 22 is a diagram illustrating results of down-sampling to 1/2 using OF0003to0004X/Y (corresponding to the reference image 0003).

Then, the high-resolution image computation unit 104 computes differences between the results of down-sampling of FIGS. 20 to 22 and the base image 0004, the reference image 0005, and the reference image 0003, respectively.

FIG. 23 is results of computing differences between the results of down-sampling using OF0004to0004X/Y (corresponding to the base image 0004) and the base image 0004.

FIG. 24 is results of computing differences between the results of down-sampling using OF0005to0004X/Y (corresponding to the reference image 0005) and the reference image 0005.

FIG. 25 is results of computing differences between the results of down-sampling using OF0003to0004X/Y (corresponding to the reference image 0003) and the reference image 0003.

In FIG. 23 to FIG. 25, a value enclosed by heavy lines indicates a minus value.

Then, the high-resolution image computation unit 104 up-samples the results of computing differences of FIG. 23 to 25 to 2/1, based on the optical flow (from the base image to the reference image) of the base image 0004, the reference image 0005, and the reference image 0003, respectively. That is, up-sampling to 2/1 is performed using OF0004to0005X/Y (corresponding to the reference image 0005), OF0004to0003X/Y (corresponding to the reference image 0003), and OF0004to0004X/Y (corresponding to the base image 0004). As in the case described above, with the optical flow OF0004to0004X/Y of the base image 0004, the base image 0004 references itself. Thus, 0 is applied to both the X component and the Y component.

Coordinates (x', y') (x'=0, 1, 2, ..., 31, y'=0, 1, 2, ..., 31) on the down-sampled image corresponding to coordinates (x, y) (x=0, 1, 2, ..., 63, y=0, 1, 2, ..., 63) on the up-sampled image are represented by the following Equation 3 and Equation 4. Note that flowX (x, y) and flowY (x, y) respectively denote the X component and the Y component of the optical flow at the coordinates (x, y) and that [x] denotes a maximum integer which is smaller than x.

$$x'=(x-31)/2-0.25-\text{flow}X([x/2],[y/2])/10/2+15 \quad \text{(Equation 3)}$$

$$y'=(y-31)/2-0.25-\text{flow}Y([x/2],[y/2])/10/2+15 \quad \text{(Equation 4)}$$

As an example, the high-resolution image computation unit 104 up-samples the differences with respect to the reference image 0005 to 2/1, using OF0004to0005X/Y (corresponding to the reference image 0005).

Figure 26:
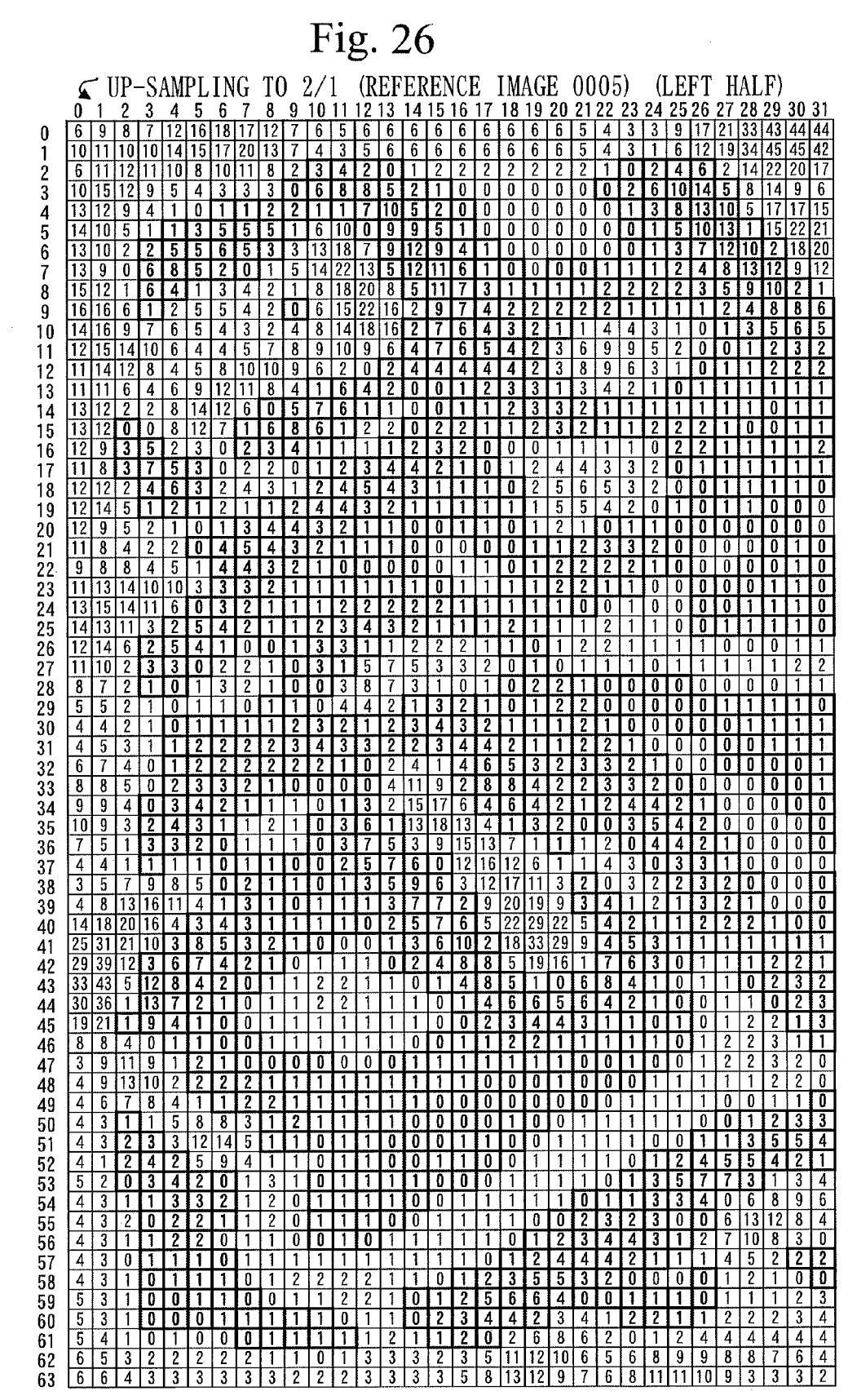

FIGS. 26 and 27 are diagrams illustrating results of up-sampling the differences with respect to the reference image 0005 to 2/1, using OF0004to0005X/Y (corresponding to the reference image 0005).

FIG. 26 is a diagram illustrating a left half (from pixel (0, 0) to pixel (31, 63)) of the results of up-sampling the differences with respect to the reference image 0005 to 2/1. FIG. 27 is a diagram illustrating a right half (from pixel (32, 0) to pixel (63, 63)) of the results of up-sampling the differences with respect to the reference image 0005 to 2/1.

In FIGS. 26 and 27, a value enclosed by heavy lines indicates a minus value.

Similarly, the high-resolution image computation unit 104 up-samples the differences with respect to the base image 0004 and the differences with respect to the reference image 0003 to 2/1, using OF0004to0004X/Y (corresponding to the base image 0004) and OF0004to0003X/Y (corresponding to the reference image 0003), respectively.

Then, the high-resolution image computation unit 104 updates the image 0004' (see FIGS. 17 and 18) based on the results of up-sampling to 2/1. The high-resolution image computation unit 104 updates the image 0004' by Equation 5 described below.

It is assumed that a function Valid(x, y) is a function that returns 1 if the difference in the altitude value of the coordinates (x, y) illustrated in FIG. 16 is three meters or less, and returns 1 if more than three meters. That is, the function Valid(x, y) is a function that outputs 1 if the coordinates (x, y) are a good portion, and outputs 0 if a faulty portion.

d0004(x, y) indicates the values of the coordinates (x, y) in the results of up-sampling the differences with respect to the base image 0004 to 2/1, d0005(x, y) indicates the values of the coordinates (x, y) in the results of up-sampling the differences with respect to the reference image 0005 to 2/1, and d0003(x, y) indicates the values of the coordinates (x, y) in the results of up-sampling the differences with respect to the reference image 0003 to 2/1.

v(x, y) indicates the values of the coordinates (x, y) on the image 0004' before being updated, and v' (x, y) indicates the values after being updated. It is assumed that α is a constant and that 0.25 is used in this embodiment. Also note that [x] denotes a maximum integer which is smaller than x.

Based on the above conditions, the high-resolution image computation unit 104 updates the image 0004' by the following Equation 5.

$$v'(x,y)=v(x,y)+\alpha\times(d0004(x,y)+d0005(x,y)+d0003 \\ (x,y))\times\text{Valid}([x/2],[y/2]) \quad \text{(Equation 5)}$$

As described above, the high-resolution image computation unit 104 updates the image 0004' using only good portions of the optical flow, and outputs a high-resolution image 125 obtained by improving the resolution of the base image 0004.

FIGS. 28 and 29 are diagrams illustrating the high-resolution image 125 which is a result of improving the resolution of (updating) the image 0004'.

FIG. 28 is a diagram illustrating a left half (from pixel (0, 0) to pixel (31, 63)) of the high-resolution image 125.

FIG. 29 is a diagram illustrating a right half (from pixel (32, 0) to pixel (63, 63)) of the high-resolution image 125.

Figure 30:
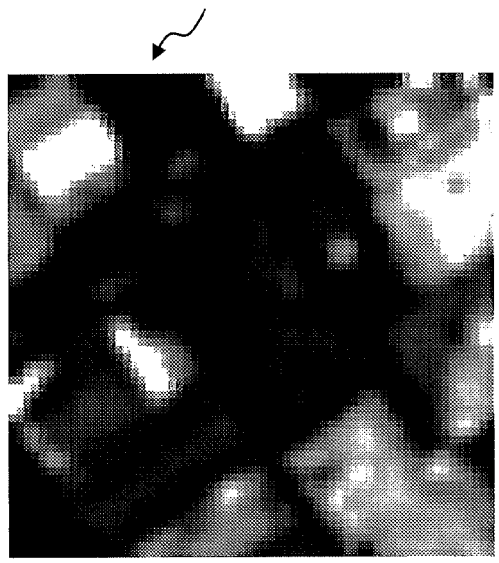
FIG. 30 is a grayscale representation of the high-resolution image 125.

FIG. 30 is a grayscale representation of the high-resolution image 125.

Compared with the image 0004' of FIG. 19 which is obtained by simply enlarging the base image 0004, it can be observed that contrast is improved in the high-resolution image 125 of FIG. 30.

Thereafter, the high-resolution image computation unit 104 repeats a procedure of down-sampling to 1/2, computation of differences, up-sampling to 2/1, and updating up to a predetermined number of times.

The high-resolution image computation unit 104 repeats the above procedure (procedure of down-sampling to 1/2, computation of differences, up-sampling to 2/1, and updating) ten times, for example.

FIGS. 31 and 32 are diagram illustrating a high-resolution image 125a which is a result of repeating the procedure ten times.

FIG. 31 is a diagram illustrating a left half (from pixel (0, 0) to pixel (31, 63)) of the high-resolution image 125a.

FIG. 32 is a diagram illustrating a right half (from pixel (32, 0) to pixel (63, 63)) of the high-resolution image 125a.

Figure 33:

FIG. 33 is a grayscale representation of the high-resolution image 125a.

When the high-resolution image 125 of FIG. 30 and the high-resolution image 125a of FIG. 33 are compared, it can be observed that details of the image are restored in each portion of the image in the high-resolution image 125a of FIG. 33.

Here, the number of times for repeating the procedure may be changed as appropriate.

As described above, the image in which the resolution of the base image 0004 is improved to twice the resolution can be obtained by the high-resolution image generation process by the high-resolution image generation apparatus 100.

In this embodiment, a method of performing a resolution improvement (super-resolution) process based on an algorithm called the IBP (Iterative Backward Projection) method is presented. The resolution improvement (super-resolution)

process may be conducted by implementation of another scheme of the IBP method, or by the MAP (Maximum A Posteriori) method and the like.

This embodiment is implemented using three input images. This embodiment may be implemented using two or any greater number of input images. This embodiment is implemented assuming that the input images have the same resolution. This embodiment may also be implemented in substantially the same manner using images each having a different resolution.

In this embodiment, two results of computing the depth are compared and a portion where the difference is more than three meters is determined as faulty. This embodiment may also be implemented such that quality determination is performed by comparing three or more results of computing the depth and focusing on dispersion or standard deviation. When the standard deviation or the like is to be obtained, it may be implemented such that a preparatory process for eliminating outliers is performed by the Smirnov-Grubbs test or the like.

As described above, the high-resolution image generation apparatus 100 according to this embodiment includes a multi-viewpoint image storage means that stores a multi-viewpoint image captured from different directions and internal and external parameters (information such as a focal distance, a position, and an orientation of a sensor or a camera) when the image is captured, an optical flow computation means that selects a plurality of pairs of images from multi-viewpoint images and computes optical flow between the selected images, a depth computation means that computes depth of each image for each of the plurality of pieces of the optical flow by referring to the internal and external parameters (information such as the focal distance, the position, and the orientation of the sensor or the camera), an optical flow sorting means that compares a plurality of results of computing the depth and sorts out good potions from faulty portions in the optical flow, and a high-resolution image computation means that receives a portion of the optical flow sorted as a good portion and a portion of the image corresponding thereto and computes a high-resolution image.

This provides an effect that a high-quality image can be generated by using depth information that can be computed from a multi-viewpoint image and, based on a result thereof, sorting out good portions from faulty portions in optical flow.

In the description of the embodiment above, the "optical flow computation unit", the "depth information computation unit", the "optical flow sorting unit", and the "high-resolution image computation unit" constitute the high-resolution image generation apparatus 100 as independent functional blocks. However, this is not limiting, and the "optical flow computation unit" and the "depth information computation unit" may be implemented as one functional block, and the "optical flow sorting unit" and the "high-resolution image computation unit" may be implemented as one functional block, for example. Alternatively, one functional block may be further divided into a plurality of functional blocks to constitute the high-resolution image generation apparatus 100. Alternatively, these functional blocks may be configured in any other combination.

The embodiment of the present invention has been described above. One portion of this embodiment may be implemented. Alternatively, two or more portions of this embodiment may be implemented in combination. The present invention is not limited to this embodiment, and various modifications are possible as required.

REFERENCE SIGNS LIST

100: high-resolution image generation apparatus, 101: optical flow computation unit, 102: depth information computation unit, 103: optical flow sorting unit, 104: high-resolution image computation unit, 120: hard disk, 121: image capture information, 122: multi-viewpoint image information, 123: parameter information, 125, 125a: high-resolution image, 130: display, 901: arithmetic device, 902: external memory device, 903: main memory device, 904: communication device, 905: input/output device, 1221: multi-viewpoint image, 1222: multi-viewpoint image data, 1231: sensor position information, 1232: sensor vector information

The invention claimed is:

1. A high-resolution image generation apparatus that performs on an image a process to improve a resolution of the image to a higher resolution, the high-resolution image generation apparatus comprising:
   an image storage unit to store a subject image whose resolution is to be improved and a plurality of reference images obtained by capturing an imaging subject of the subject image from viewpoints different from a viewpoint of the subject image, and store imaging device condition information which indicates an imaging condition of an imaging device when each of the subject image and the plurality of reference images is captured, in association with a corresponding one of the subject image and the plurality of reference images;
   an optical flow computation unit to extract a plurality of pairs including the subject image and one of the plurality of reference images from the image storage unit, the plurality of pairs each including a different one of the plurality of reference images, and compute, with a processing device, optical flow including pixel-based correspondence information which indicates a pixel of the one of the plurality of reference images corresponding to each pixel of the subject image, for each of the plurality of pairs extracted;
   a depth information computation unit to compute depth information which indicates depth of each pixel of the subject image for each of the plurality of pairs, based on the optical flow of each pair computed by the optical flow computation unit and the imaging device condition information corresponding to each of the subject image and the one of the plurality of reference images included in said pair, out of the imaging device condition information stored in the image storage unit; and
   an optical flow determination unit to determine, with the processing device, whether or not each piece of the pixel-based correspondence information included in the optical flow of each pair is to be used for improving the resolution of the subject image, based on at least two pieces of the depth information out of the depth information computed by the depth information computation unit.

2. The high-resolution image generation apparatus according to claim 1, further comprising
   a resolution improvement processing unit to improve the resolution of the subject image, based on a piece of the pixel-based correspondence information which is determined by the optical flow determination unit to be used for improving the resolution of the subject image, out of the pixel-based correspondence information included in the optical flow of each pair.

3. The high-resolution image generation apparatus according to claim 1, wherein the optical flow determination unit extracts two pieces of the depth information from the depth information of each pair computed by the depth information computation unit, calculates a difference in the depth for each pixel of the subject image using the two pieces of the depth information extracted, and determines that a piece of the pixel-based correspondence information corresponding to said pixel of the subject image is to be used for improving the resolution of the subject image when the difference calculated is less than a threshold value.

4. The high-resolution image generation apparatus according to claim 1, wherein as the imaging device condition information, the image storage unit stores imaging device position information which indicates a position of the imaging device, and imaging device orientation information which indicates an orientation of the imaging device.

5. The high-resolution image generation apparatus according to claim 1, wherein as the depth of each pixel of the subject image, the depth information computation unit computes an altitude value of a position indicated by each pixel of the subject image.

6. A high-resolution image generation method of a high-resolution image generation apparatus that performs on an image a process to improve a resolution of the image to a higher resolution, the high-resolution image generation apparatus including an image storage unit to store a subject image whose resolution is to be improved and a plurality of reference images obtained by capturing an imaging subject of the subject image from viewpoints different from a viewpoint of the subject image, and store imaging device condition information which indicates an imaging condition of an imaging device when each of the subject image and the plurality of reference images is captured, in association with a corresponding one of the subject image and the plurality of reference images, the high-resolution image generation method comprising:

extracting a plurality of pairs including the subject image and one of the plurality of reference images from the image storage unit, the plurality of pairs each including a different one of the plurality of reference images, and computing, with a processing device, optical flow including pixel-based correspondence information which indicates a pixel of the one of the plurality of reference images corresponding to each pixel of the subject image, for each of the plurality of pairs extracted, by an optical flow computation unit;

computing depth information which indicates depth of each pixel of the subject image for each of the plurality of pairs, based on the optical flow of each pair computed and the imaging device condition information corresponding to each of the subject image and the one of the plurality of reference images included in said pair, out of the imaging device condition information stored in the image storage unit, by a depth information computation unit;

determining, with the processing device, whether or not each piece of the pixel-based correspondence information included in the optical flow of each pair is to be used for improving the resolution of the subject image, based on at least two pieces of the depth information out of the depth information computed, by an optical flow determination unit; and improving the resolution of the subject image, based on a piece of the pixel-based correspondence information which is determined to be used for improving the resolution of the subject image, out of the pixel-based correspondence information included in the optical flow of each pair, by a resolution improvement processing unit.

7. A high-resolution image generation program of a high-resolution image generation apparatus that performs on an image a process to improve a resolution of the image to a higher resolution, the high-resolution image generation apparatus including an image storage unit to store a subject image whose resolution is to be improved and a plurality of reference images obtained by capturing an imaging subject of the subject image from viewpoints different from a viewpoint of the subject image, and store imaging device condition information which indicates an imaging condition of an imaging device when each of the subject image and the plurality of reference images is captured, in association with a corresponding one of the subject image and the plurality of reference images, the high-resolution image generation program comprising:

an optical flow computation process of extracting a plurality of pairs including the subject image and one of the plurality of reference images from the image storage unit, the plurality of pairs each including a different one of the plurality of reference images, and computing, with a processing device, optical flow including pixel-based correspondence information which indicates a pixel of the one of the plurality of reference images corresponding to each pixel of the subject image, for each of the plurality of pairs extracted;

a depth information computation process of computing depth information which indicates depth of each pixel of the subject image for each of the plurality of pairs, based on the optical flow of each pair computed by the optical flow computation process and the imaging device condition information corresponding to each of the subject image and the one of the plurality of reference images included in said pair, out of the imaging device condition information stored in the image storage unit;

an optical flow determination process of determining, with the processing device, whether or not each piece of the pixel-based correspondence information included in the optical flow of each pair is to be used for improving the resolution of the subject image, based on at least two pieces of the depth information out of the depth information computed by the depth information computation process; and a resolution improvement processing process of improving the resolution of the subject image, based on a piece of the pixel-based correspondence information which is determined by the optical flow determination process to be used for improving the resolution of the subject image, out of the pixel-based correspondence information included in the optical flow of each pair.

\* \* \* \* \*